United States Patent
Nair

(10) Patent No.: US 12,524,563 B2
(45) Date of Patent: Jan. 13, 2026

(54) SYSTEM AND METHOD FOR EFFICIENT CRYPTOGRAPHICALLY-ASSURED DATA ACCESS MANAGEMENT FOR ADVANCED DATA ACCESS POLICIES

(71) Applicant: Multifactor, Inc., Newark, DE (US)

(72) Inventor: Vivek Chinar Nair, Santa Clara, CA (US)

(73) Assignee: Multifactor, Inc., Newark, DE (US)

(*) Notice: Subject to any disclaimer, the term of this patent is extended or adjusted under 35 U.S.C. 154(b) by 427 days.

(21) Appl. No.: 18/173,111

(22) Filed: Feb. 23, 2023

(65) Prior Publication Data

US 2024/0070309 A1 Feb. 29, 2024

Related U.S. Application Data

(60) Provisional application No. 63/269,336, filed on Mar. 14, 2022.

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01); *G06F 21/604* (2013.01)

(58) Field of Classification Search
CPC ... G06F 21/6227; G06F 21/602; G06F 21/604
See application file for complete search history.

(56) References Cited

U.S. PATENT DOCUMENTS

| | | | |
|---|---|---|---|
| 9,203,815 B1* | 12/2015 | Bogorad | G06F 21/604 |
| 11,785,114 B1* | 10/2023 | Fregly | H04L 9/0894 |
| 2020/0051127 A1* | 2/2020 | Johnson | G06Q 30/0257 |
| 2020/0067907 A1* | 2/2020 | Avetisov | H04L 67/133 |
| 2024/0193255 A1* | 6/2024 | Quinlan | H04L 9/0894 |

* cited by examiner

*Primary Examiner* — Ayoub Alata
(74) *Attorney, Agent, or Firm* — Robinson IP Law, PLLC

(57) ABSTRACT

A system and method for efficient cryptographically-assured data access management for advanced data access policies includes: a user having a cryptographic key; a client device; and a graph database; whereby the user makes requests to the graph database using the client device; and whereby the graph database cryptographically enforces a data access policy.

20 Claims, 61 Drawing Sheets

FIG. 11    Read Access  → 410

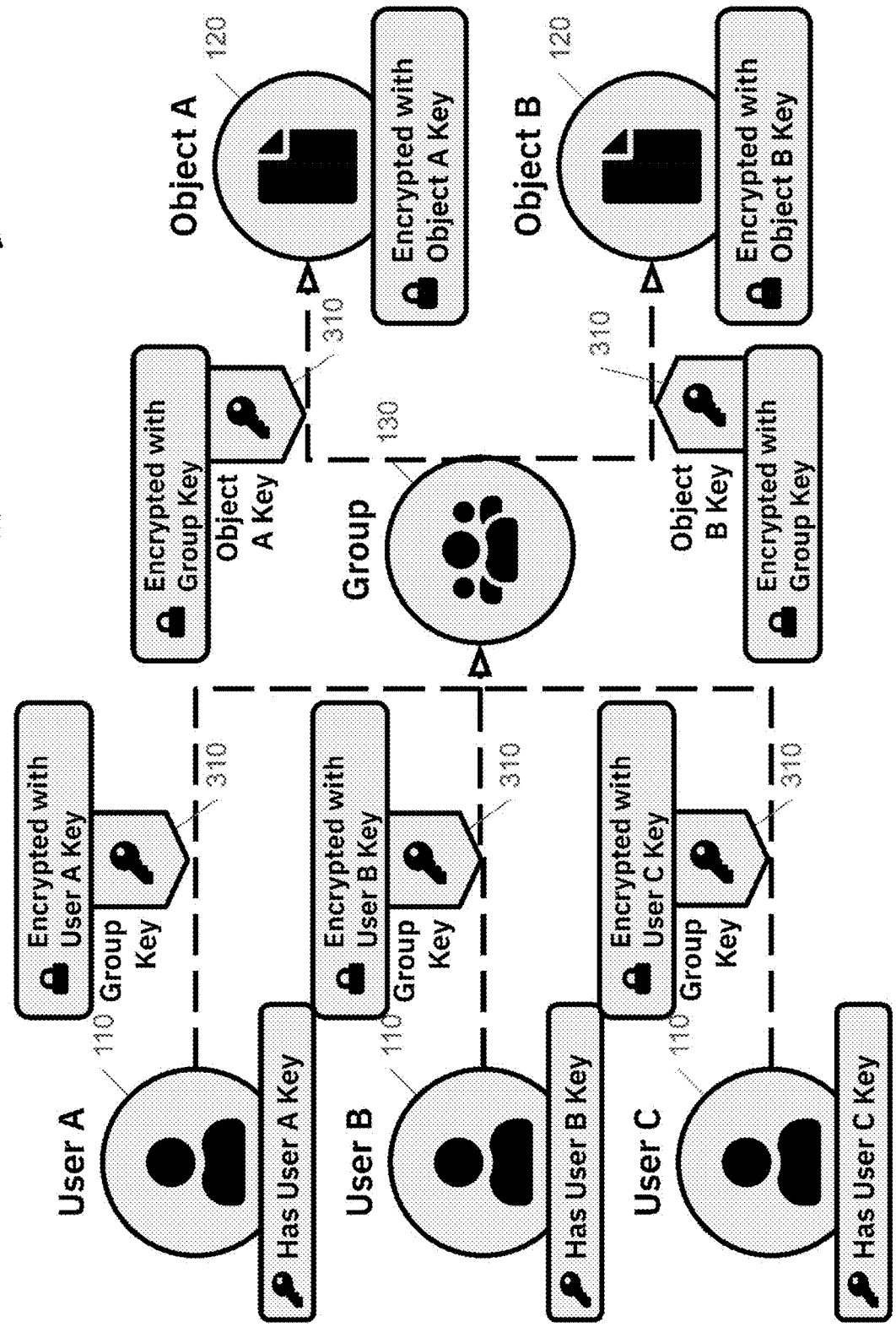

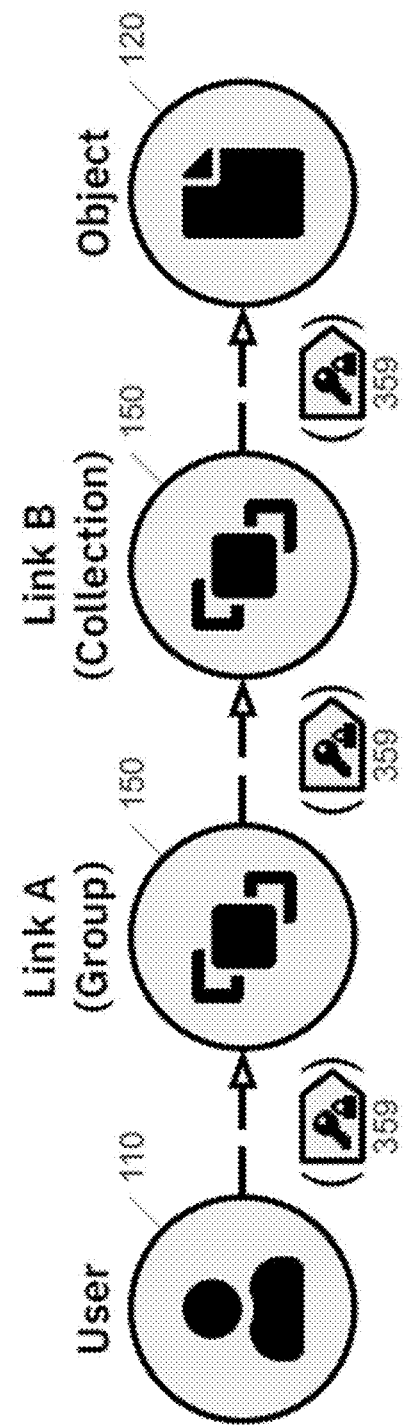
FIG. 23

SYSTEM AND METHOD FOR EFFICIENT CRYPTOGRAPHICALLY-ASSURED DATA ACCESS MANAGEMENT FOR ADVANCED DATA ACCESS POLICIES

CROSS-REFERENCE TO RELATED APPLICATION

This application claims priority to and is a non-provisional of U.S. Application Ser. No. 63/269,336 filed on Mar. 14, 2022, the contents of which are incorporated herein by reference in its entirety.

FIELD

This disclosure relates to the field of information security. More particularly, this disclosure relates to systems and methods for data access management.

BACKGROUND

A data access policy may be characterized as a series of permissions (such as read access 410 or write access 420) between users 110 (representing individuals, organizations, machines, or other identities), and objects 120 (representing data files, data sets, data systems, or other collections of data). Data access policies may be modeled using a graph where users 110 and objects 120 are represented by vertices and permissions are represented by edges. FIG. 1 illustrates a simple data access management policy in which a single user 110 is given both read access 410 and write access 420 to a single object 120.

A system and method for data access management is concerned with enforcing data access policies. There are a variety of scenarios in which an ignorant or curious user 110 or even a malicious adversary may attempt to access data in violation of a data access policy, for example, by attempting to read a file they do not have read permissions for. A successful system and method for data access management makes it difficult for data access attempts not permitted by a data access policy to succeed.

A simple system and method for data access management is shown in FIG. 2. A client 220 interacts with a server 240 to request access to an object 120 stored in a database 230 either on the server 240 itself or on a separate machine. The server 240 identifies the user 110 associated with the client 220 using an authentication protocol and evaluates whether the user 110 should be given access to the requested object 120 according to a data access policy. If the action is permissible according to the data access policy, the request is granted, and the requested operation is executed by the server 240 and/or database 230.

Systems like those shown in FIG. 2 rely on the correct operation of the system components to protect sensitive data. If an error in the design or implementation of the system causes sensitive data to be compromised, the sensitive data becomes available to adversarial users 110 in violation of a data access policy. Relying on a perfectly secure implementation for enforcement of a data access policy may not be considered practical. Furthermore, these types of systems provide no protection for data while it is in transit between system components, for example, between the client 220 and the server 240. By contrast, cryptographically-assured systems and methods provide strong security guarantees for data in transit and at rest based on mathematical properties of the underlying cryptographic algorithms. Even if an implementation flaw allows data to be leaked to an adversary, such data will be unusable to unauthorized parties if the encryption algorithm used is well designed and implemented. Since encryption algorithms are typically standardized and used across numerous different systems, their design and implementation is usually much more thoroughly scrutinized than that of an individual system. The potential attack surface of such a system is thus significantly reduced while its security guarantees are strengthened. What is needed, therefore, is a system and method for cryptographically-assured data access management.

FIG. 3 illustrates a basic data access policy in which a single user 110 is given read access 410 to a single object 120. FIG. 4 illustrates a simple cryptographic assurance scheme for this data access policy whereby the object 120 is encrypted using a key held by the user 110 using either a symmetric or asymmetric encryption scheme. This scheme provides strong cryptographic assurances because even in the event of a data breach, entities will not be able to decrypt and read the object 120 without the decryption key of the authorized user 110. However, this scheme is incompatible with advanced data access policies, namely, policies consisting of relationships other than a simple one-to-one relationship between users 110 and objects 120. FIG. 5 illustrates a data access policy where multiple separate users 110 are all granted read access 410 to a single object 120. FIG. 6 demonstrates an implementation of the same cryptographic assurance scheme from FIG. 4 for the data access policy from FIG. 5. Once again, the object 120 is encrypted with a key from a single user 110. However, the scheme now fails to provide correct data access management, as all but one of the users 110 are unable to decrypt and read the object 120 despite having read access 410 permissions under the data access policy. Thus, the simple scheme in FIG. 4 is incompatible with advanced data access policies.

FIG. 7 illustrates a scheme attempting to address the deficiency exemplified in FIG. 6. In this scheme, a single copy of the object 120 is encrypted using a shared key which is distributed to all users 110 with read access 410. Each user 110 with read access 410 can then read the object 120 by decrypting it using the shared key. However, this scheme has several undesirable weaknesses from a technical perspective. Firstly, it fails to facilitate different permissions for different users 110—by giving all associated users 110 access to the same key, they will fundamentally be able to access the same objects 120 and exercise the same effective permissions. Secondly, it fails to provide revocability of permissions. In the event that the read access 410 of a user 110 to an object 120 is revoked, the user 110 will still possess the means to decrypt and read the object 120 by virtue of retaining access to the shared key. Therefore, this scheme fails to adequately provide support for advanced data access policies.

The deficiency exemplified in FIG. 6 can be rectified by the cryptographic assurance scheme illustrated in FIG. 8. In this scheme, the advanced data access policy shown in FIG. 5 is implemented by making a copy of the object 120 for each user 110 who has read access 410 and encrypting each copy using the key of the corresponding user 110. Each user 110 with read access 410 can read the object 120 by requesting their corresponding copy and decrypting it with their key. However, this scheme has several undesirable inefficiencies from a technical perspective. Firstly, it is inefficient with respect to storage space, as it requires numerous copies of the same object 120 to be stored. If a large number of users 110 require read access 410 to the same object 120, a large number of copies are required, which may require an impractical quantity of storage space. Secondly, it is inefficient with respect to updates. FIG. 9 illustrates this scheme when only a single copy of the object 120 is updated. When the corresponding user 110 reads the object 120, they will correctly receive the updated copy. However, when any other user 110 reads the object 120, they will receive the old copy, thereby creating inconsistencies. Thus, when any update takes place, it is necessary to update every stored copy of the object 120. Once again, this may be computationally infeasible if a large number of copies exist, particularly for objects 120 which must be frequently updated. A useful system and method for cryptographically-assured data access management for advanced data access policies must address these inefficiencies. What is needed, therefore, is a system and method for efficient cryptographically-assured data access management for advanced data access policies.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 18 shows a group of users with read access to two encrypted objects using encrypted keys according to one embodiment of the present disclosure;

FIG. 23 shows a data access policy with links and link keys according to one embodiment of the present disclosure;

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Embodiments of a system and method for efficient cryptographically-assured data access management for advanced data access policies described herein are implemented using various components such as one or more computers, computer readable storage mediums, and computer networks for storing and transmitting data as described in greater detail below. The system and method for efficient cryptographically-assured data access management for advanced data access policies is operable across multiple components using network connectivity, servers, databases, and devices such as smartphones or personal computers to receive and transmit data between components.

Figure 10:
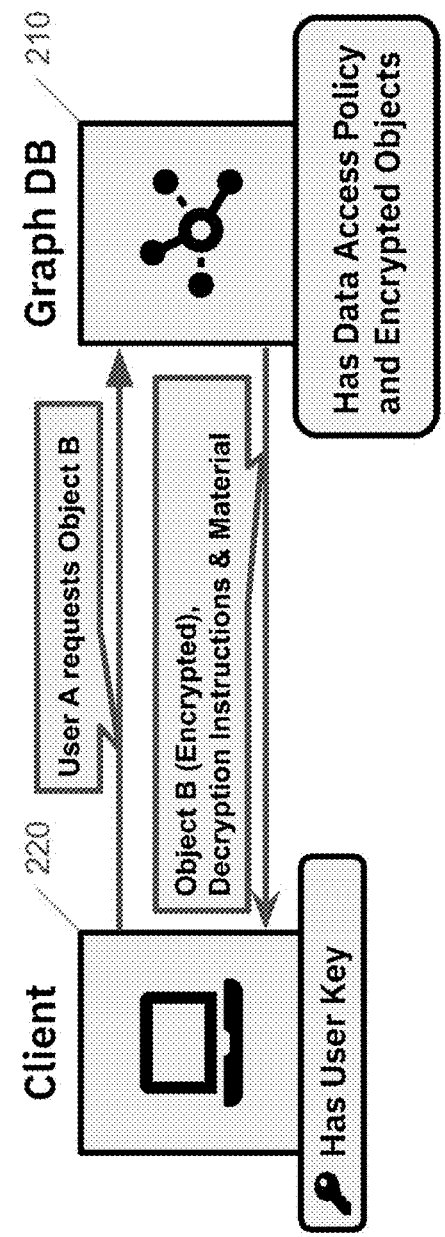
FIG. 10 shows a system and method for efficient cryptographically-assured data access management for advanced data access policies according to one embodiment of the present disclosure.

FIG. 10 shows a basic embodiment of a system and method for efficient cryptographically-assured data access management for advanced data access policies consisting of a client 220 which interacts with a graph database 210 (a database 230 storing information which may be represented as a graph) which stores both a data access policy and encrypted objects 120. When a user 110 wishes to access an object 120, their client 220 authenticates with the graph database 210 and identifies the object 120 it wishes to retrieve. The graph database 210 validates the request according to the stored data access policy, and, if permissible, returns the encrypted object 120, along with any instructions or cryptographic material that may be required for successful decryption of the object 120 by the client 220 via the key of the user 110. The following description is primarily concerned with the unique cryptographic assurance scheme implemented within the graph database 210 to facilitate the efficient implementation of advanced data access policies. The initial focus is on providing read access 410; later, other types of permissions will also be discussed.

Figure 1:
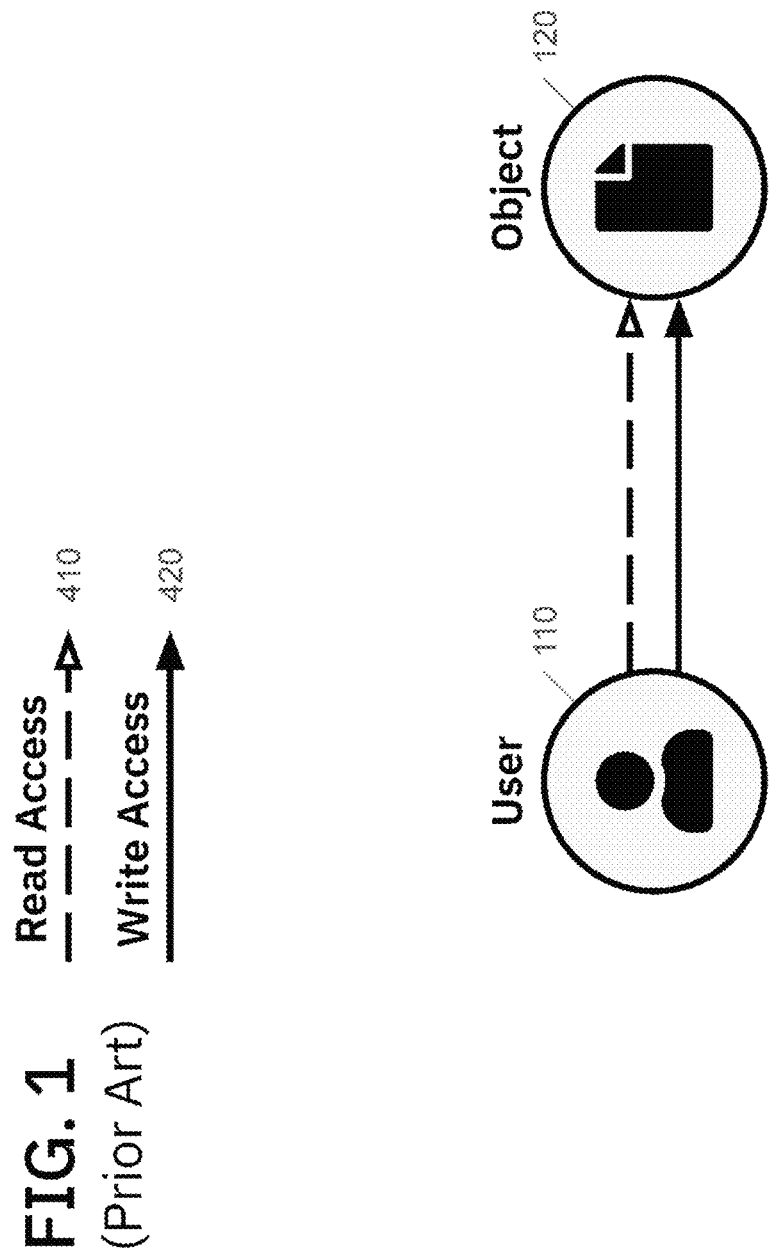
FIG. 1 shows a user with read and write access to an object.
Figure 2:
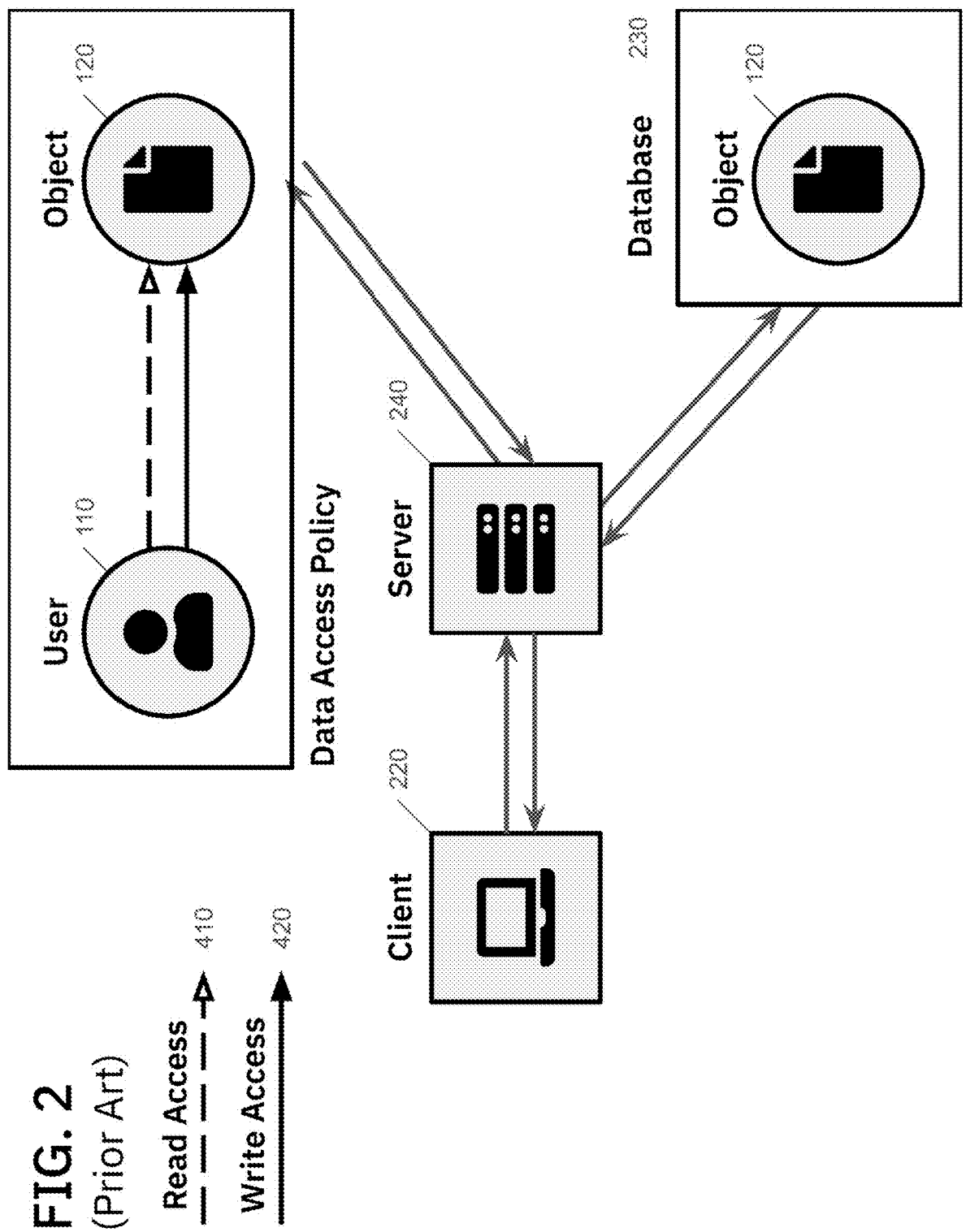
FIG. 2 shows a simple system and method for data access management.
Figure 3:
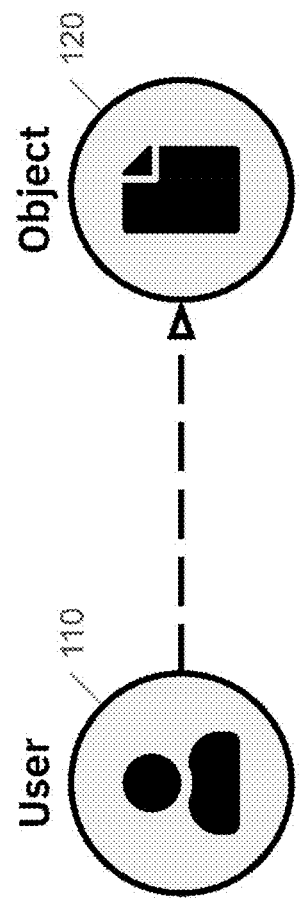
FIG. 3 shows a user with read access to an object.
Figure 4:
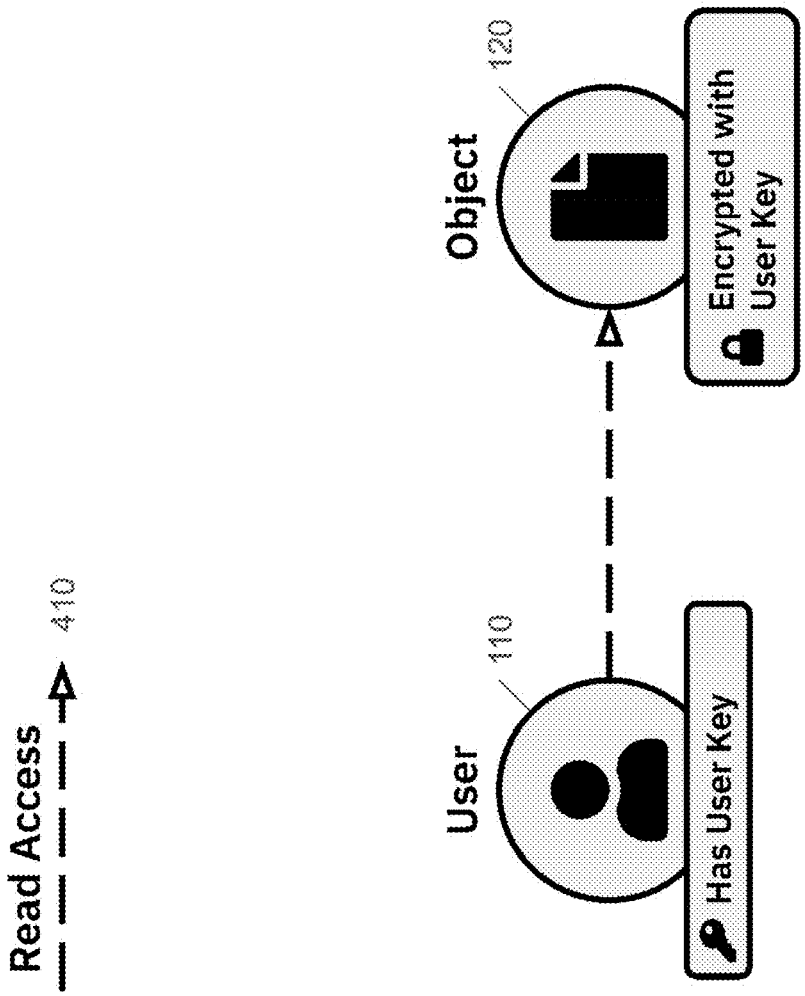
FIG. 4 shows a user with read access to an encrypted object.
Figure 11:
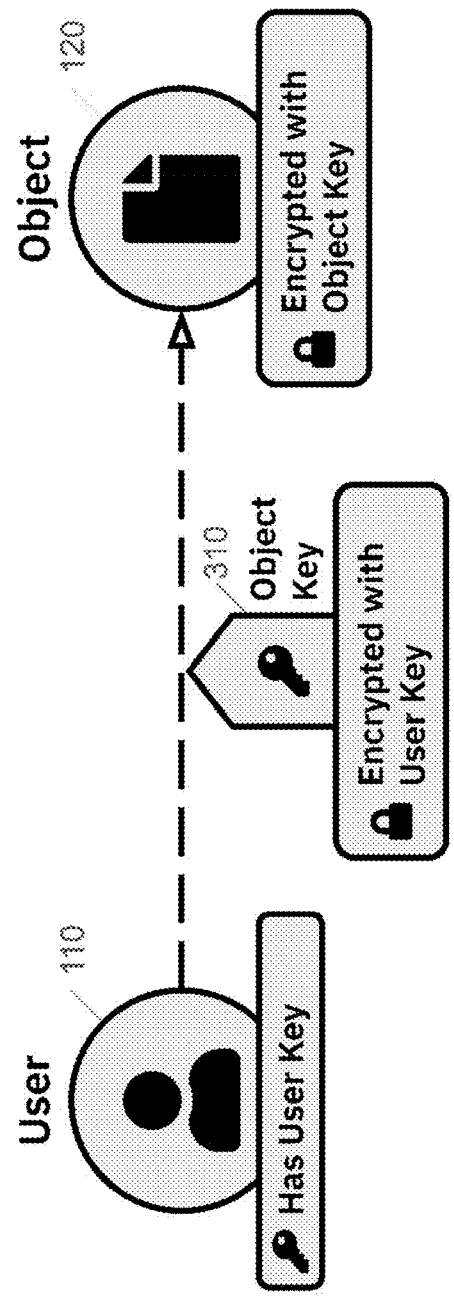
FIG. 11 shows a user with read access to an encrypted object using an encrypted key according to one embodiment of the present disclosure.

In one embodiment, the data access policy illustrated in FIG. 3 is implemented via the cryptographic assurance scheme in FIG. 11. The cryptographic assurance scheme is stored in a graph database 210. Each user 110 holds their own user key 310, which may be implemented either in software or in hardware (e.g. a smart card, hardware security key, secure enclave, or secure element). Each object 120 is encrypted with its own object 120 key 320. To grant a user 110 read access 410 to an object 120, the object 120 key 320 is encrypted with the user key 310 and the encrypted object 120 key 320 is stored as a property of the edge representing the read access 410 permission in the graph database 210. When the user 110 wishes to read the object 120, they may submit a request to the graph database 210 requesting to read the object 120. After authenticating the user 110 and validating the request, the graph database 210 returns both the object 120 (encrypted by the object 120 key 320) and object 120 key 320 (encrypted by the user key 310) to the user 110. The user 110 can then decrypt the object 120 key 320 using their user key 310 and use the object 120 key 320 to decrypt and read the object 120. Any user 110 who does not have read access 410 will not be able to decrypt the object 120 key 320 and therefore will not be able to decrypt the object 120.

Figure 5:
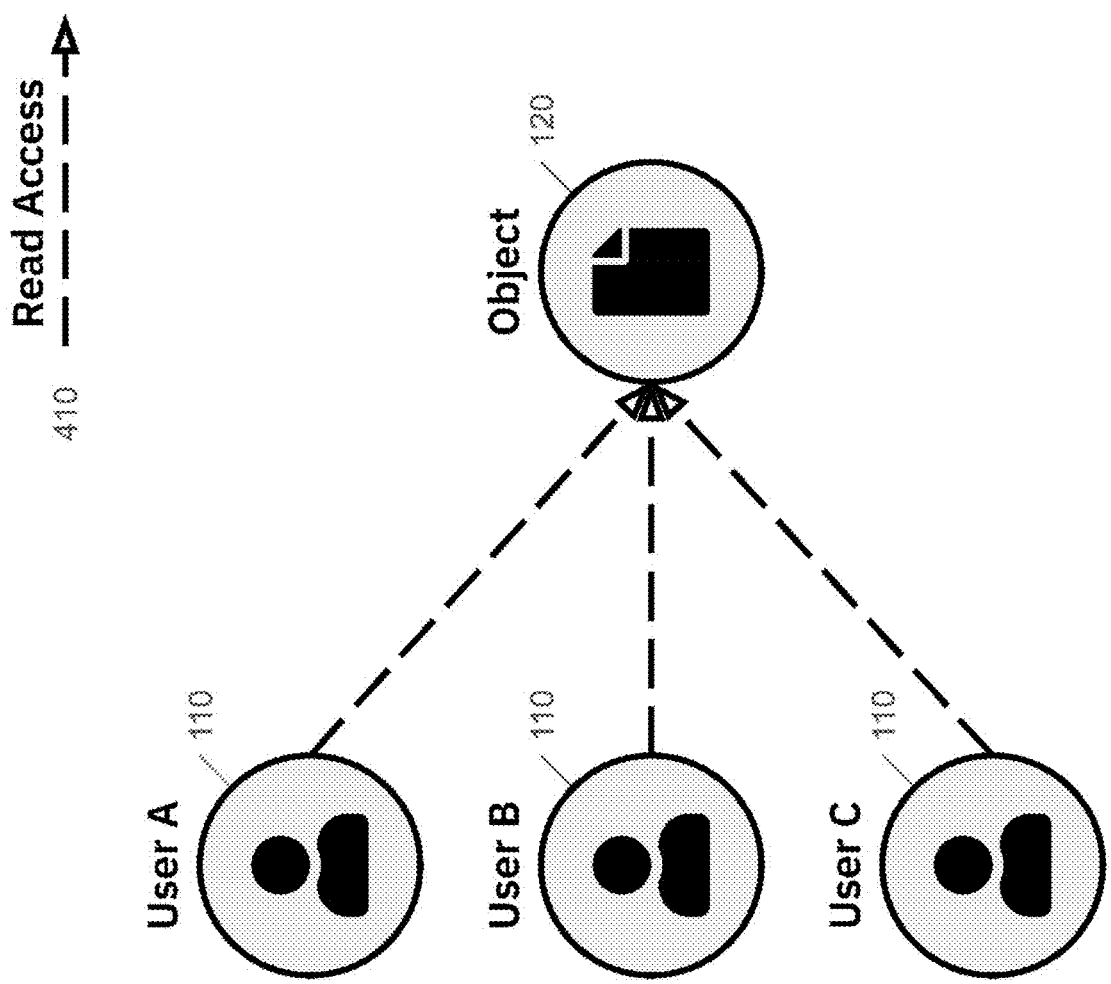
FIG. 5 shows three users with read access to an object.
Figure 6:
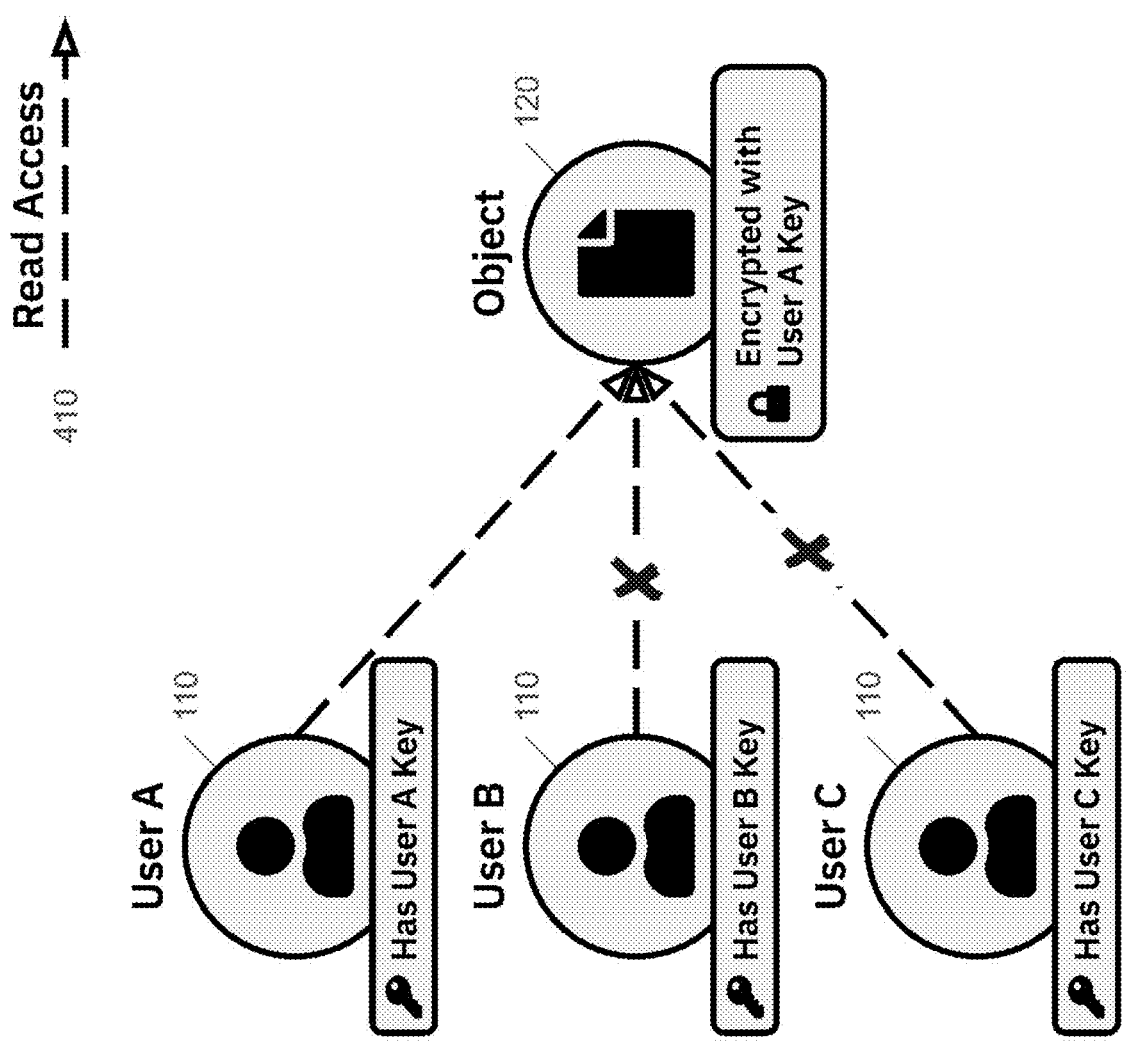
FIG. 6 shows three users with read access to an encrypted object.
Figure 7:
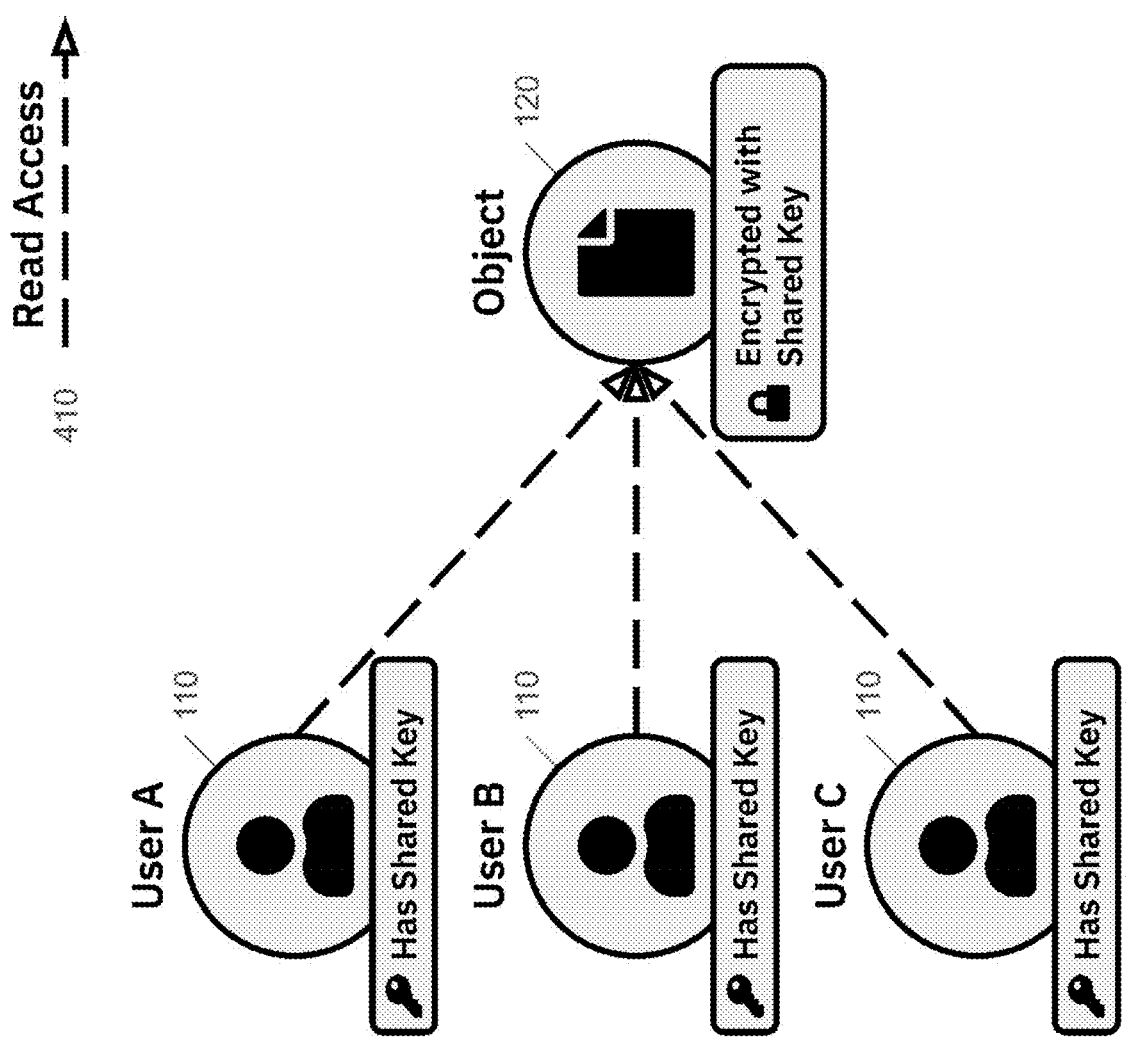
FIG. 7 shows three users with read access to an encrypted object using a shared key.
Figure 12:
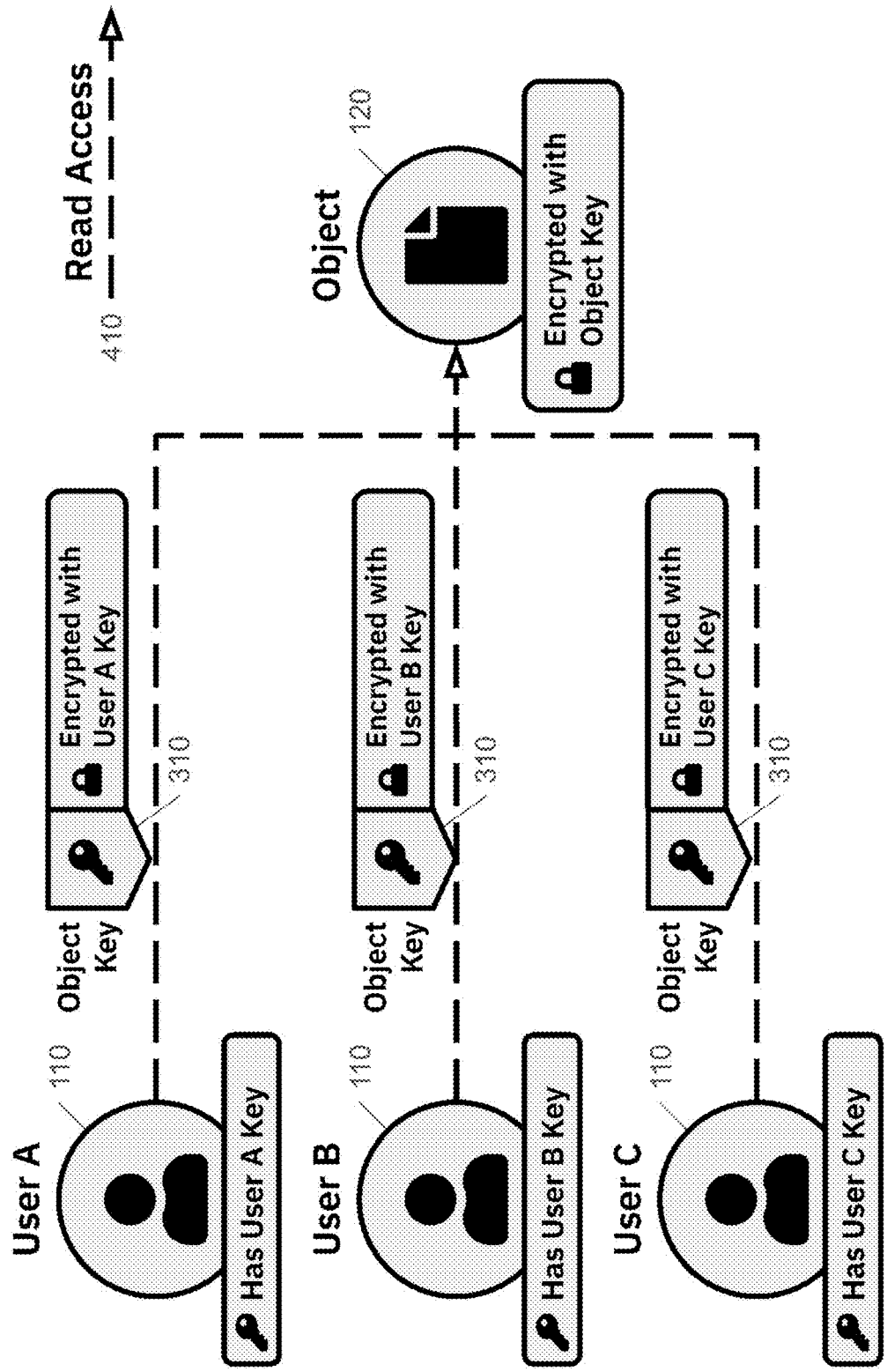
FIG. 12 shows three users with read access to an encrypted object using encrypted keys according to one embodiment of the present disclosure.

In one embodiment, the data access policy illustrated in FIG. 5 is implemented via the cryptographic assurance scheme in FIG. 12. FIG. 12 illustrates a cryptographic assurance scheme for a data access policy in which three users 110 have read access 410 to a single object 120. A single copy of the object 120 is stored encrypted with an object 120 key 320. Three copies of the object 120 key 320 are stored, each copy encrypted with a user key 310 corresponding to one of the three users 110. Each user 110 with read access 410 can read the object 120 by first decrypting their copy of the object 120 key 320 using their user key 310, and then decrypting the object 120 using their object 120 key 320. Any user 110 who does not have read access 410 will not have a copy of the object 120 key 320 stored encrypted with their user key 310 and will therefore not be able to decrypt the object 120 key 320, therefore being unable to decrypt and read the object 120.

Figure 8:
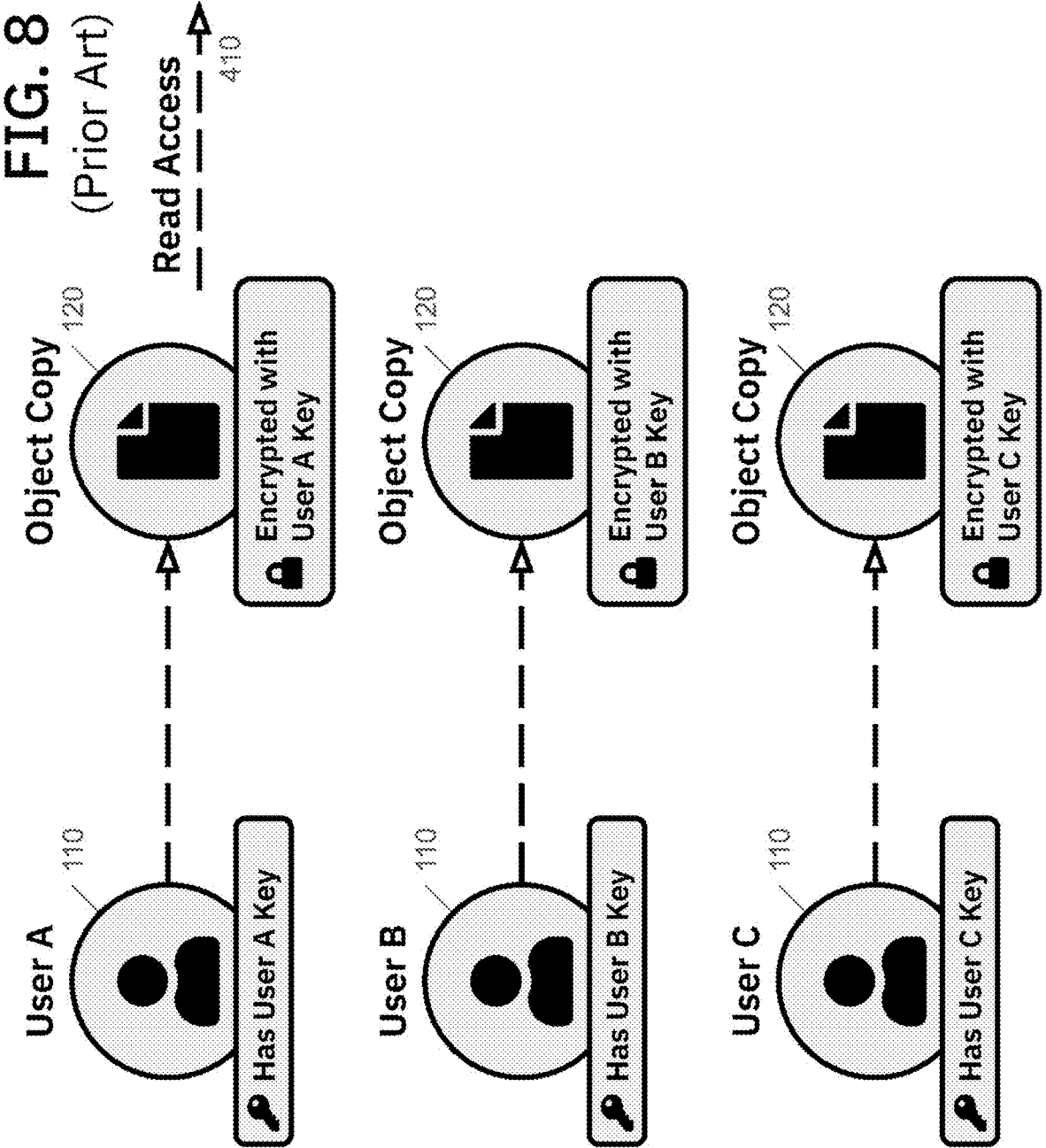
FIG. 8 shows three users with read access to three copies of an encrypted object.
Figure 9:
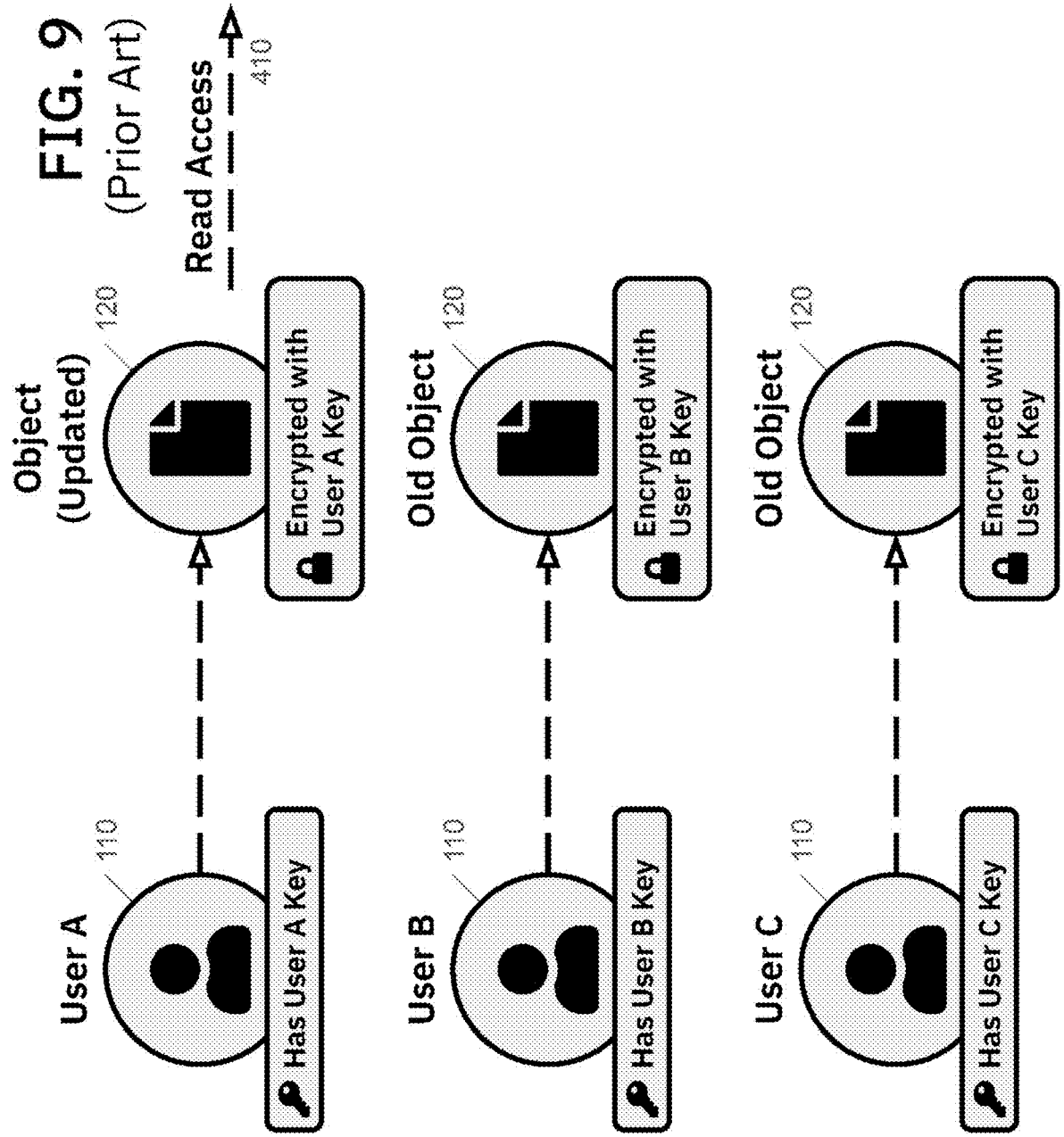
FIG. 9 shows three users with read access to three copies of an encrypted object, one of which has been updated.
Figure 13:
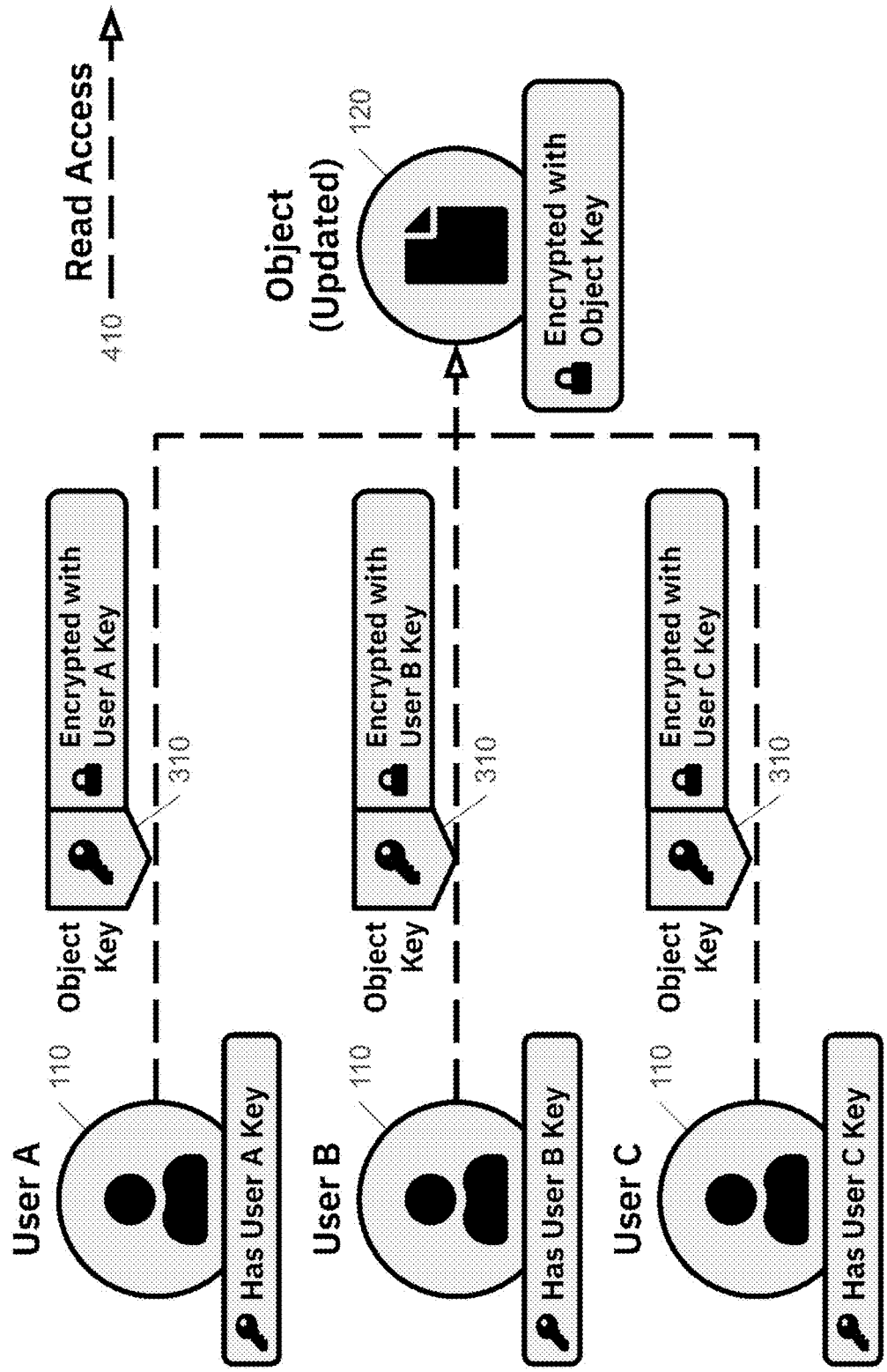
FIG. 13 shows three users with read access to an updated encrypted object using encrypted keys according to one embodiment of the present disclosure.
Figure 14:
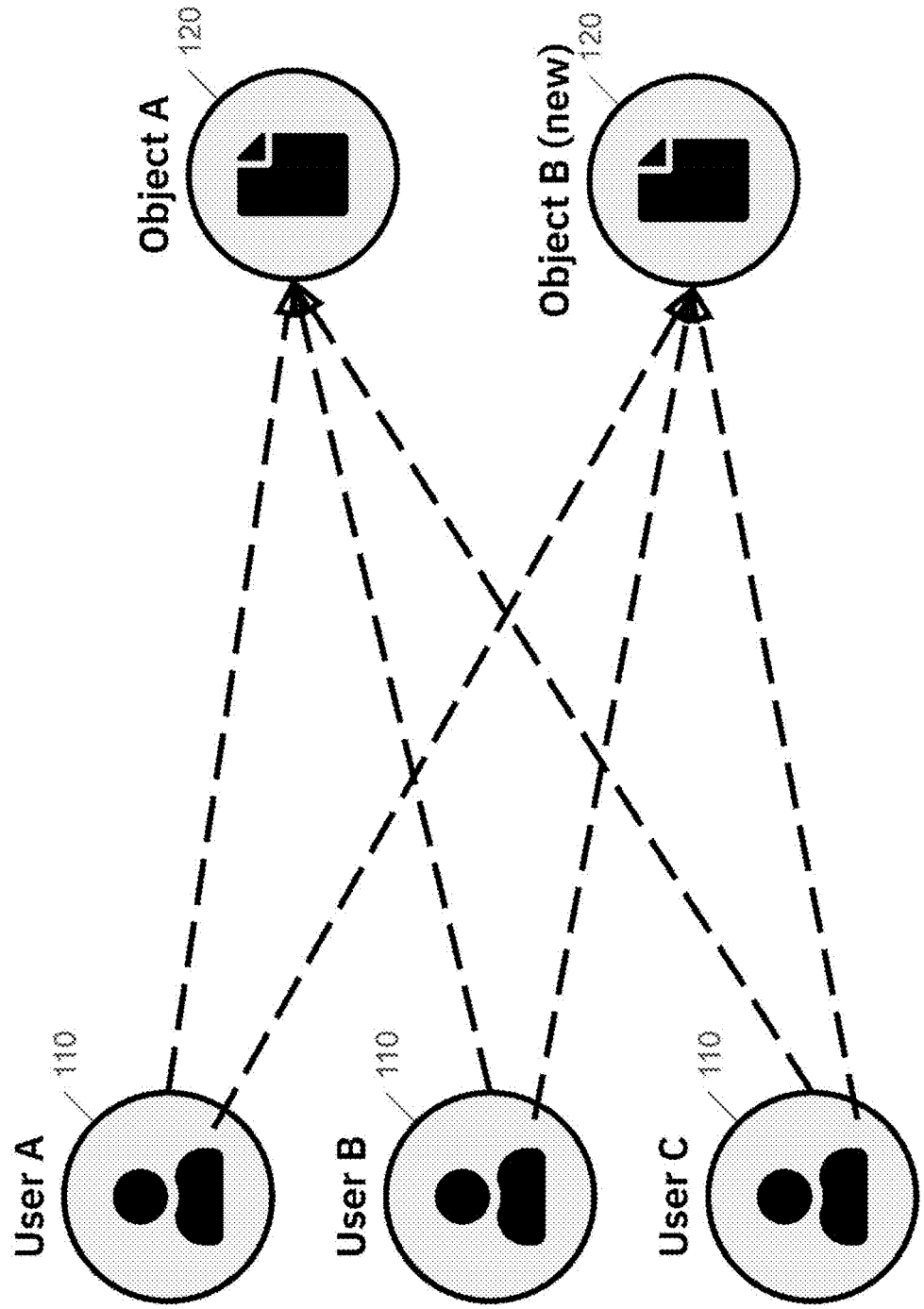
FIG. 14 shows three users with read access to two encrypted objects according to one embodiment of the present disclosure.

The cryptographic assurance scheme in FIG. 12 has several technical advantages over the cryptographic assurance scheme in FIG. 8. The cryptographic assurance scheme is more efficient with respect to storage space. While the scheme in FIG. 8 requires multiple copies of an object 120 to be stored if multiple users 110 require read access 410, the scheme in FIG. 12 only requires a single copy of each object 120 to be stored. The cryptographic assurance scheme is also more efficient with respect to updates. While the scheme in FIG. 8 requires all copies of an object 120 to be individually updated for updates to be propagated to all users 110, the scheme in FIG. 12 only has a single copy of each object 120 and therefore any object 120 updates will be automatically and immediately visible to all users 110, as shown in FIG. 13. FIG. 14 illustrates the result of adding a new object 120 to the scheme from FIG. 12.

Figure 15:
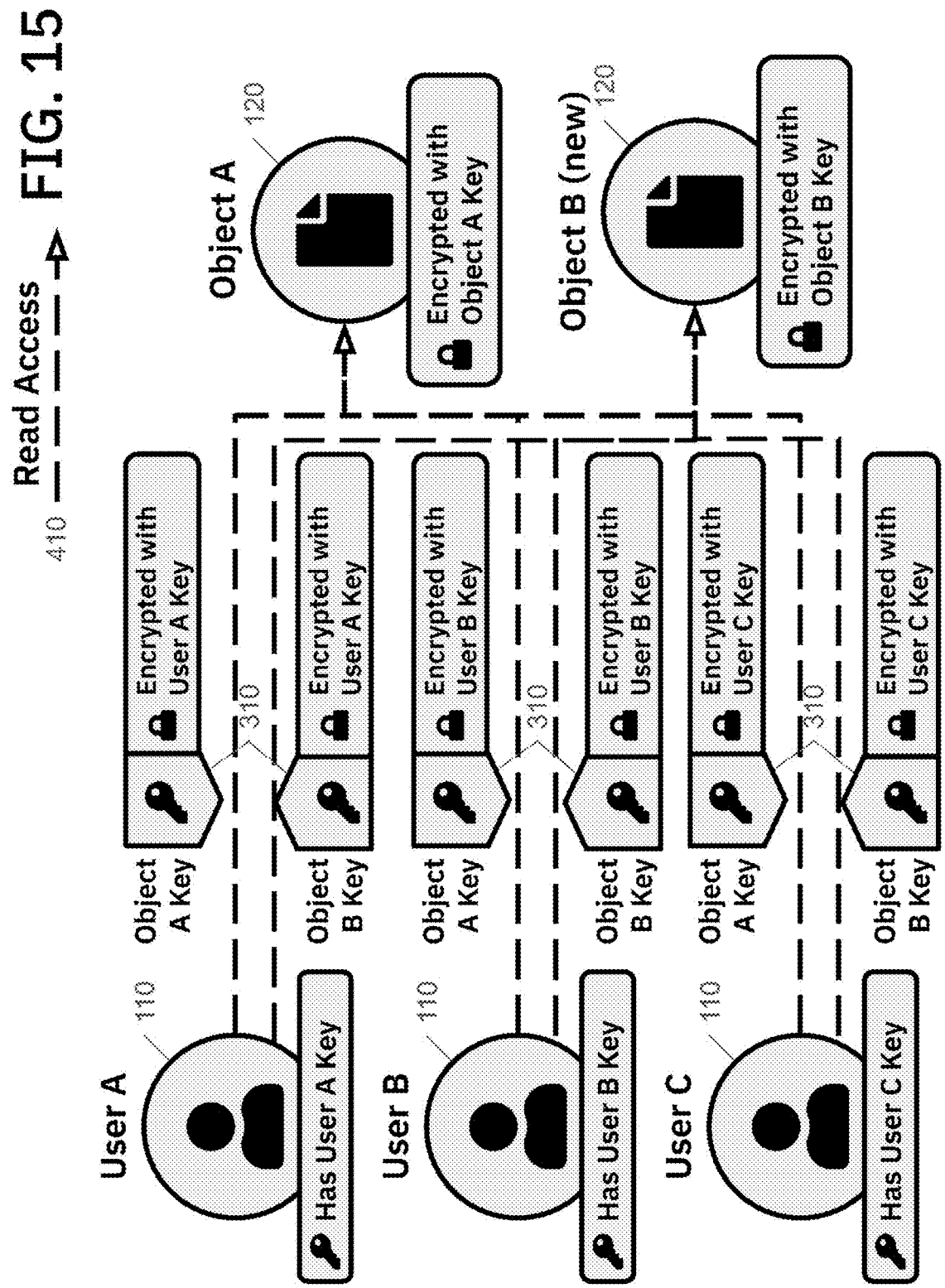
FIG. 15 shows three users with read access to two encrypted objects using encrypted keys according to one embodiment of the present disclosure.

In one embodiment, the data access policy illustrated in FIG. 14 is implemented via the cryptographic assurance scheme in FIG. 15, whereby each read access 410 permission is implemented via an independent encryption of the corresponding object 120 key 320 under the corresponding user key 310. An object 120 can be added to the scheme in FIG. 13 to produce the scheme in FIG. 15 by creating a new object 120 key 320, encrypting the object 120 with the new key, and storing the encrypted object 120, then creating edges from the users 110 with read access 410 to the object 120, encrypting the object 120 key 320 with each of the user key 310s, and storing the encrypted object 120 key 320s as properties of the edges in the graph database 210.

Figure 16:
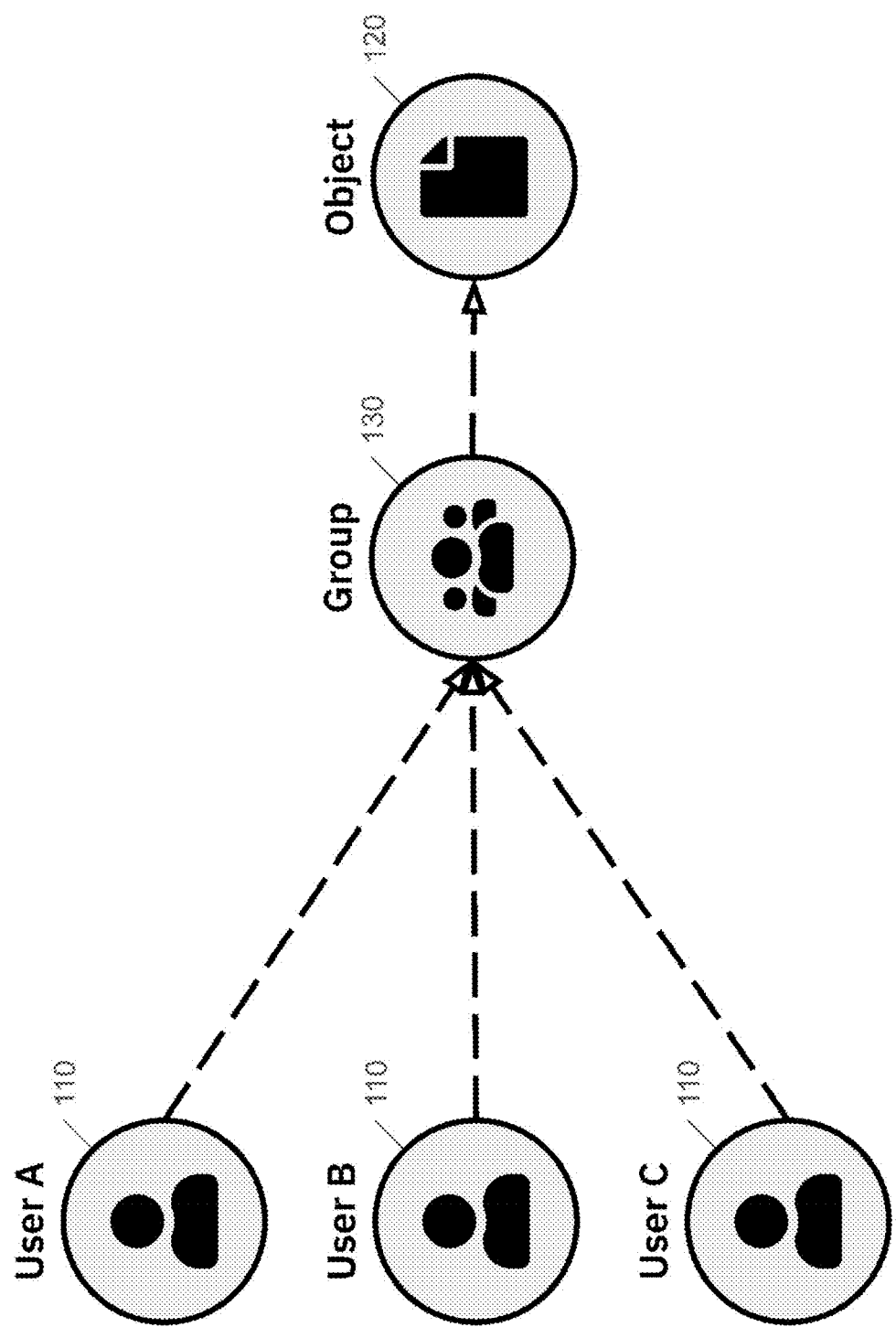
FIG. 16 shows a group of users with read access to an encrypted object according to one embodiment of the present disclosure.
Figure 17:
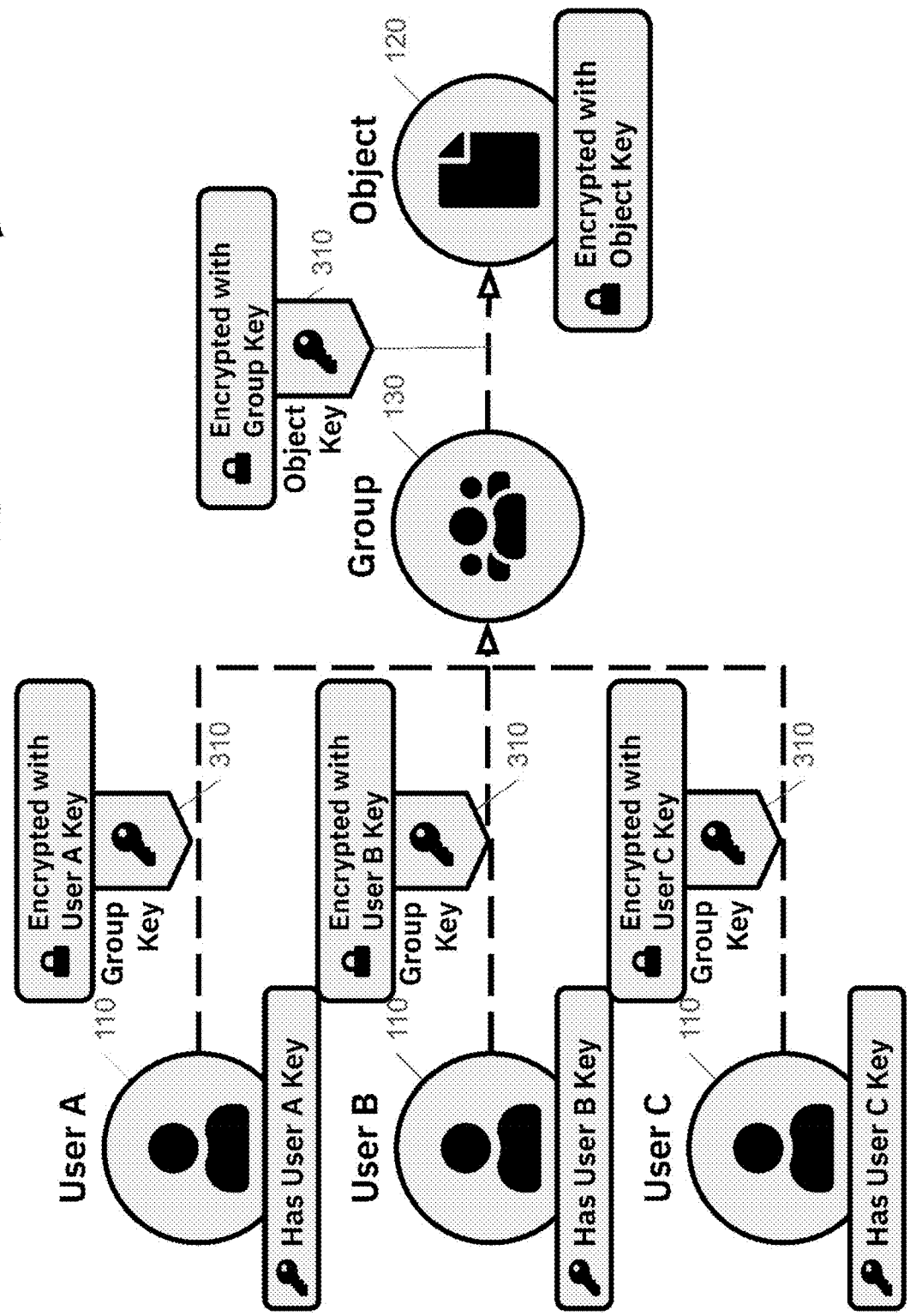
FIG. 17 shows a group of users with read access to an encrypted object using encrypted keys according to one embodiment of the present disclosure.

In one embodiment, the data access policy illustrated in FIG. 5 is represented by the equivalent data access policy in FIG. 16 and is implemented using the cryptographic assurance scheme in FIG. 17. The data access policy in FIG. 16 has the same effect as the data access policy in FIG. 5, namely, allowing three users 110 to have read access 410 to the same object 120. However, FIG. 16 provides the three users 110 read access 410 to a group 130, and provides the group 130 read access 410 to the object 120. FIG. 17 is a cryptographic assurance scheme implementing the data access policy in FIG. 16. The object 120 is stored encrypted with a unique object 120 key 320, which is stored encrypted with a group key 330 (as a property of the edge connecting the group 130 and the object), which is in turn stored in three copies each encrypted with one of the user key 310s (each stored on the edge between the group 130 and the corresponding user). When the user 110 wishes to read the object 120, the user may submit a request to the graph database 210 requesting to read the object 120. After authenticating the user 110 and validating their request, the graph database 210 returns both the object 120 (encrypted by the object 120 key 320) and object 120 key 320 (encrypted by the user key 310) to the user 110. The user 110 can then decrypt the object 120 key 320 using their user key 310 and use the object 120 key 320 to decrypt and read the object 120. Any user 110 who does not have read access 410 will not be able to decrypt the object 120 key 320 and therefore will not be able to decrypt the object 120.

Although the policy illustrated in FIG. 16 is substantially the same in its effect to the policy shown in FIG. 5, the resulting cryptographic scheme of FIG. 17 is technically advantageous in some ways over the corresponding scheme of FIG. 12. One advantage of this scheme is that adding new objects 120 to the group 130 may require only one cryptographic operation, as shown in FIG. 18, as opposed to the three operations required to have the equivalent effect in FIG. 15. Furthermore, the resulting scheme requires the storage of just 5 encrypted keys, as shown in FIG. 18, compared to the 6 keys required in FIG. 15. The policy based on intermediate nodes such as groups 130 may be easier to manage and store, and a more natural fit for complex organizational structures, than a policy involving direct connections between all users 110 and data objects 120. Therefore, in one embodiment, the policy from FIG. 5 is automatically optimized into the equivalent policy of FIG. 16, for example through the use of graph processing algorithms. However, the scheme in FIG. 17 relative to the scheme in FIG. 12 may require an additional cryptographic operation to decrypt a data object 120, causing access latency to potentially be increased.

Figure 19A:
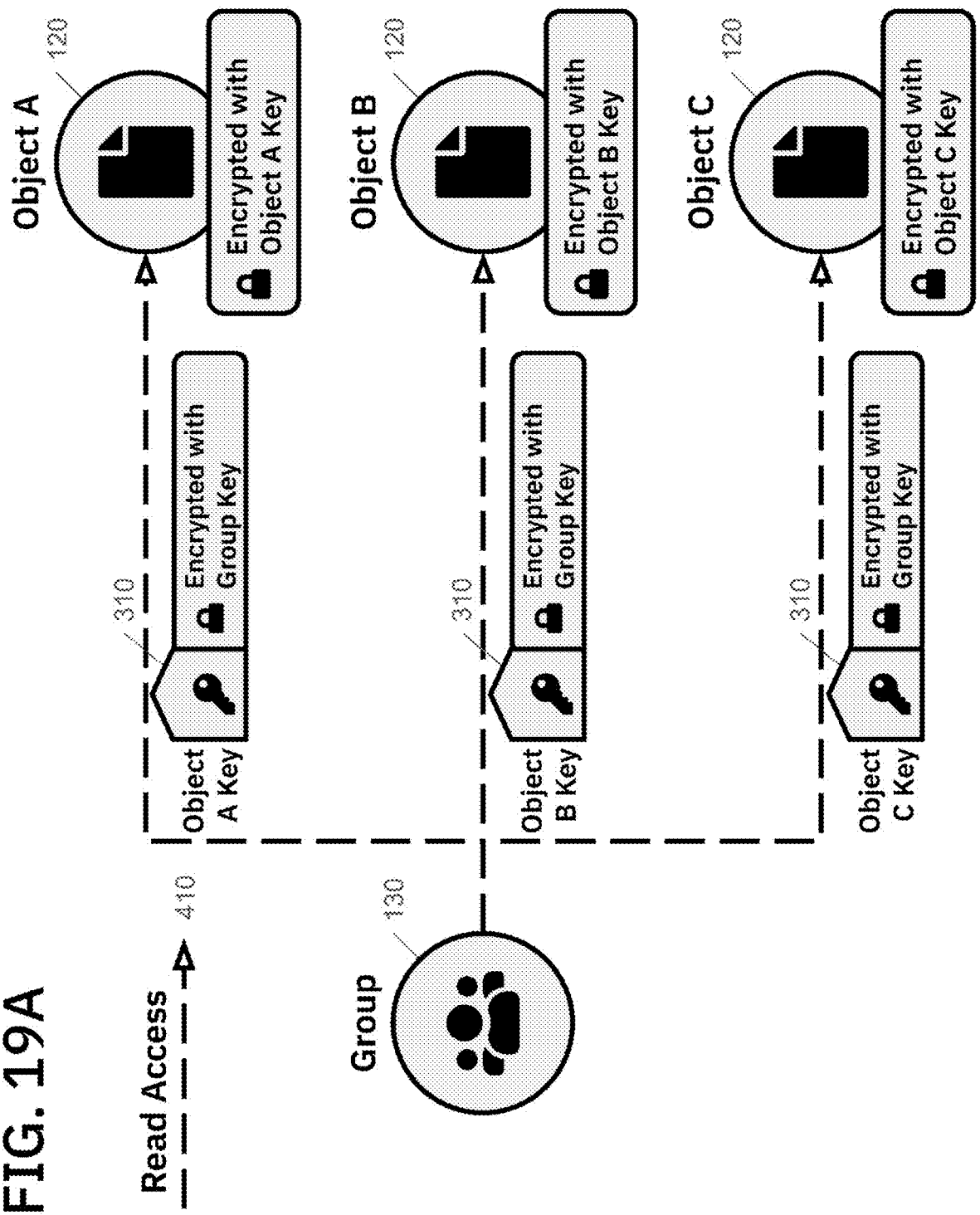
FIG. 19A shows a group with read access to three encrypted objects using encrypted keys according to one embodiment of the present disclosure.
Figure 19B:
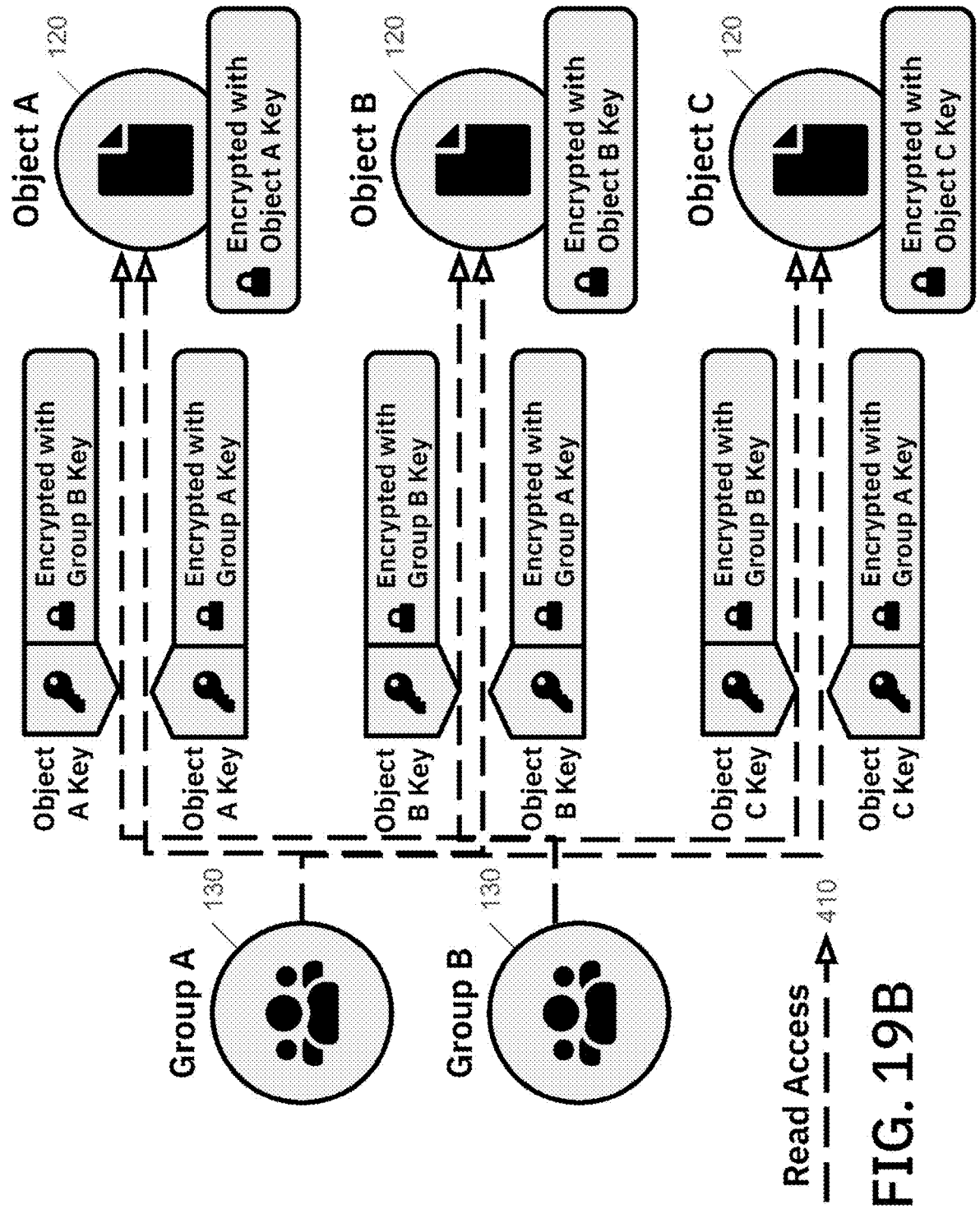
FIG. 19B shows two groups with read access to three encrypted objects using encrypted keys according to one embodiment of the present disclosure.
Figure 20:
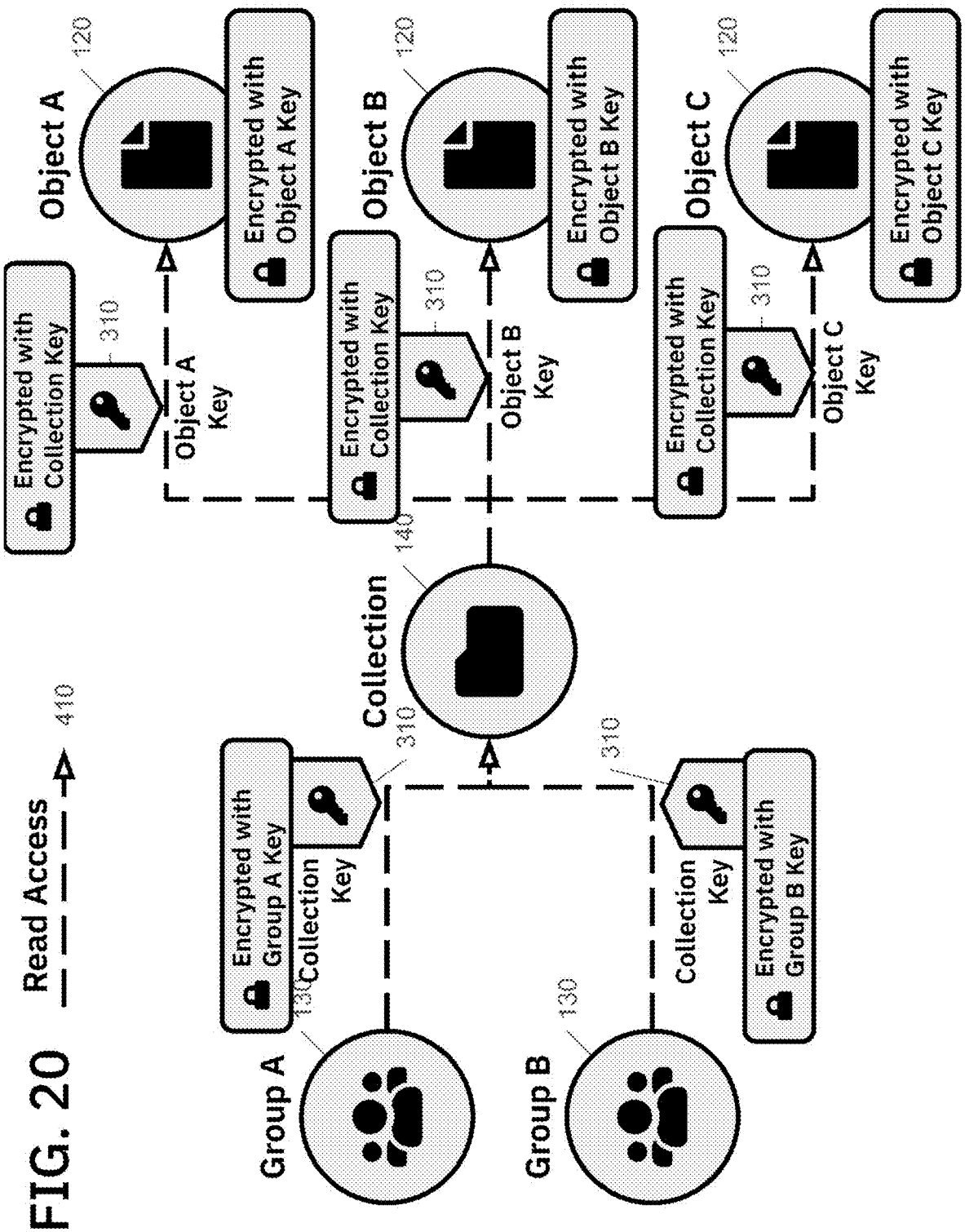
FIG. 20 shows two groups with read access to a collection of objects using encrypted keys according to one embodiment of the present disclosure.

Consider the scenario where a group 130 of users 110 requires access to a collection 140 of three objects 120, as shown in FIG. 19A. Per the previously described method, each object 120 is encrypted with its own object 120 key 320, each of which are in turn encrypted with a group key 330. As before, one or more users 110 can decrypt the group key 330 using their own key, allowing them to access any of the shared objects 120 via the group 130. Consider, now, the scenario where a separate group 130 of users 110 requires access to the same collection 140 of files. Separately encrypting each of the object 120 key 320s with the group key 330 of the new group 130 is one way to achieve this, as shown in FIG. 19B. Alternatively, in one embodiment, the three data objects 120 may be grouped into a collection 140, as shown in FIG. 20. Grouping objects 120 into a collection 140 has similar advantages to grouping users 110 into a group; namely, that the scheme of FIG. 20 requires only five encrypted keys as opposed to the six keys of FIG. 19B, and adding or removing new groups 130 or objects 120 to the collection 140 requires just one cryptographic operation as opposed to several in FIG. 19B. However, as with user 110 groups 130, there is the potential of requiring additional operations for each access request due to having to go through the collection 140 rather than accessing data objects 120 directly.

Figure 21:
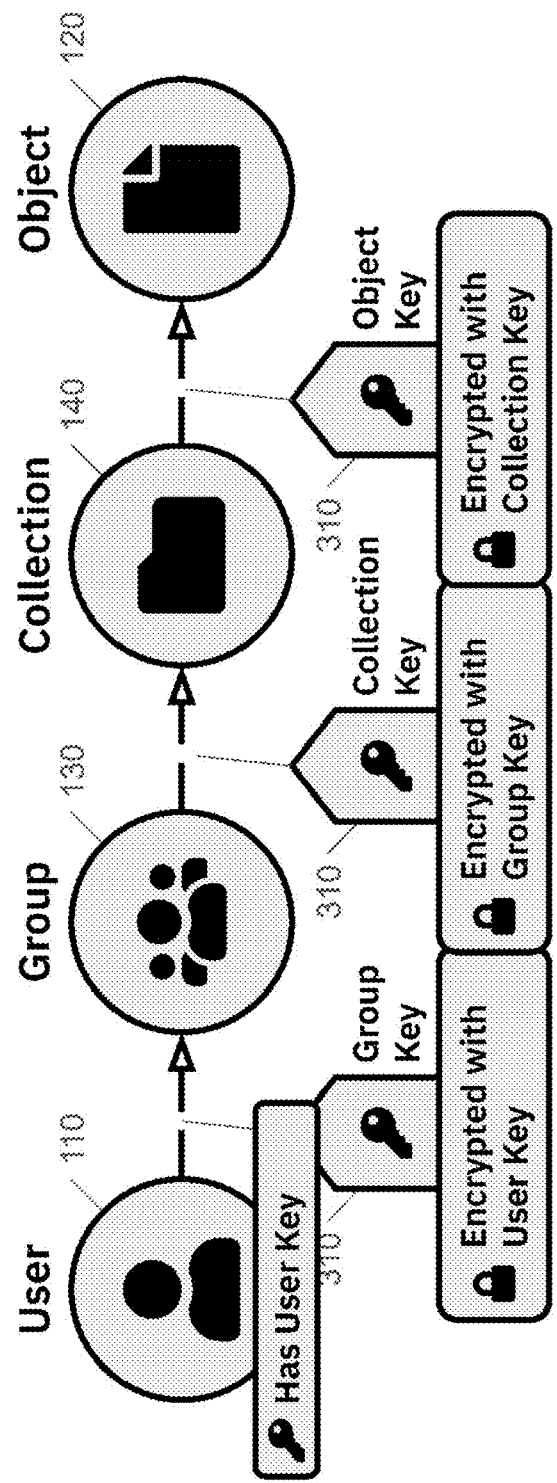
FIG. 21 shows a data access policy with groups and collections according to one embodiment of the present disclosure.
Figure 22:
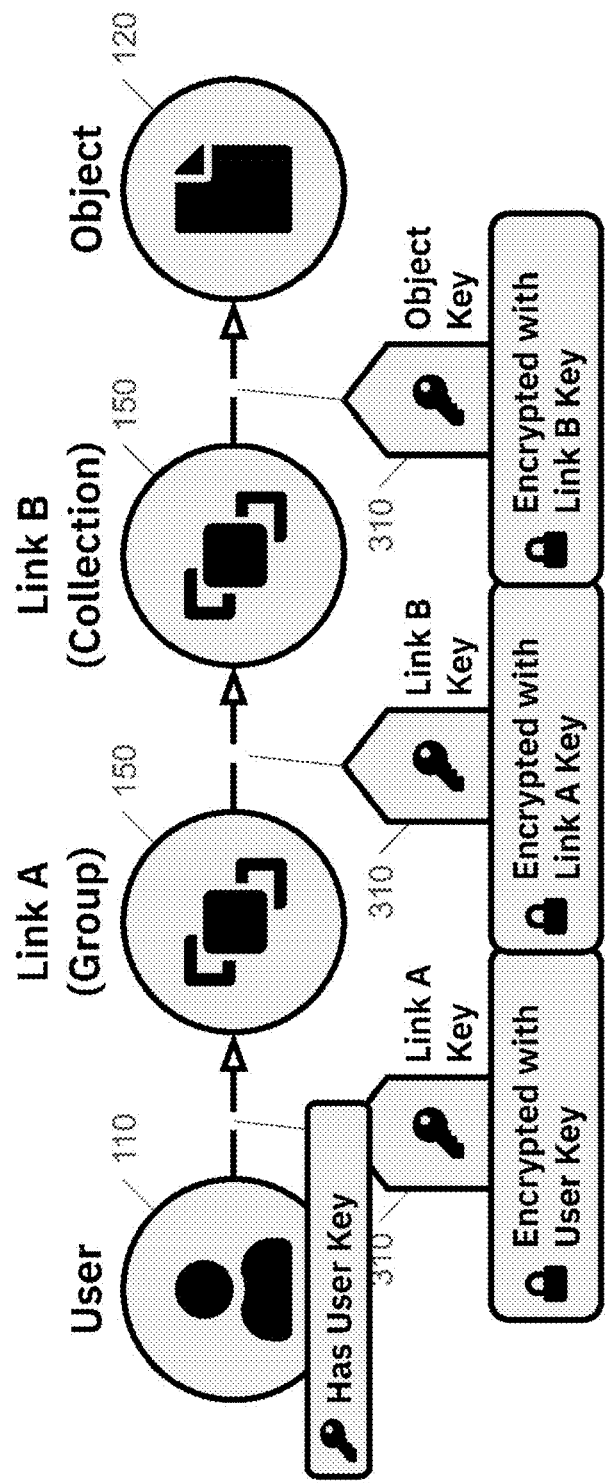
FIG. 22 shows a data access policy with links and encrypted keys according to one embodiment of the present disclosure.

In one embodiment, shown in FIG. 21, both of the above optimizations are included in the same system; namely, users 110 are grouped into one or more groups 130, and objects 120 are grouped into one or more collections 140. To access an object 120, a user 110 must first decrypt a group key 330 with their user key 310, then decrypt a collection key 340 with the group key 330, then decrypt an object 120 key 320 with the collection key 340, and finally decrypt the object 120 with the object 120 key 320. Note that although groups 130 and collections 140 serve different semantic purposes, their role in the underlying cryptographic scheme is substantially the same; namely, they both serve as a cryptographic intermediary for accessing objects 120. Therefore, both groups 130 and collections 140 may be considered a type of junction or link 150, as shown in FIG. 22. The use of links 150 to represent arbitrary semantic groupings of users 110, objects 120, or even groups 130 of groups 130, allows for any desired access policy to be implemented cryptographically; as long as some path between a user 110 and an object 120 exists, potentially through one or more links 150, with link keys 359 connecting each key in the graph, the user 110 will be able to access the object 120, as shown in FIG. 23.

Figure 24:
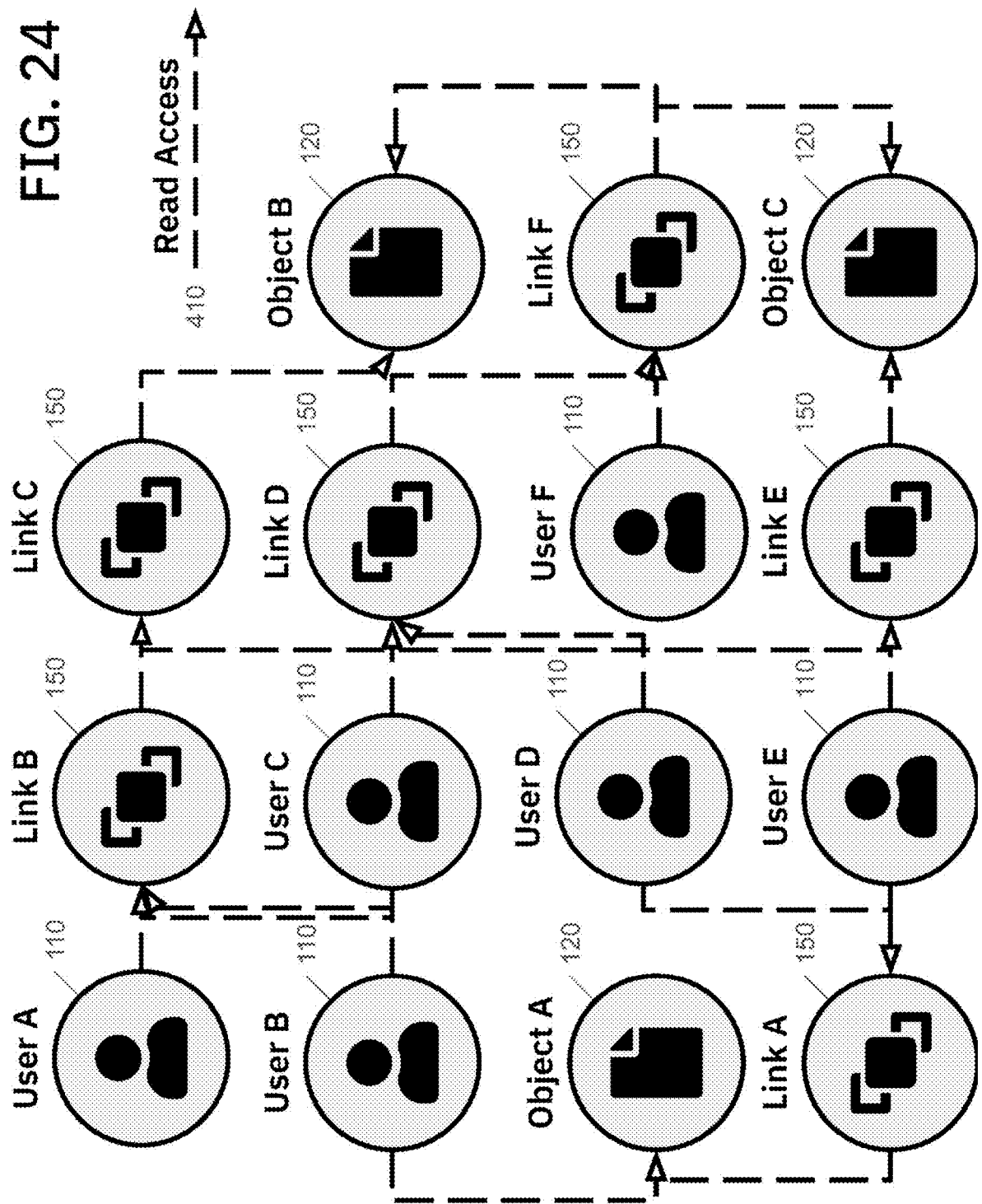
FIG. 24 shows a complex data access policy according to one embodiment of the present disclosure.
Figure 25:
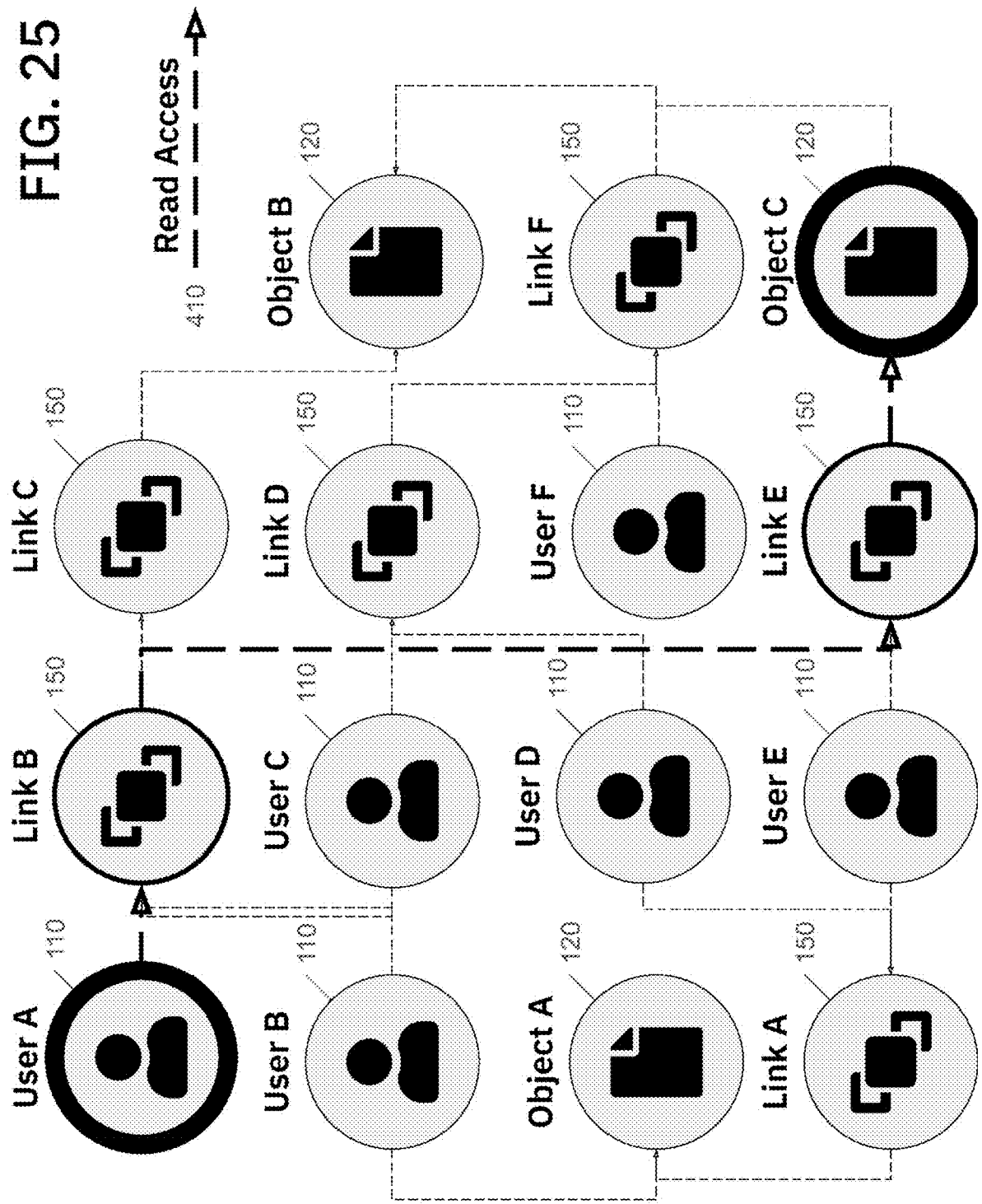
FIG. 25 shows a shortest path query according to one embodiment of the present disclosure.
Figure 26:
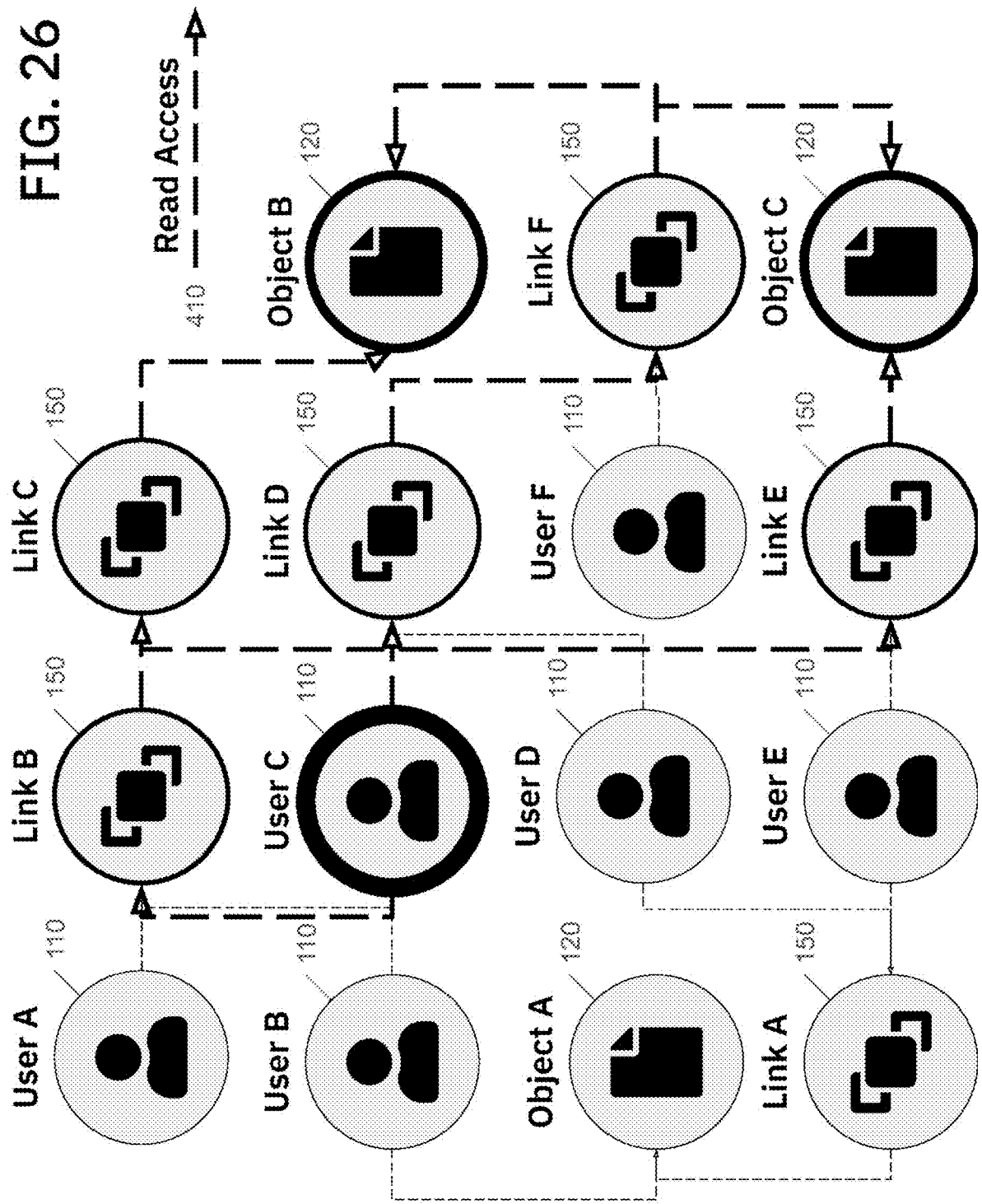
FIG. 26 shows a user reach query according to one embodiment of the present disclosure.
Figure 27:
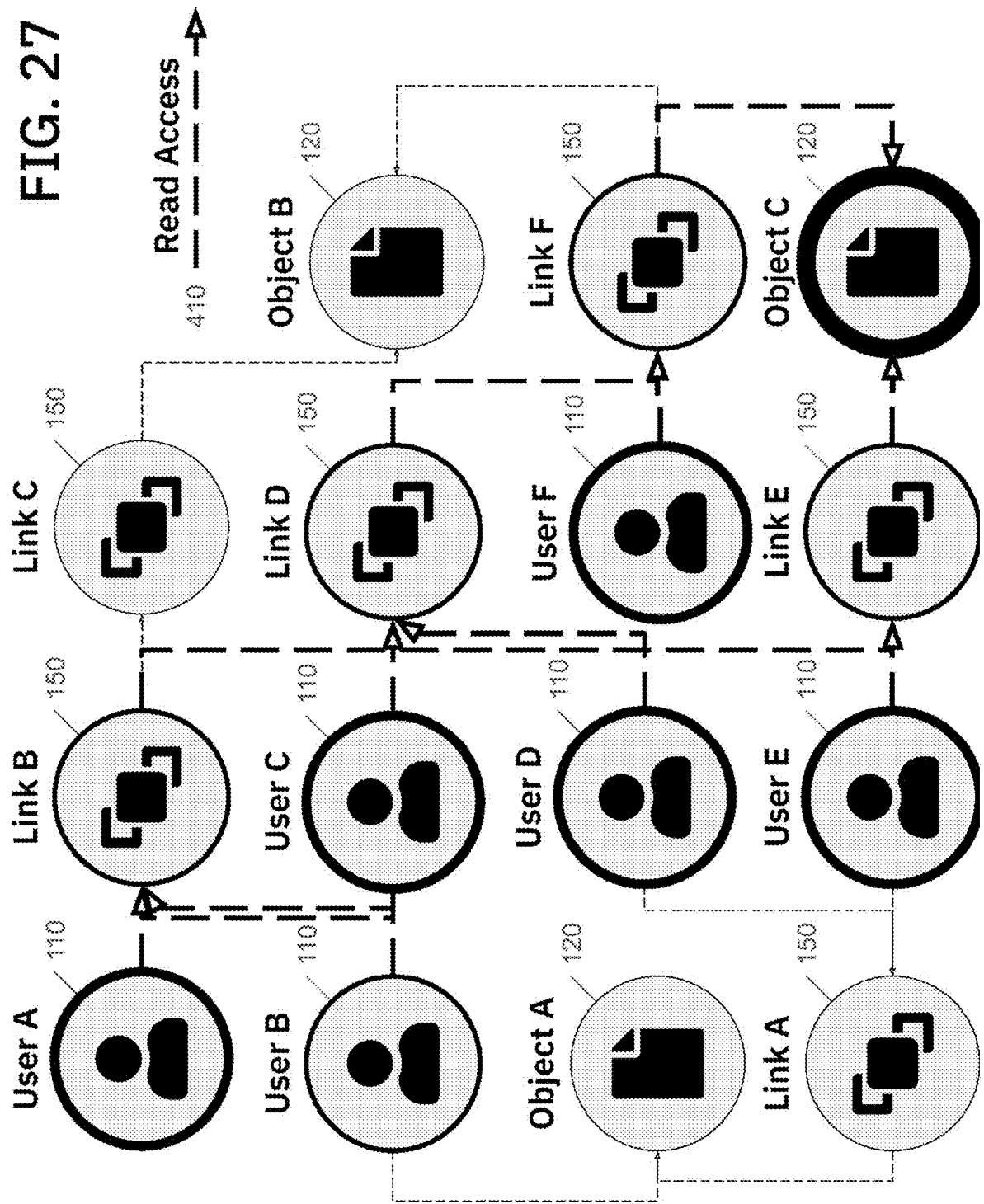
FIG. 27 shows an object reachability query according to one embodiment of the present disclosure.

FIG. 24 shows that in one embodiment, an arbitrarily complex data access policy may be implemented using the proposed scheme of representing users 110, links 150, and objects 120 as nodes on a directed graph, and connecting these nodes with edges containing link keys 359. The use of a graph encoding allows for graph processing algorithms to be used to perform advanced queries on the data access structure. Consider, for example, that in one embodiment, user 110 A wishes to access object 120 C. The most efficient way for user 110 A to access object 120 C may be determined via a shortest path algorithm, as shown in FIG. 25. In this case, the shortest path algorithm has determined that accessing object 120 C via Link B and then Link E is the most efficient way to do so, requiring only 2 intermediate links 150. In another embodiment, user 110 C wishes to obtain a list of all objects 120 they have read access 410 to. This can be accomplished through the use of a depth-first search (DFS) or breadth-first search (BFS) algorithm to generate a full list of objects 120 which can be accessed by user 110 C, as shown in FIG. 26. In this case, by leveraging all the links 150 available to them, user 110 C can access object 120 B and object 120 C. In another embodiment, it is desired to obtain a full list of users 110 who can access object 120 C. This can be accomplished through the use of a depth-first search (DFS) or breadth-first search (BFS) algorithm to generate a full list of users 110 which can access object 120 C, as shown in FIG. 27. Overall, the use of a directed graph data structure to represent data access policies provides powerful auditing and analytical capabilities via the use of graph processing algorithms. However, complex graph processing algorithms benefit from a system intended specifically for this purpose. Therefore, the use of a graph database 210 for such a system is suggested, as shown in FIG. 28.

Figure 28:
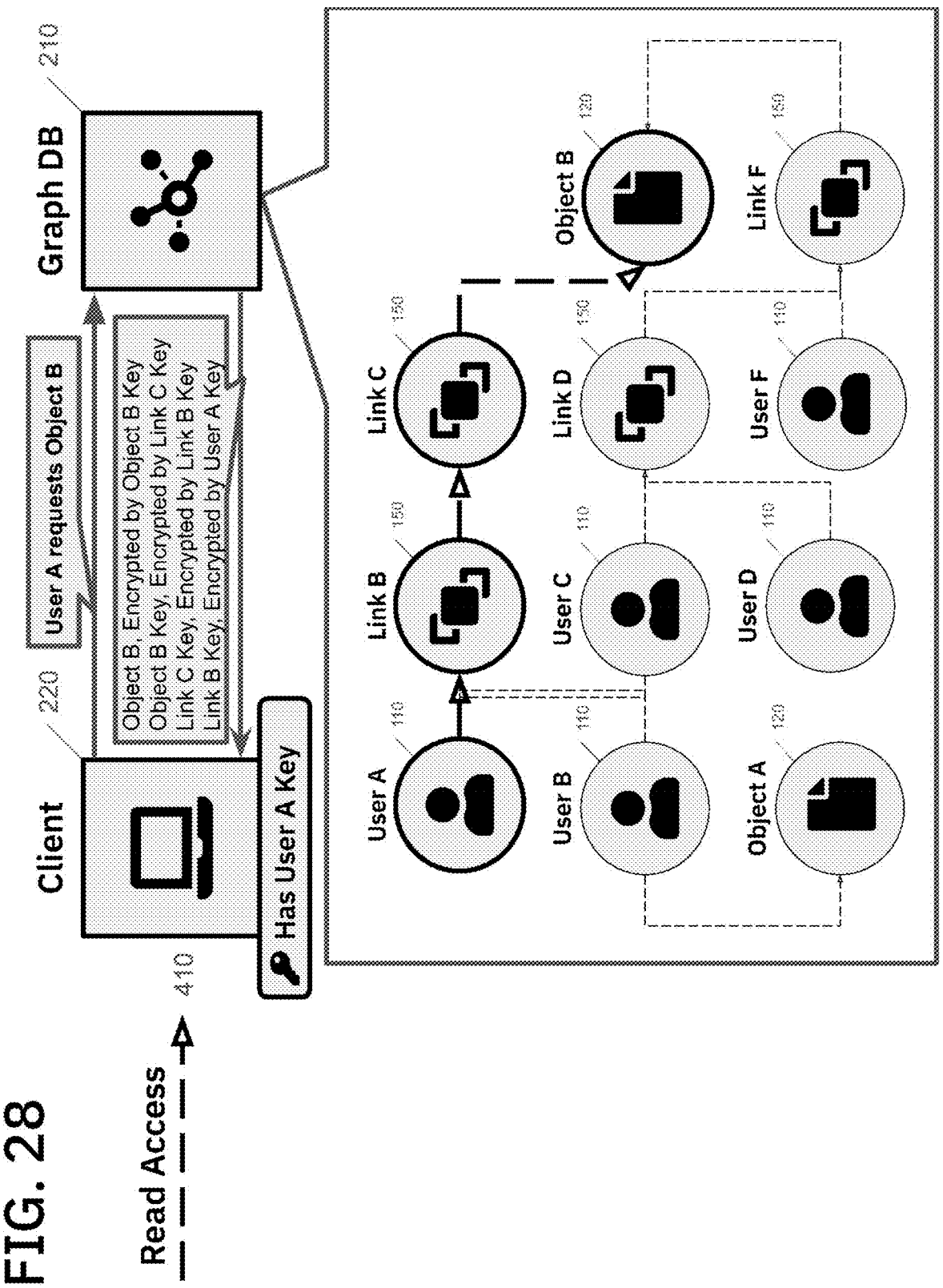
FIG. 28 shows a system and method for cryptographically-assured data access management with a graph database according to one embodiment of the present disclosure.

In one embodiment, shown in FIG. 28, a graph database 210 contains a cryptographic model of a desired data access pattern, represented as a directed graph, along with several encrypted data objects 120. A user 110 accesses a data object 120 by sending an authenticated request to the graph database 210, which returns the encrypted data object 120, along with a set of encrypted keys required to decrypt the data object 120. The user 110 then sequentially decrypts these keys and finally decrypts the requested data object 120.

Figure 29:
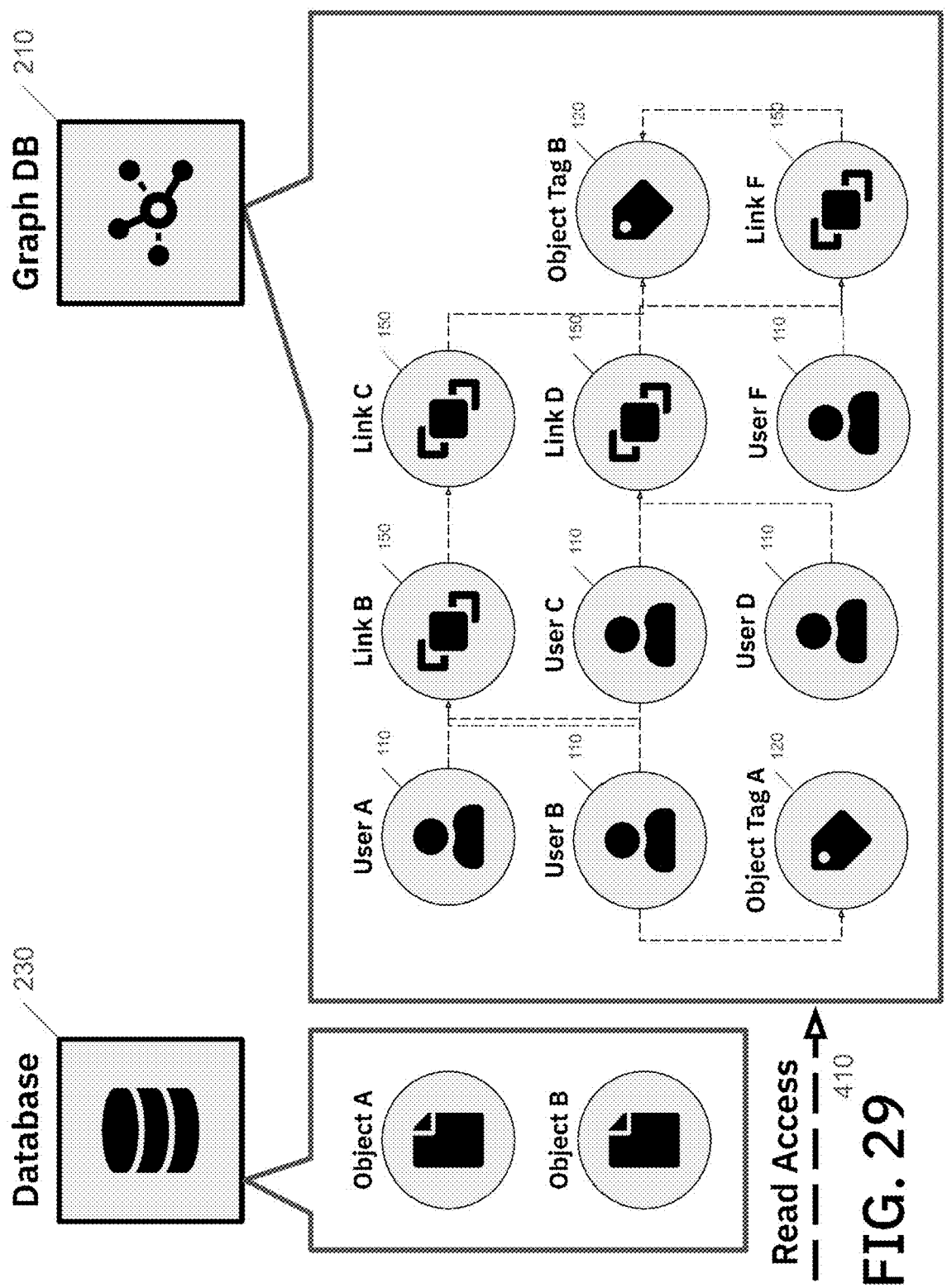
FIG. 29 shows a system and method for cryptographically-assured data access management with a separate file database and graph database according to one embodiment of the present disclosure.
Figure 30:
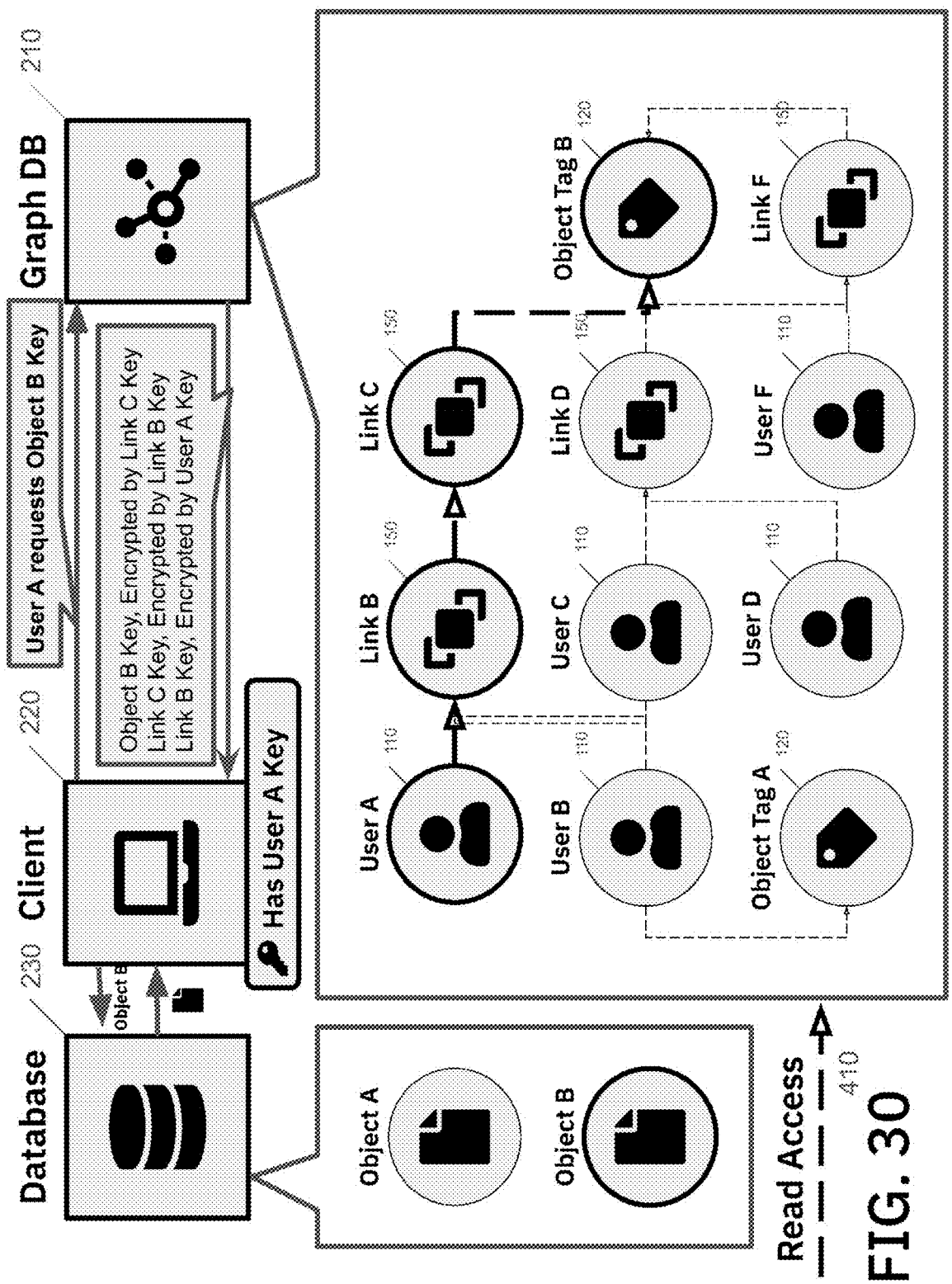
FIG. 30 shows a process of a user querying a system and method for data access management with a separate file database and graph database according to one embodiment of the present disclosure.
Figure 31:
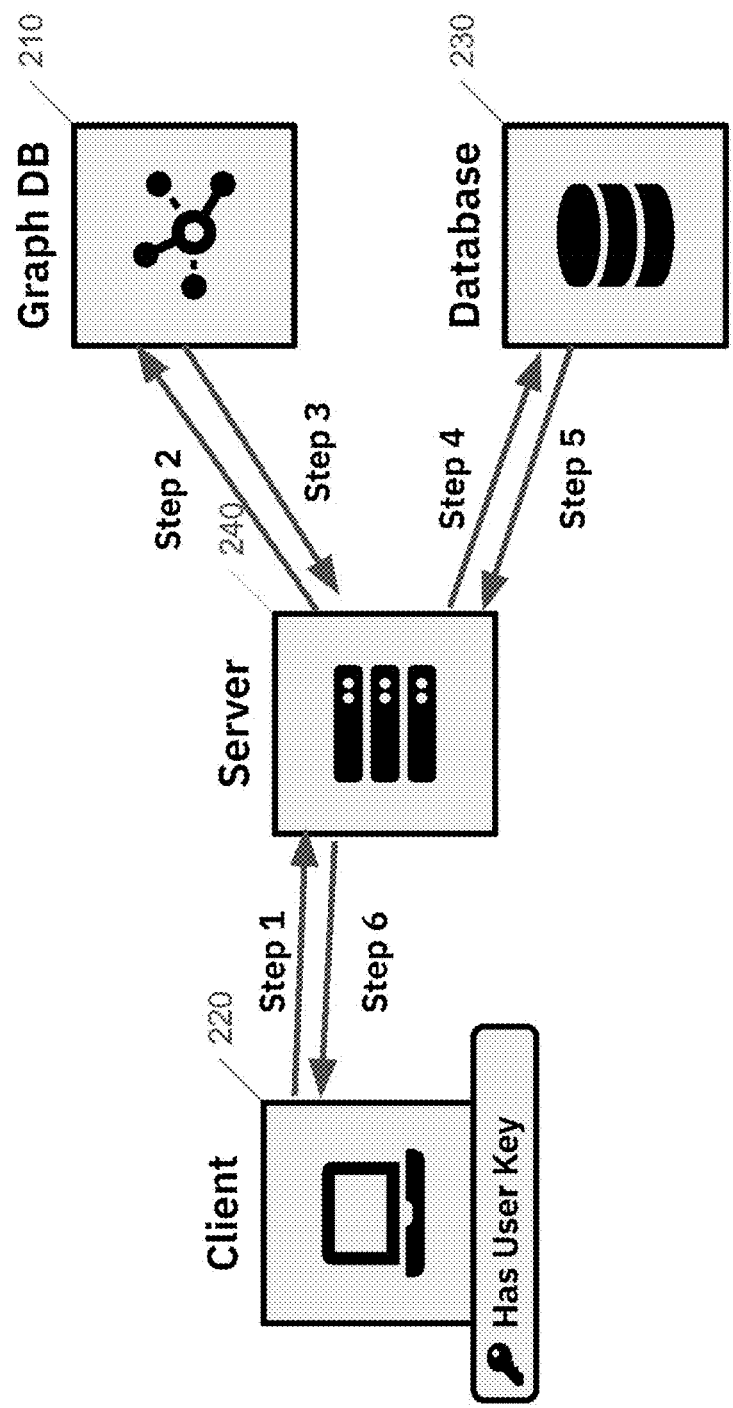
FIG. 31 shows shows a system and method for cryptographically-assured data access management with a separate server, file database, and graph database according to one embodiment of the present disclosure.

Referring now to FIG. 29, in one embodiment, encrypted data objects 120 may be stored separately from the data access patterns in a dedicated database 230. This method may be advantageous as it allows the graph database 210 to be optimized for the graph processing algorithms, such as shortest path, required to determine object 120 access patterns, while a separate database 230 is optimized for storage and delivery of large data objects 120. When a user 110 wishes to access an object 120, they may separately retrieve the encrypted object 120 from the database 230 and the intermediate keys from the graph database 210, as shown in FIG. 30, and then sequentially decrypt the keys and data object 120 as before. Alternatively, the client 220 may make a single data access request, while an intermediate server 240 makes requests to a separate database 230 and graph database 210 in the background to fulfill the request, as shown in FIG. 31.

Figure 32:
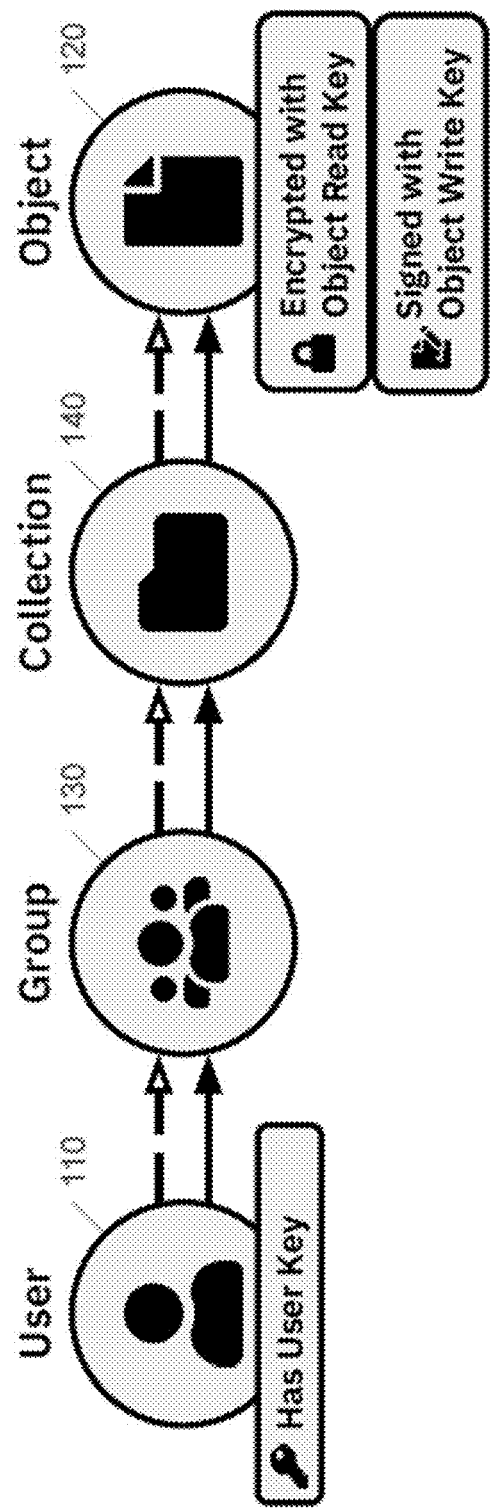
FIG. 32 shows a data access policy with separate read and write permissions according to one embodiment of the present disclosure.
Figure 33:
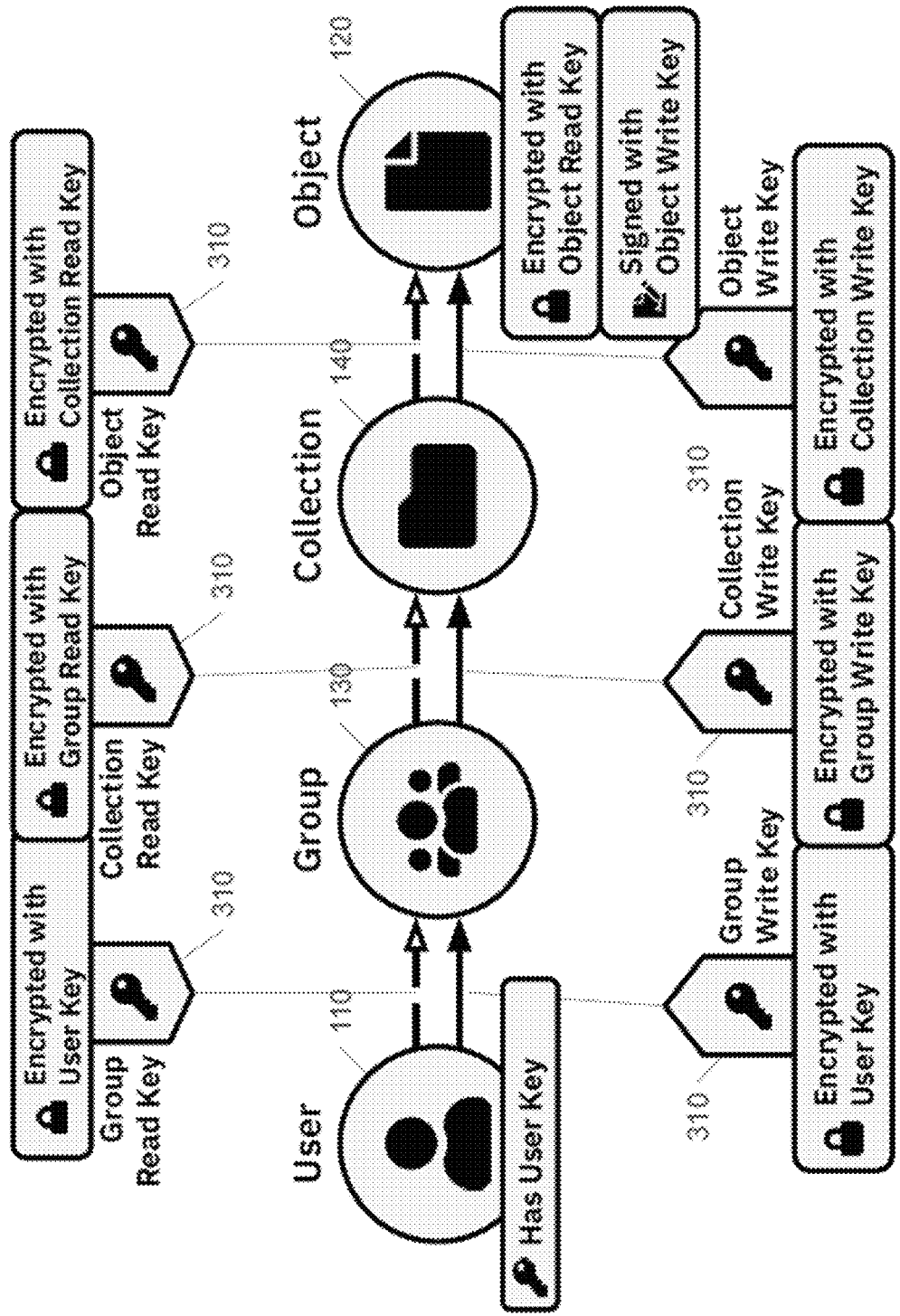
FIG. 33 shows a data access policy with separate read and write permissions using encrypted keys according to one embodiment of the present disclosure.
Figure 34:
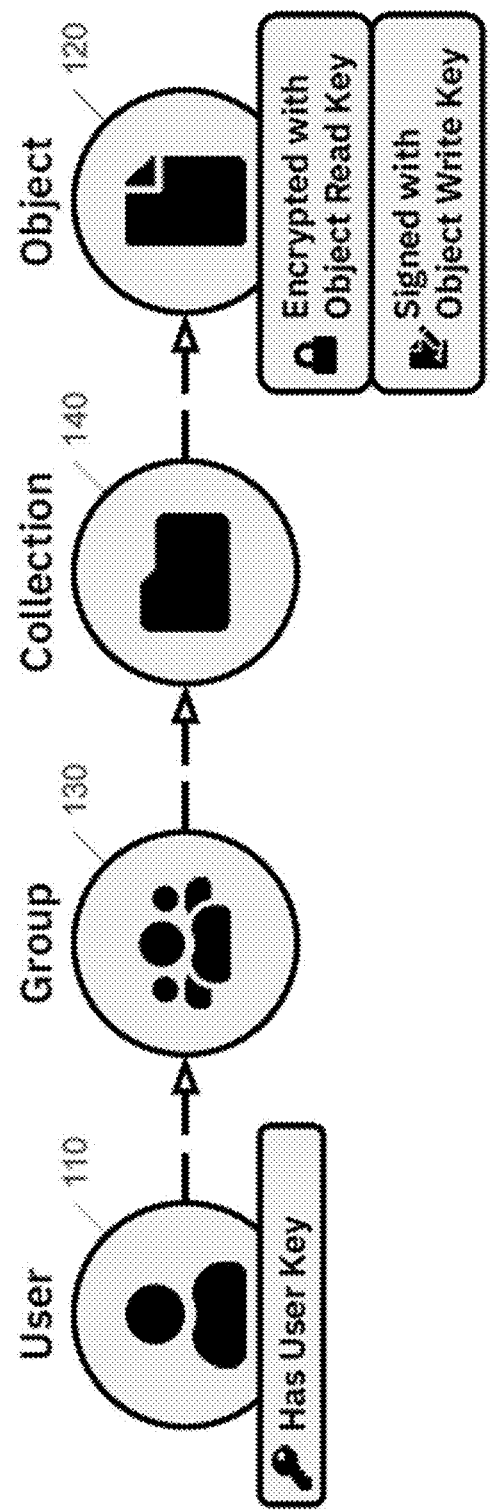
FIG. 34 shows a user with read-only access to an object according to one embodiment of the present disclosure.
Figure 35:
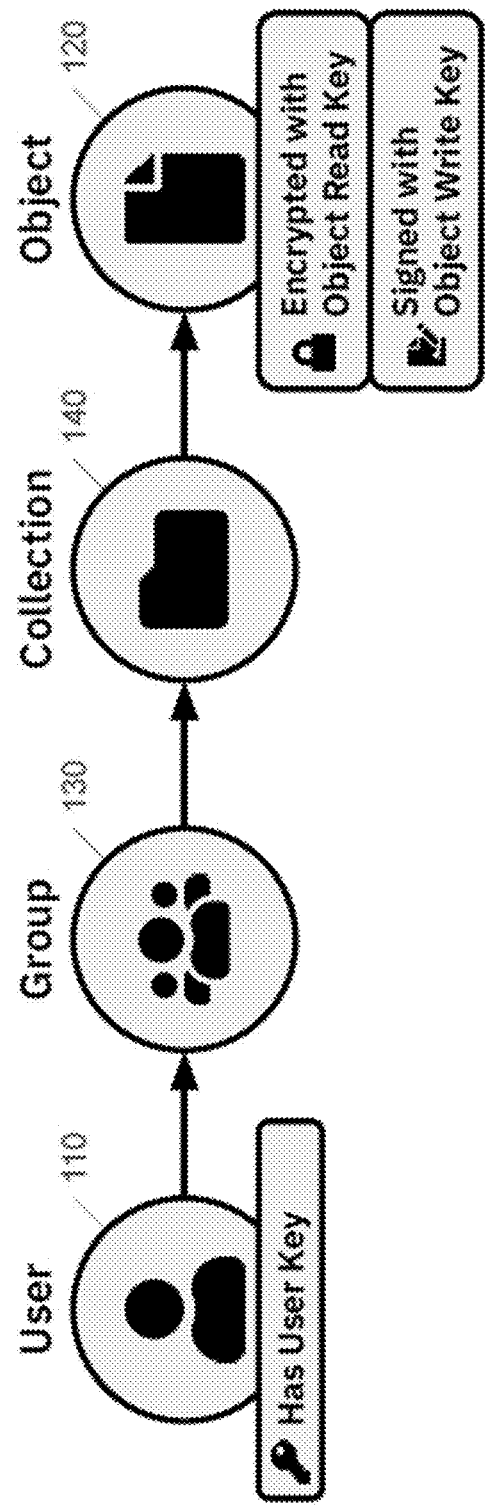
FIG. 35 shows a user with write-only access to an object according to one embodiment of the present disclosure.
Figure 36:
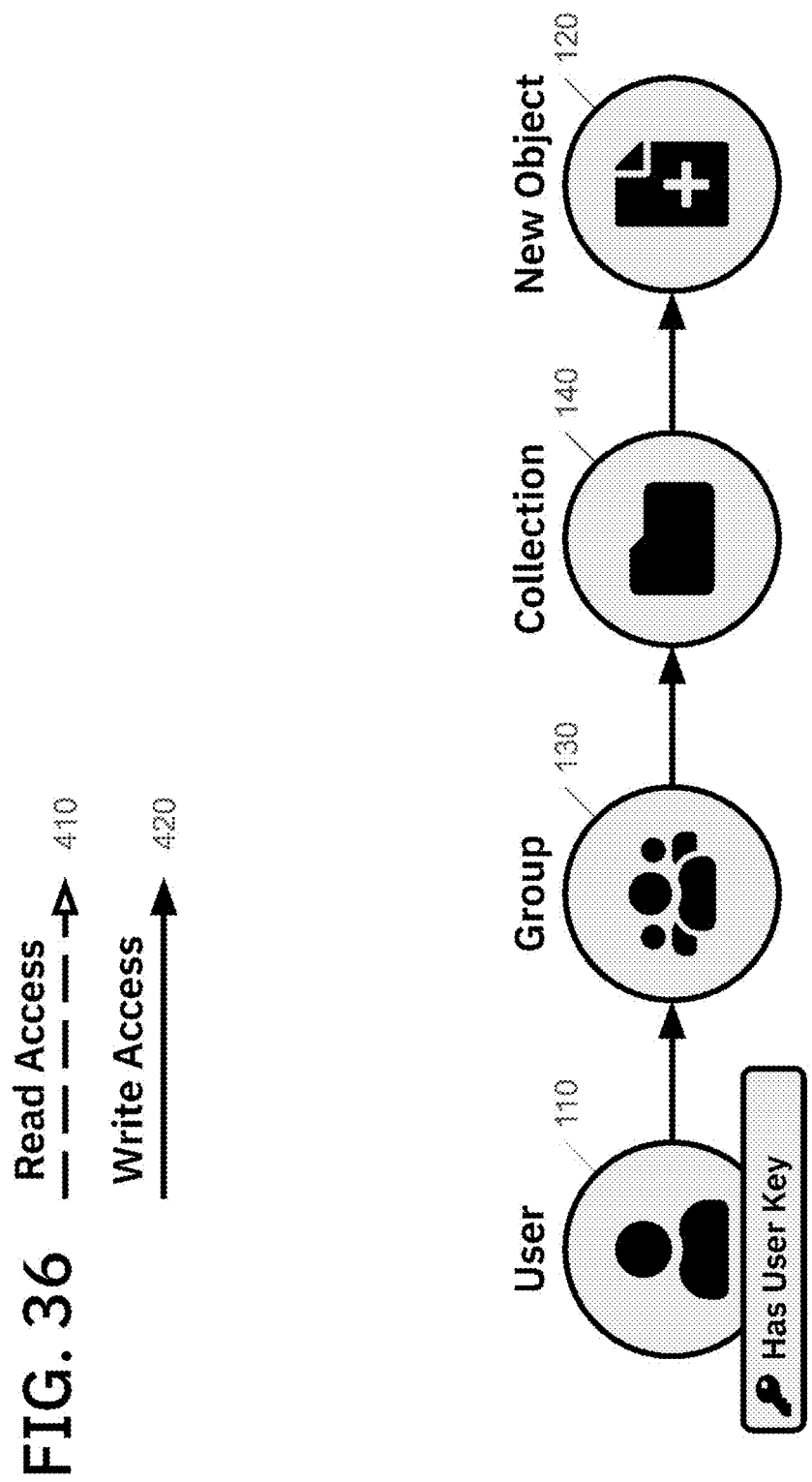
FIG. 36 shows a user with write-only access creating a new object according to one embodiment of the present disclosure.

In one embodiment, read and write access 420 to objects 120 may be independently delegated, as shown in FIG. 32. objects 120 are encrypted with an object 120 read key and are signed with a separate object 120 write key. Access to the read and write keys can be granted separately through independent graph edges, as shown in FIG. 33. Therefore, instead of just having full object 120 access, as shown in FIG. 32, or no access at all, users 110 can also be granted read-only access to certain objects 120, as shown in FIG. 34, or write-only access to certain objects 120, as shown in FIG. 35. When granted read-only access, as shown in FIG. 34, a user 110 may use their key to decrypt an object 120 read key, potentially through one or more intermediate link read keys, which can be used to decrypt and read a data object 120. However, the user 110 will not be able to access the object 120 write key required to sign the object 120 and will therefore not be able to write changes to the object 120. Conversely, when granted write-only access, as shown in FIG. 35, a user 110 can use their key to decrypt an object 120 write key, potentially through one or more intermediate link write keys, which can be used to write and sign a data object 120. A user 110 with write-only access may also be able to create new objects 120, as shown in FIG. 36. However, the user 110 will not be able to access the object 120 read key required to decrypt the object 120 and will therefore not be able to read changes to the object 120. In one embodiment, public-key cryptography is used for the object 120 read and write keys; therefore, a user 110 with read-only access will still be able to verify the signature using the public write key, and a user 110 with write-only access will still be able to encrypt the object 120 using the public read key.

Figure 37:
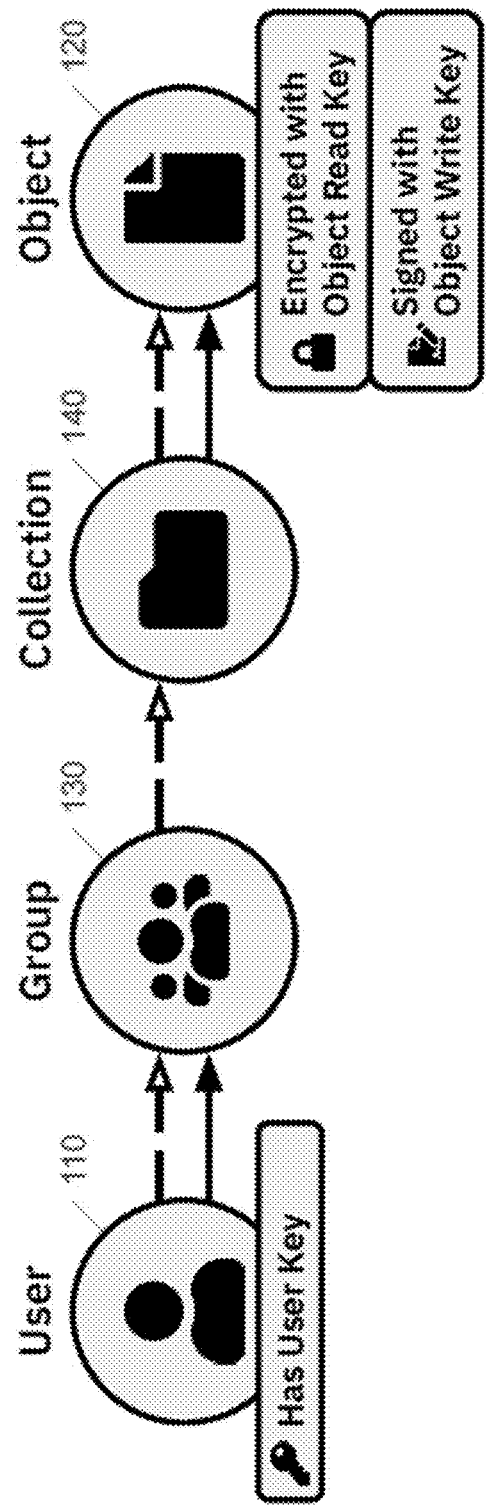
FIG. 37 shows a user lacking write access to an object according to one embodiment of the present disclosure.
Figure 38:
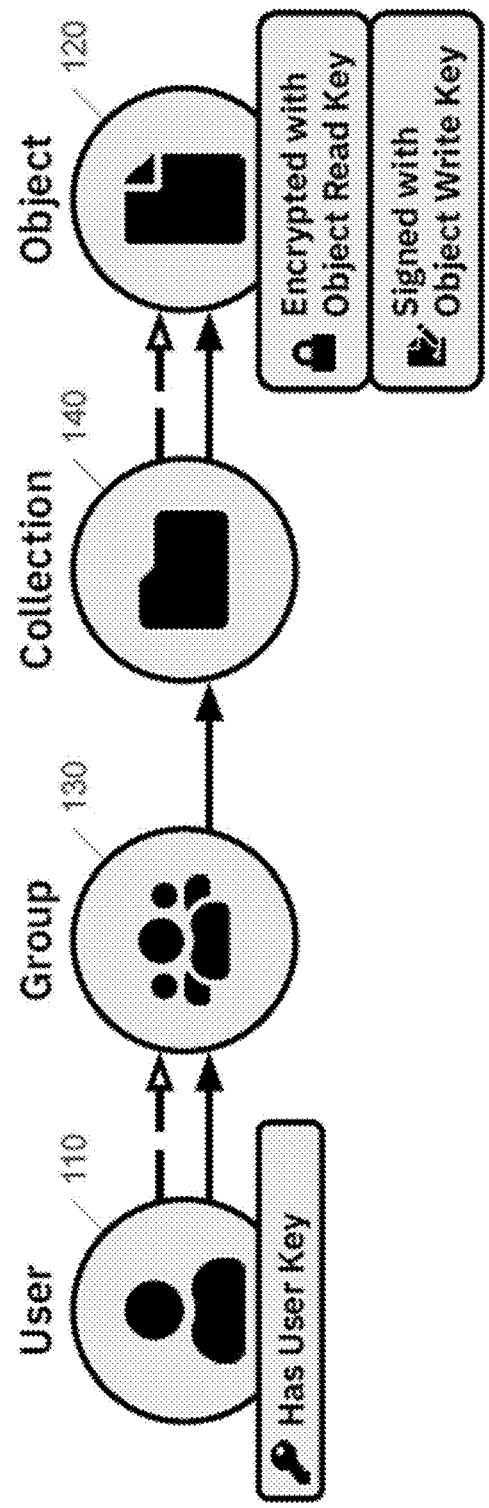
FIG. 38 shows a user lacking read access to an object according to one embodiment of the present disclosure.

FIG. 37 shows that an unbroken chain of write access 420 may be required to have write access 420 to an object 120. Per the example of FIG. 37, the group 130 does not have write access 420 to the collection 140, and therefore the user 110 lacks write access 420 to the object 120, as they will not be able to decrypt the write key of the collection 140 using the write key of the group 130. Similarly, FIG. 38 shows that an unbroken chain of read access 410 may be required to have read access 410 to an object 120. Per the example of FIG. 38, the group 130 does not have read access 410 to the collection 140, and therefore the user 110 lacks read access 410 to the object 120, as they will not be able to decrypt the read key of the collection 140 using the read key of the group 130.

Figure 39:
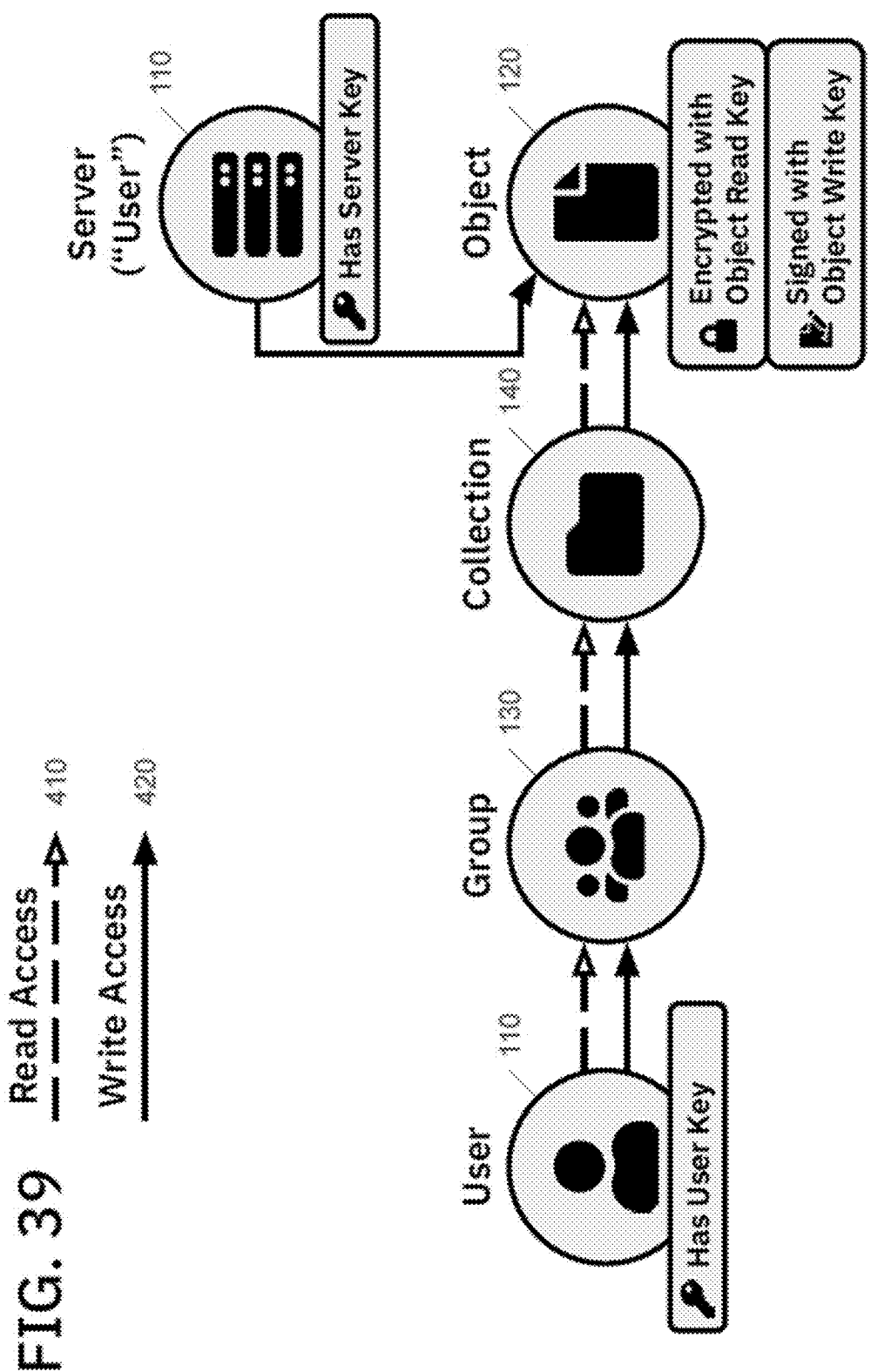
FIG. 39 shows a server with write access to an object according to one embodiment of the present disclosure.
Figure 40:
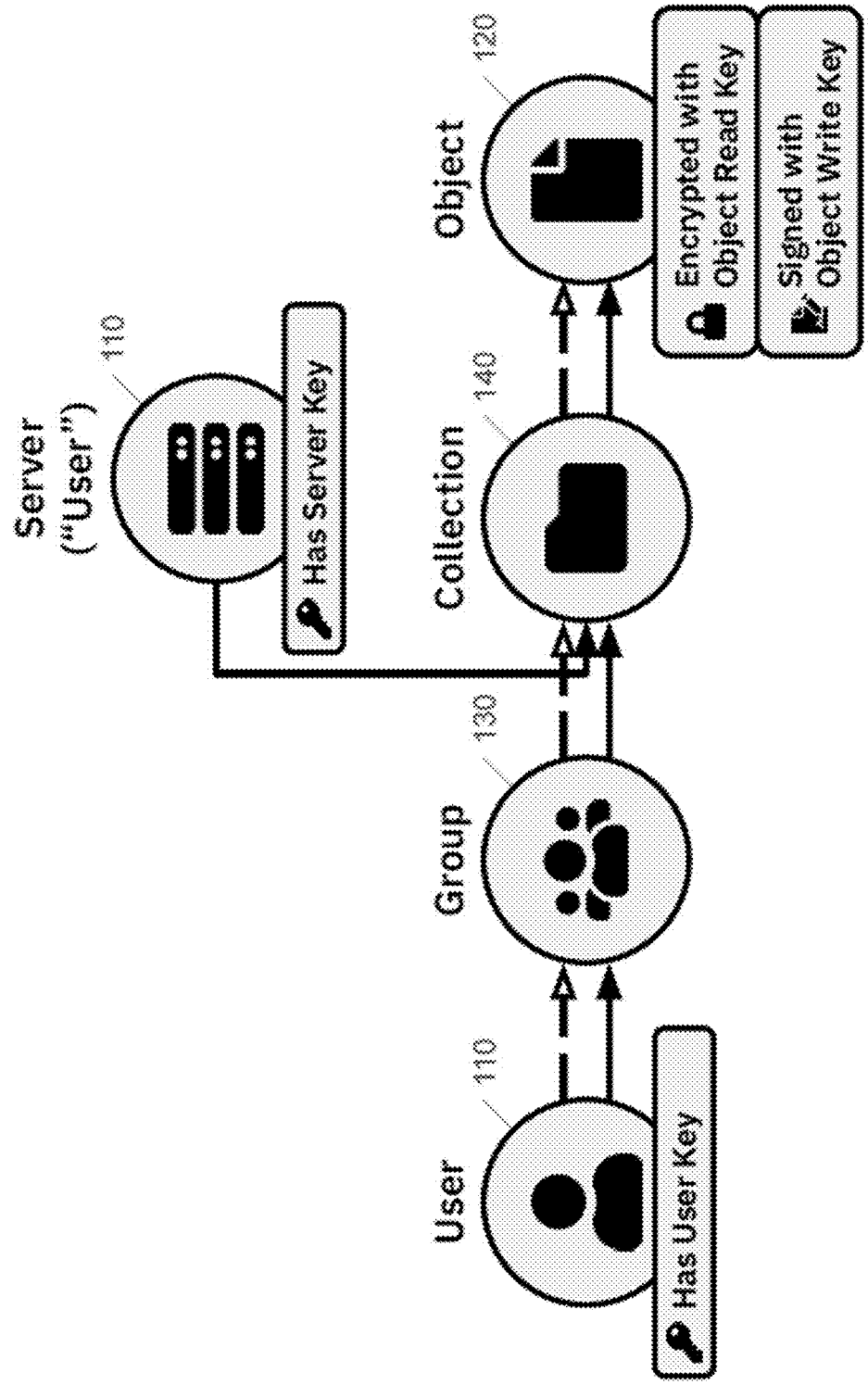
FIG. 40 shows a server with write access to a collection according to one embodiment of the present disclosure.
Figure 41:
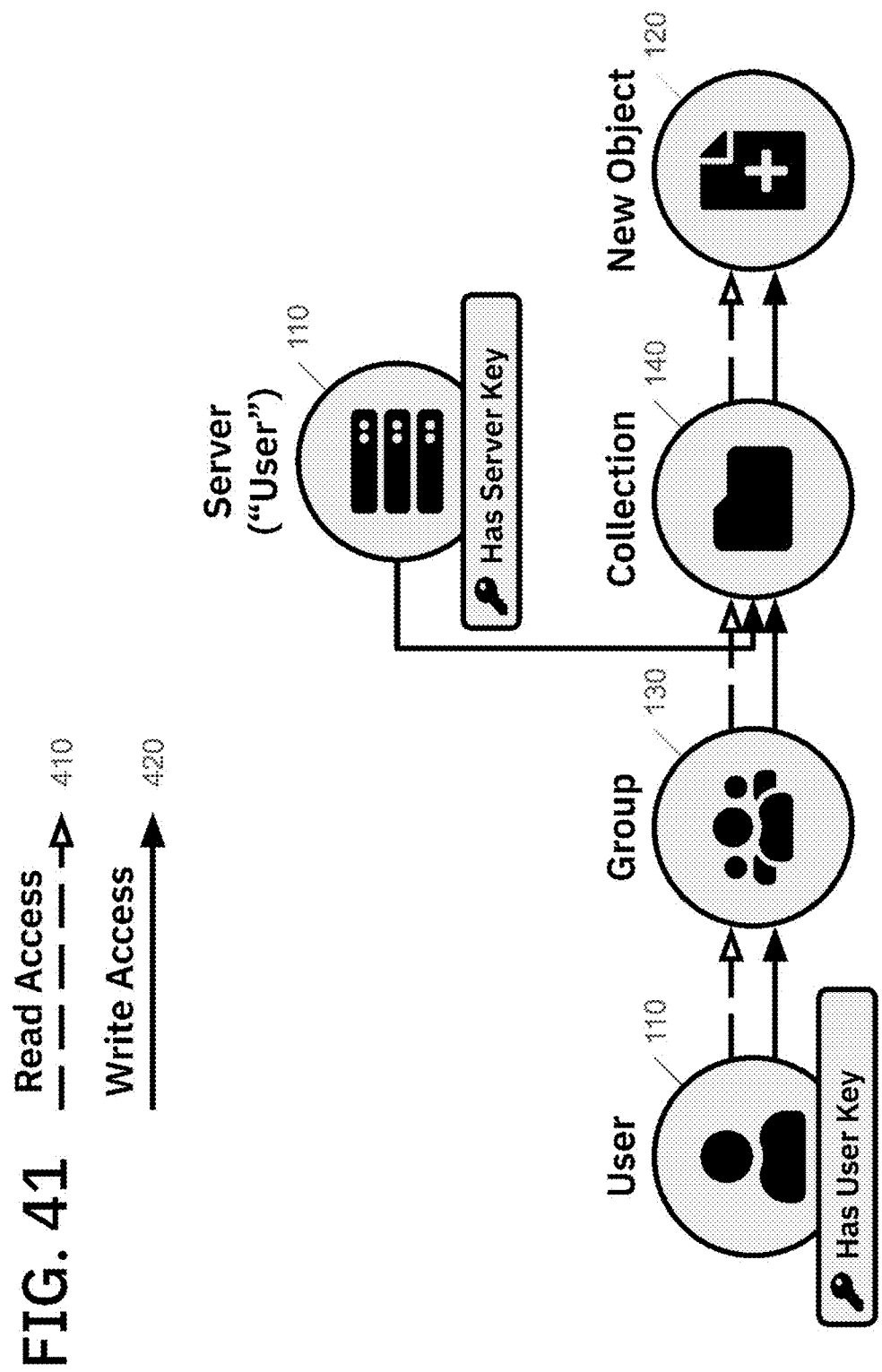
FIG. 41 shows a server with write access to a collection creating a new object according to one embodiment of the present disclosure.

In one embodiment, shown in FIG. 39, a server 240 is given access to an object 120 using a server 240 key. Servers 240 may need independent read and/or write access 420 to data objects 120 for a variety of reasons, including to run transactional or analytical application workloads independently of user 110 interaction and without the use of a user key 310. Alternatively, various property-preserving cryptosystems, such as deterministic encryption, order-preserving encryption, or homomorphic encryption may be used to allow the server 240 to perform operations on encrypted data objects 120 without decrypting them. As with users 110, servers 240 may be given access at various organizational levels, such as the collection 140 level, as shown in FIG. 40. They may also retain the ability to create new objects 120, as shown in FIG. 41, without necessarily having read access 410 to created objects 120. This may be useful in scenarios such as writing logs without needing to read them.

Figure 42:
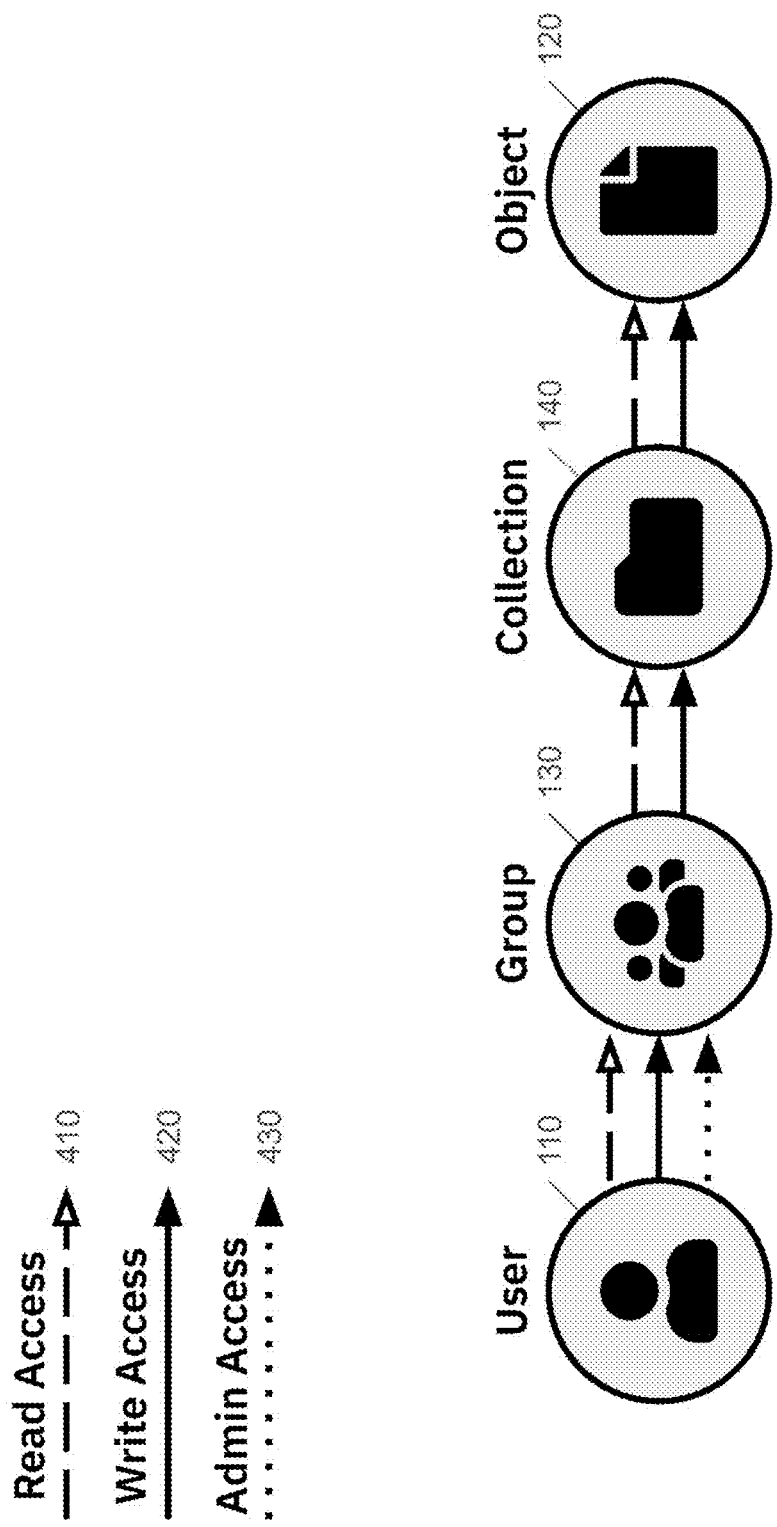
FIG. 42 shows a user with admin access to a group according to one embodiment of the present disclosure.
Figure 43:
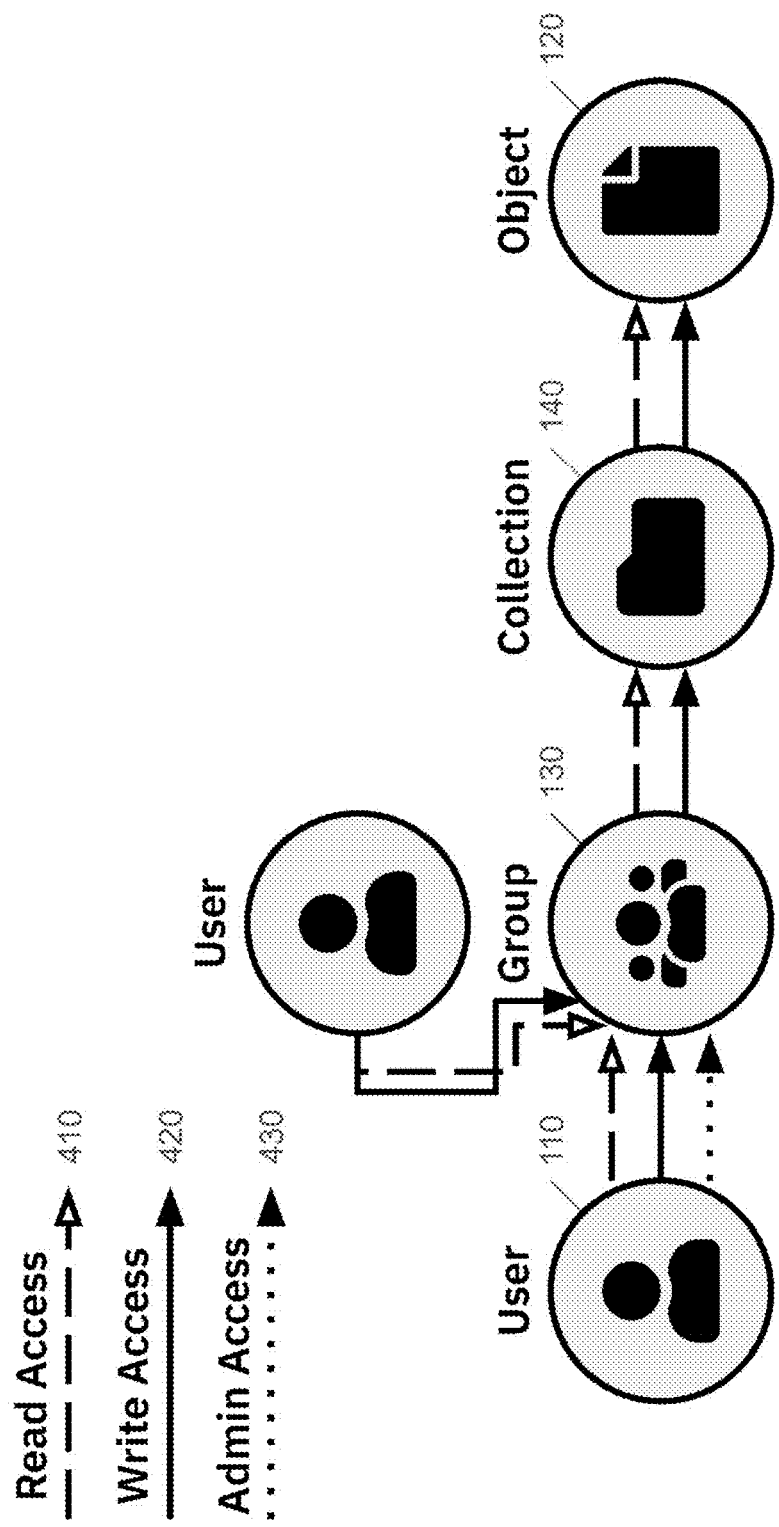
FIG. 43 shows a user with admin access to a group adding a new user to the group according to one embodiment of the present disclosure.
Figure 44:
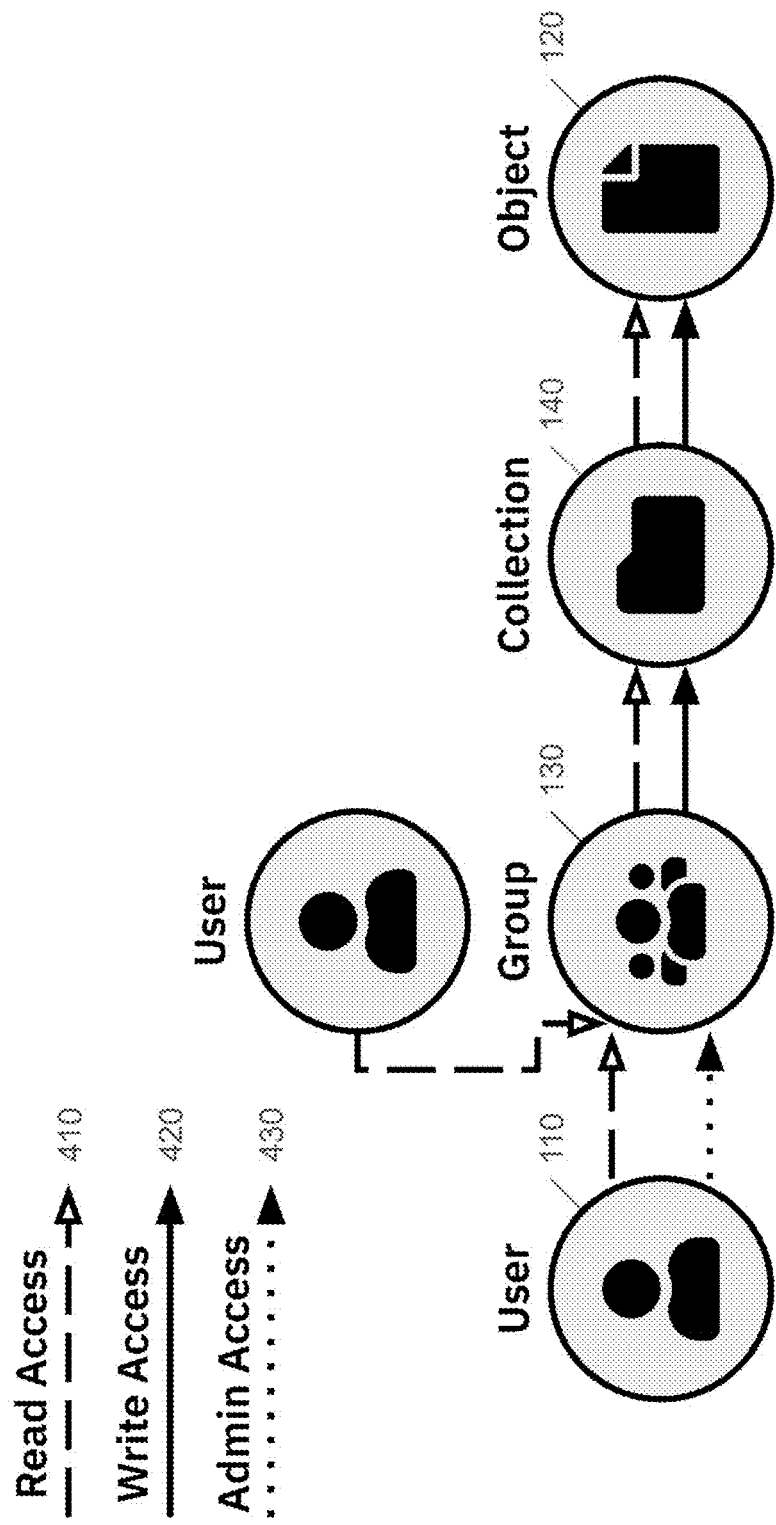
FIG. 44 shows a user with admin and read access to a group adding a new user with read access to the group according to one embodiment of the present disclosure.

In one embodiment, administrative access 430 to objects 120 or links 150 may be delegated separately from read and write access 420, as shown in FIG. 42. Per the example of FIG. 42, a user 110 has read, write, and administrative access 430 to a group 130, and can therefore add a new user 110 to the group 130, as shown in FIG. 43. However, the user 110 does not have administrative access 430 to the collection 140, and therefore cannot add or remove new users 110 or groups 130 to the collection 140. In one embodiment, fine-grained administrative access 430 controls are available; for example, a user 110 may have partial administrative access 430 to delegate read access 410 to a collection 140 but not write access 420. In another embodiment, users 110 may not delegate a permission they do not already have; for instance, write access 420 to a file cannot be granted by a user 110 who does not themselves already have write access 420, as shown in FIG. 44. Per the example of FIG. 44, a user 110 who has read and admin access 430 to a group 130 can grant read access 410 to a new user 110, but not write access 420. This precludes the possibility of a privilege escalation attack, whereby a user 110 increases the level of access to an object 120 by delegating a permission they do not themselves have.

Figure 45:
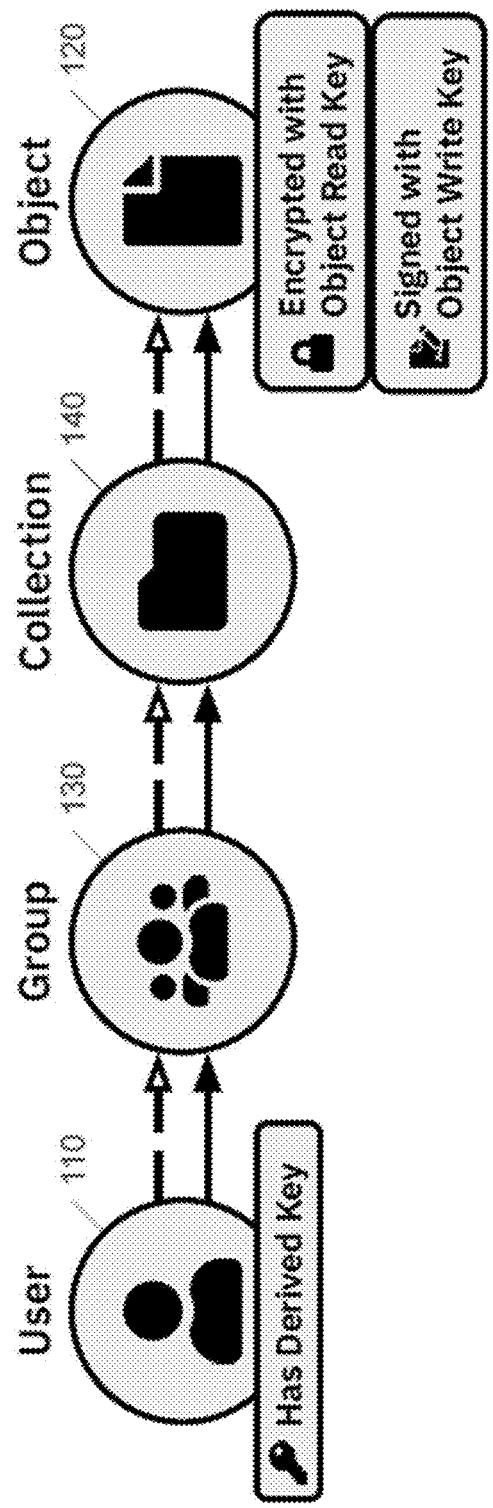
FIG. 45 shows a user with read and write access to an object using a derived key according to one embodiment of the present disclosure.
Figure 46:
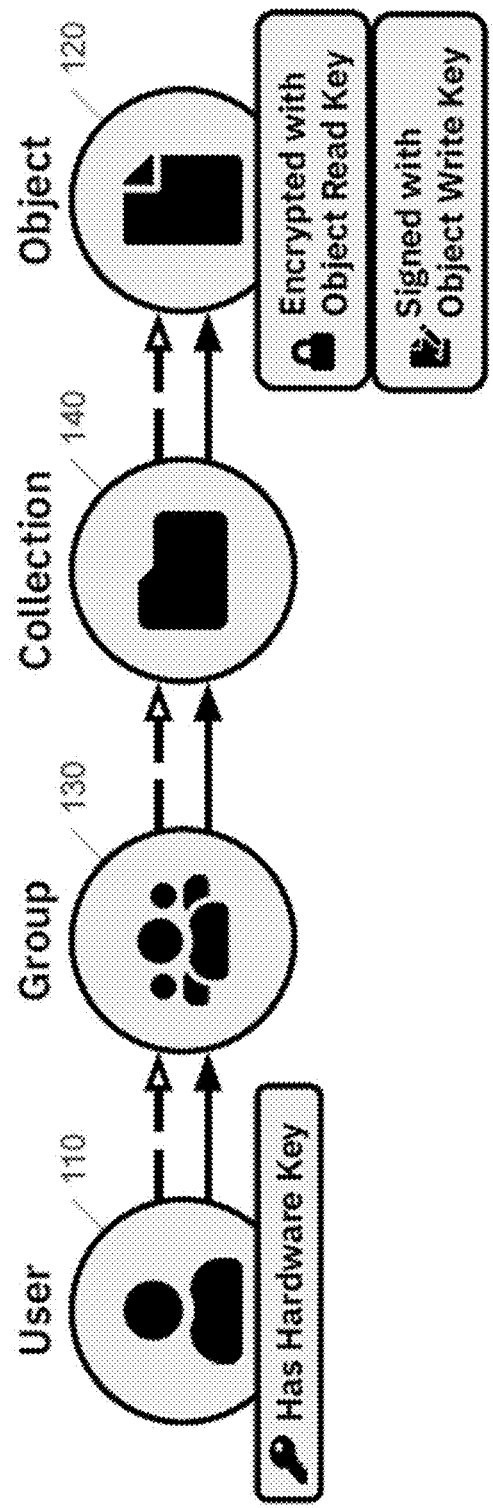
FIG. 46 shows a user with read and write access to an object using a hardware key according to one embodiment of the present disclosure.

In one embodiment, shown in FIG. 45, a derived key, such as a key derived using PBKDF2 or MFKDF, may used as the user key 310 for one or more users 110. If all users 110 use derived keys, then all data objects 120 may be decrypted using a derived key as part of the decryption process. Therefore, the password (in the case of PBKDF) or multiple authentication factors (in the case of MFKDF) of an authorized user 110 are needed to decrypt a data object 120. In another embodiment, shown in FIG. 46, a hardware key, such as a smart card, is used as the user key 310 for one or more users 110. As with derived keys, this may ensure that data is ultimately decrypted using a hardware key.

Figure 47:
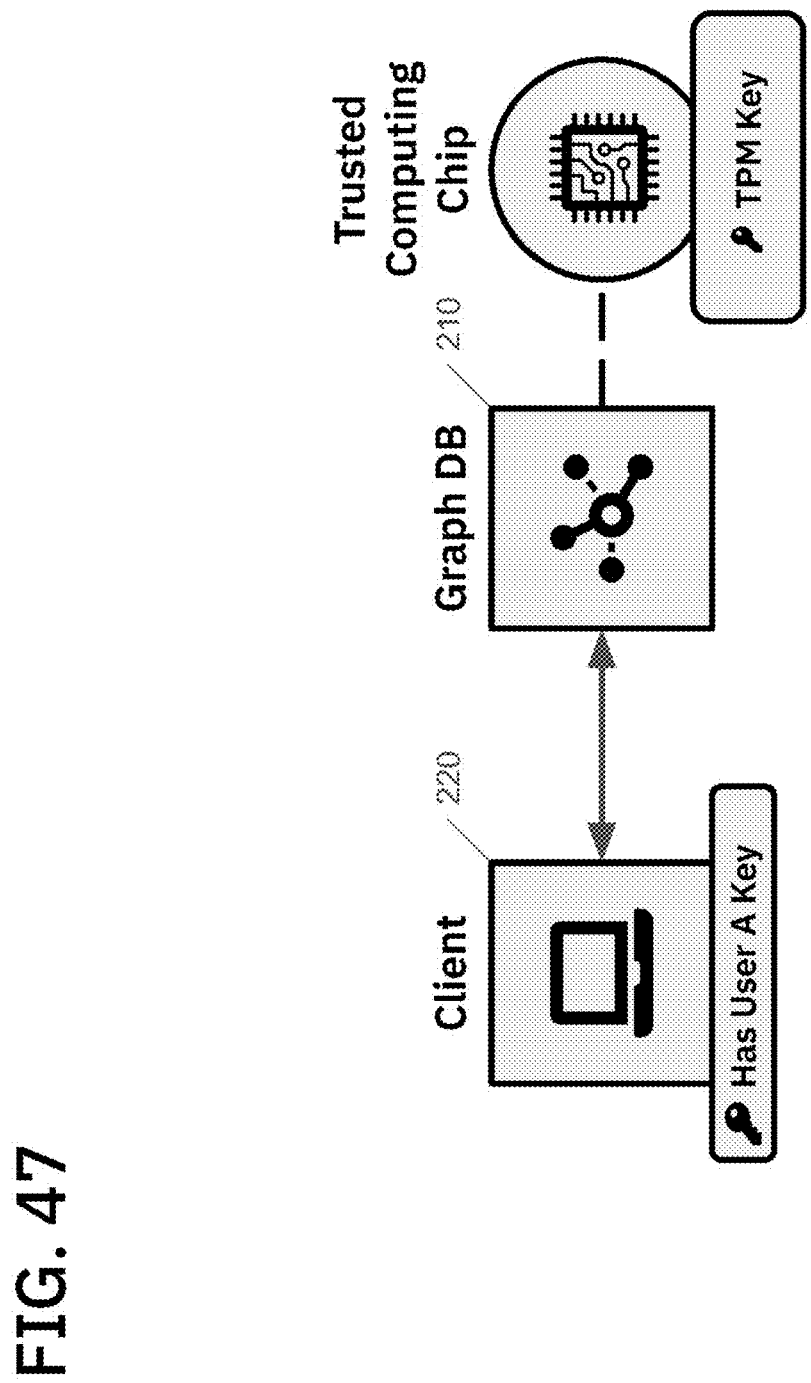
FIG. 47 shows the use of a trusted computing chip on a graph database according to one embodiment of the present disclosure.
Figure 48:
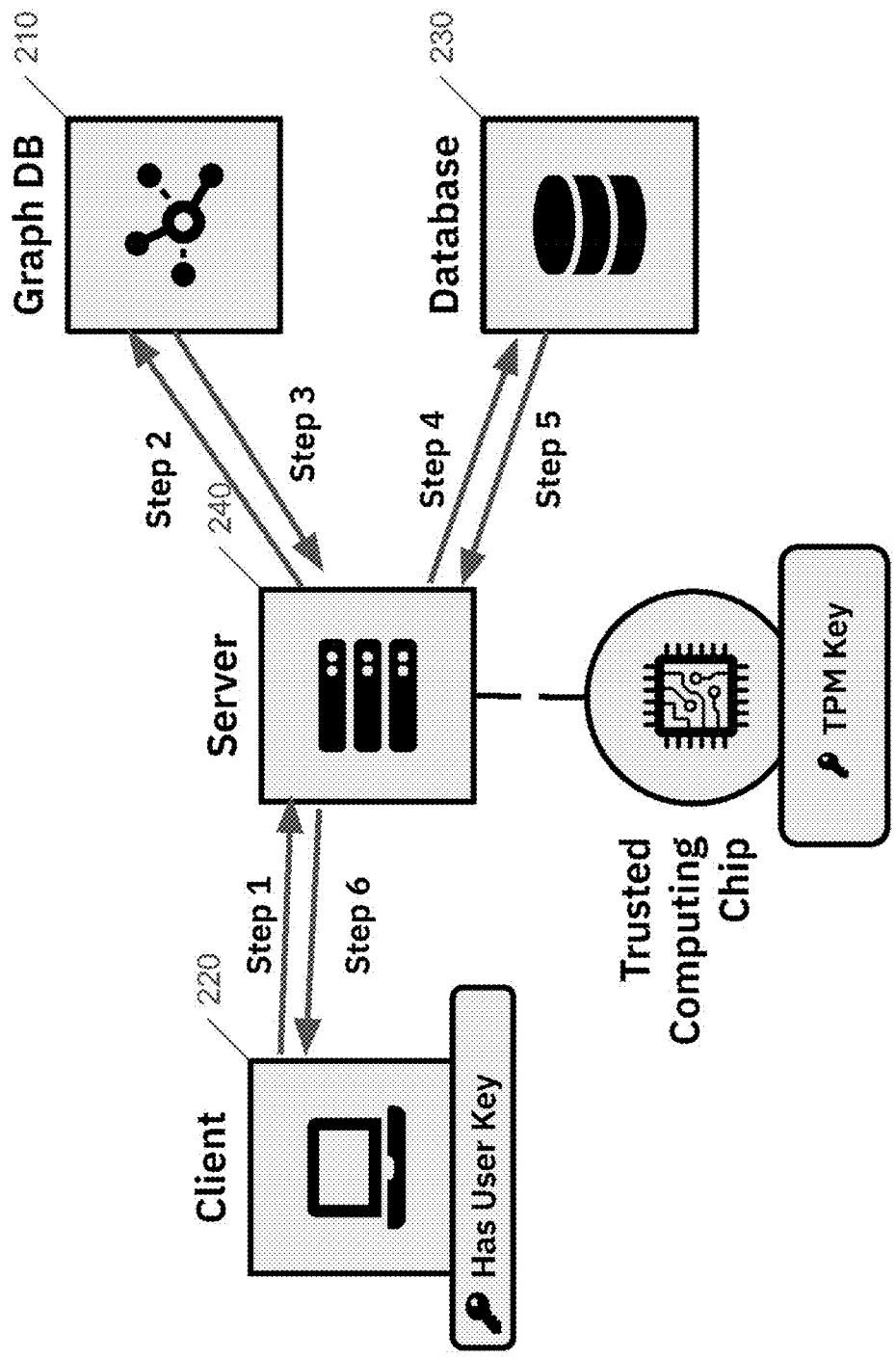
FIG. 48 shows the use of a trusted computing chip on a server according to one embodiment of the present disclosure.

Referring now to FIG. 47, in one embodiment, trusted computing is used to ensure the correct behavior of the graph database 210. A client 220 device may verify, via an attestation process, that the graph database 210 is running trusted code; for example, it can ensure that keys are correctly deleted when permissions are revoked. In another embodiment, shown in FIG. 48, trusted computing is used to ensure the correct behavior of the server 240. For example, the server 240 may have access to encrypted data, and a trusted computing chip can ensure that such data is only used for legitimate and pre-approved application-related purposes.

Figure 49:
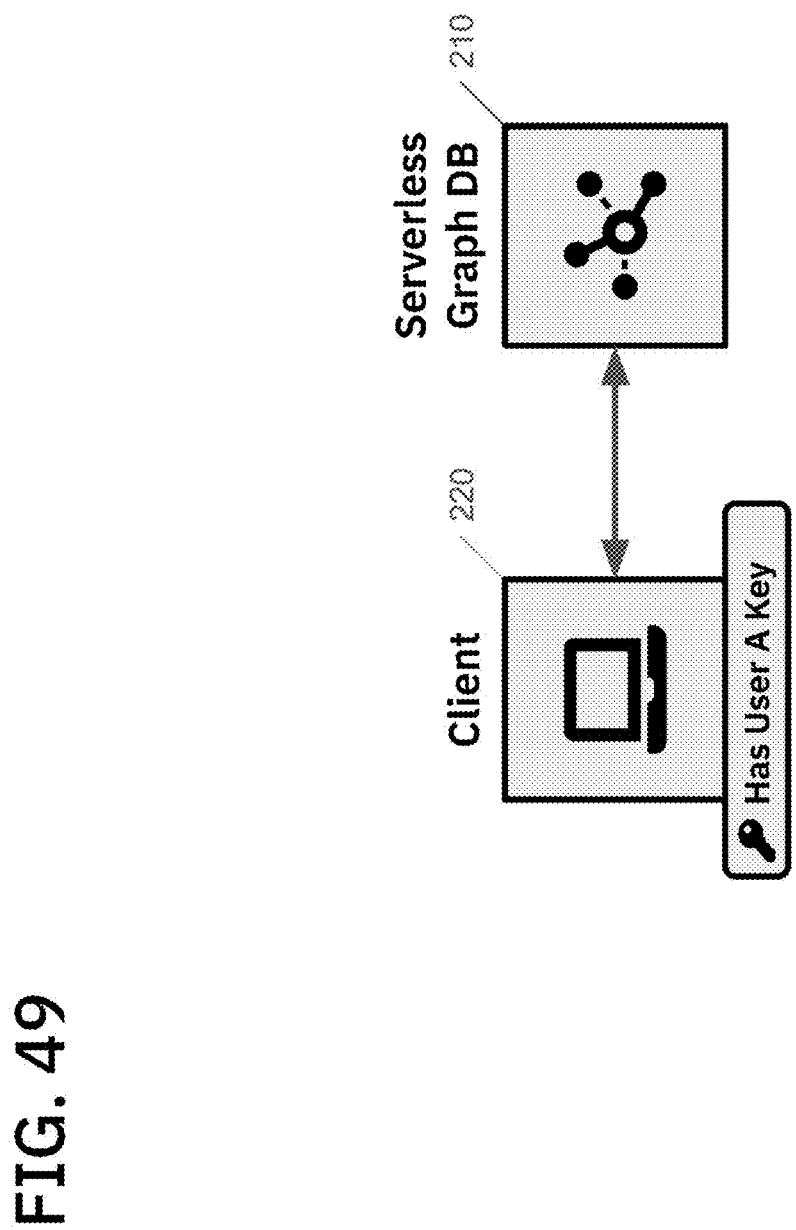
FIG. 49 shows the use of a serverless graph database according to one embodiment of the present disclosure.
Figure 50:
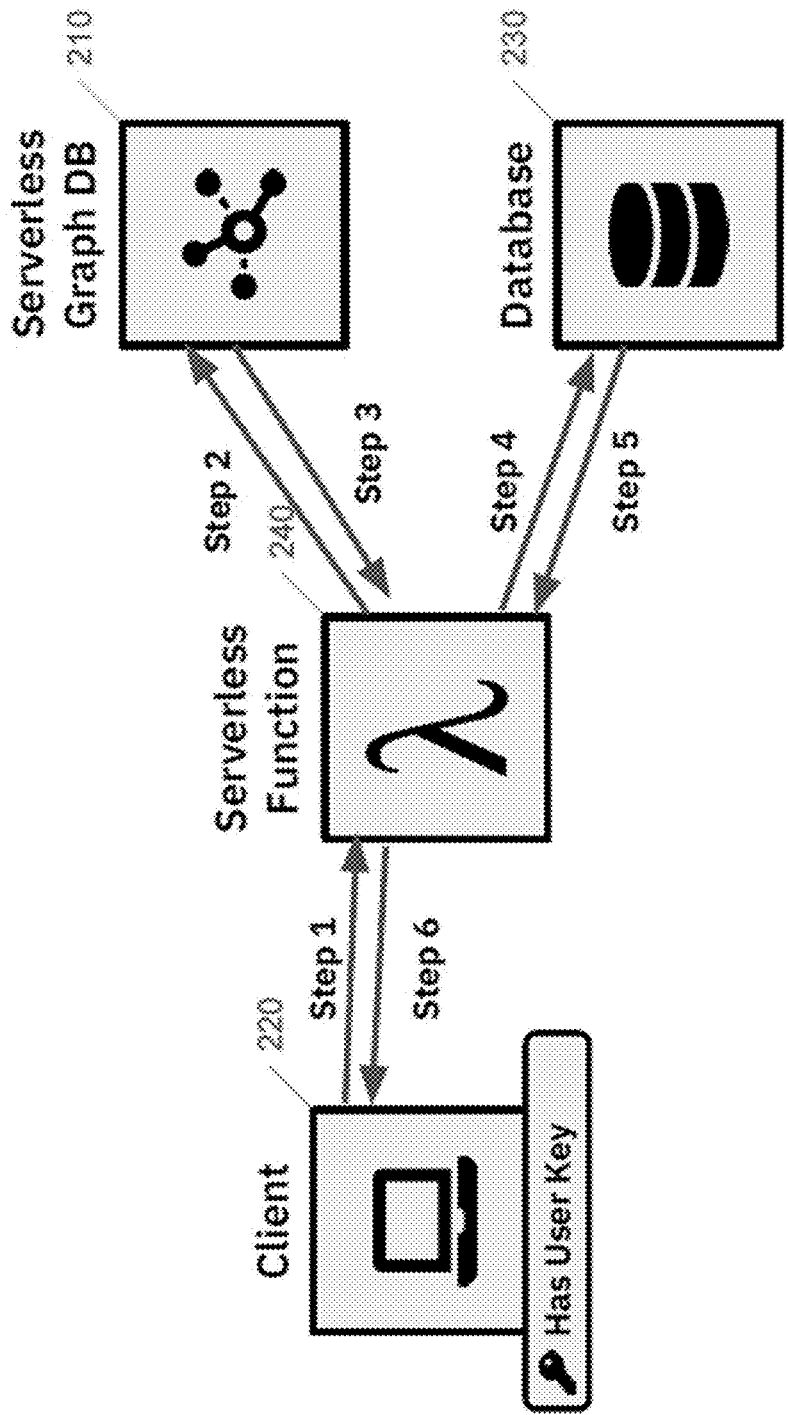
FIG. 50 shows the use of a serverless function according to one embodiment of the present disclosure.

In one embodiment, shown in FIG. 49, a serverless graph database 210 may used. An example of a serverless graph database 210 which could be used for this purpose Azure Cosmos DB. In another embodiment, shown in FIG. 50, a serverless function may be used to serve queries, in combination with a traditional or serverless graph database 210. One advantage of serverless technologies in this context is the potential for nearly unlimited scalability.

Figure 51:
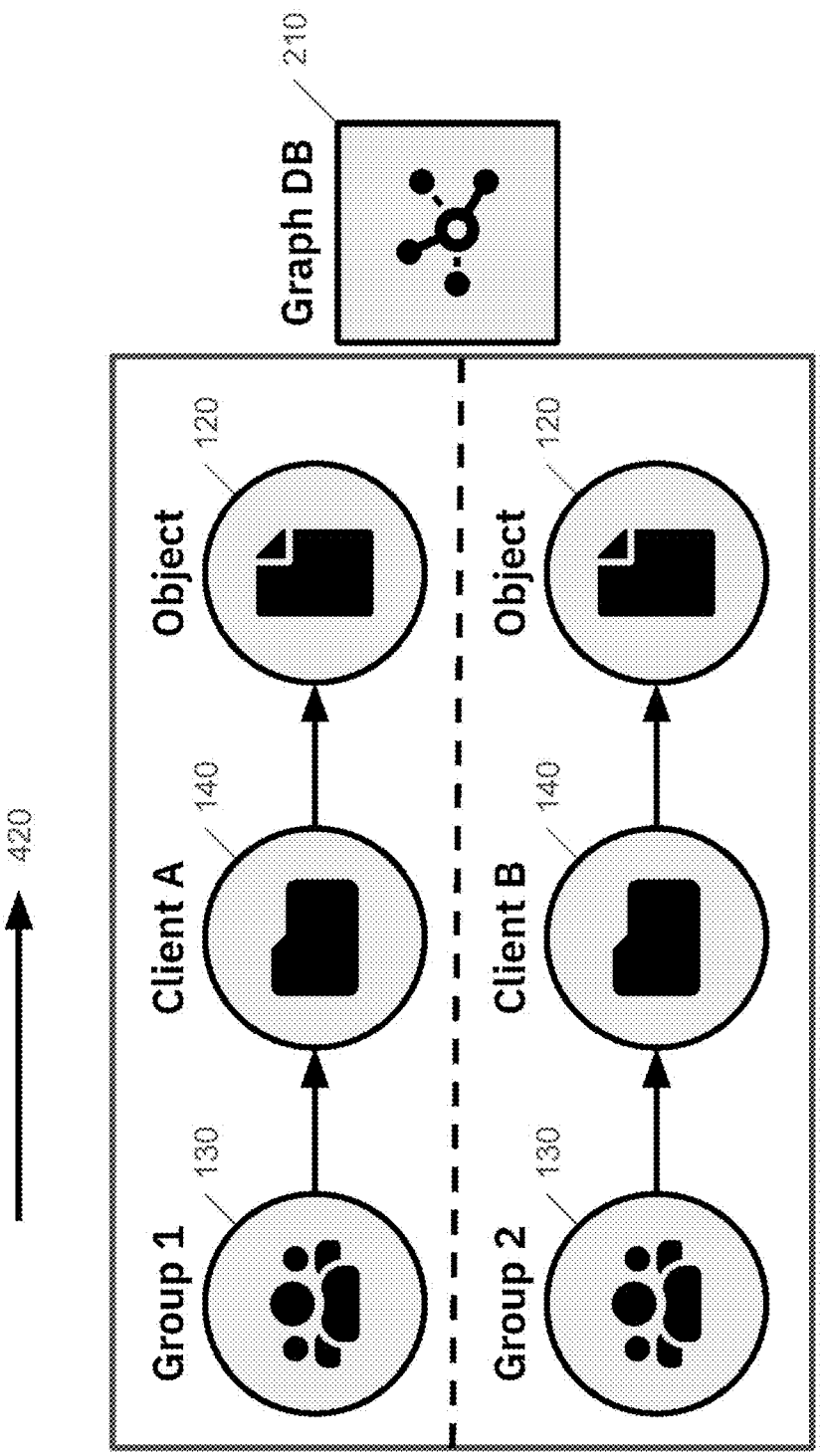
FIG. 51 shows the enforcement of a chinese wall data policy according to one embodiment of the present disclosure.

In one embodiment, the graph database 210 may further programmed to enforce a predefined access policy. For example, the policy may specify that users 110 accessing files relating to Client A may not access files relating to Client B, such as to avoid conflicts of interest, as shown in FIG. 51, also known as the "Chinese Wall" model. Attempts to set access permissions which do not comply with the specified policy will be rejected by the graph database 210. Due to the graph data structure, complex policies may be specified, for example by using a graph query language, and attempts to modify permissions can be rapidly checked against specified policies.

Figure 52:
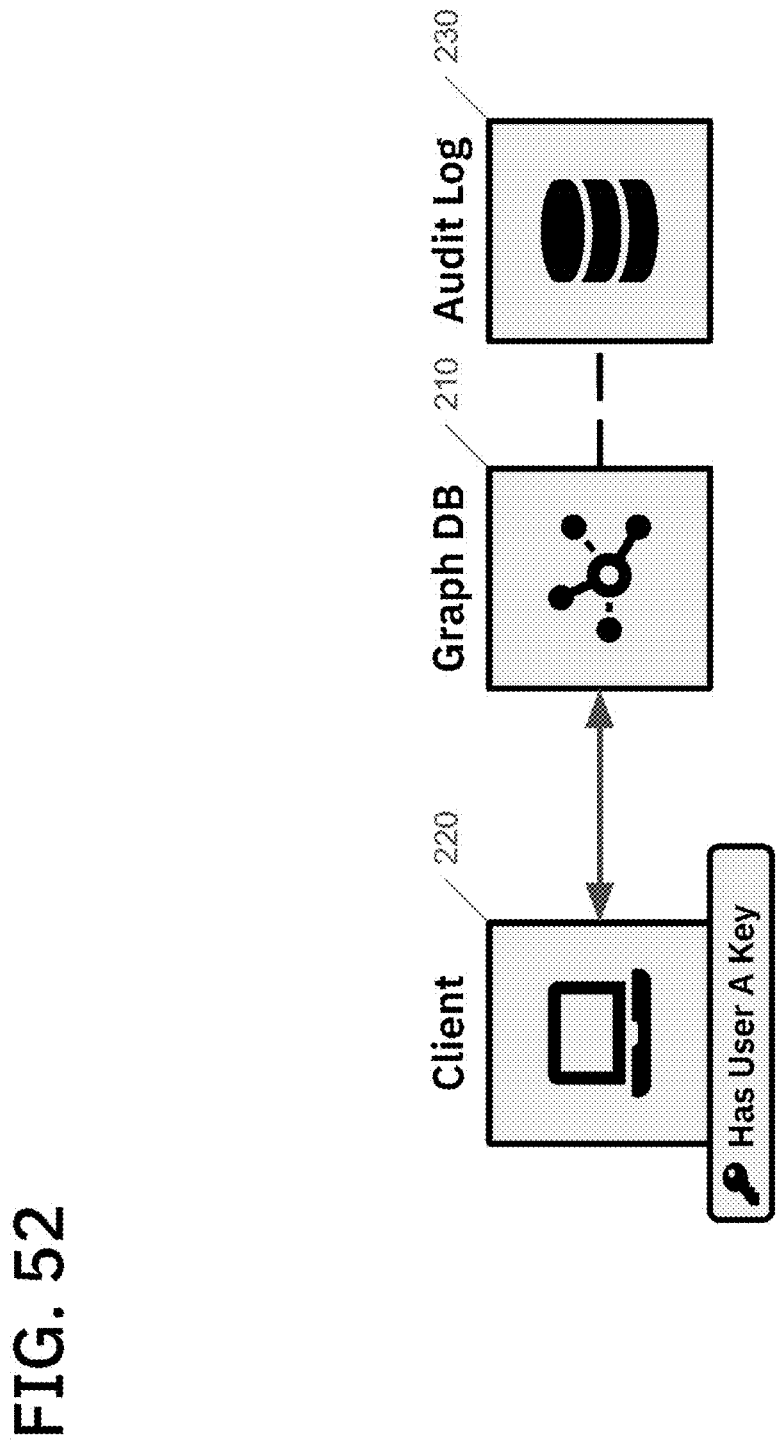
FIG. 52 shows the use of an audit log according to one embodiment of the present disclosure.
Figure 53:
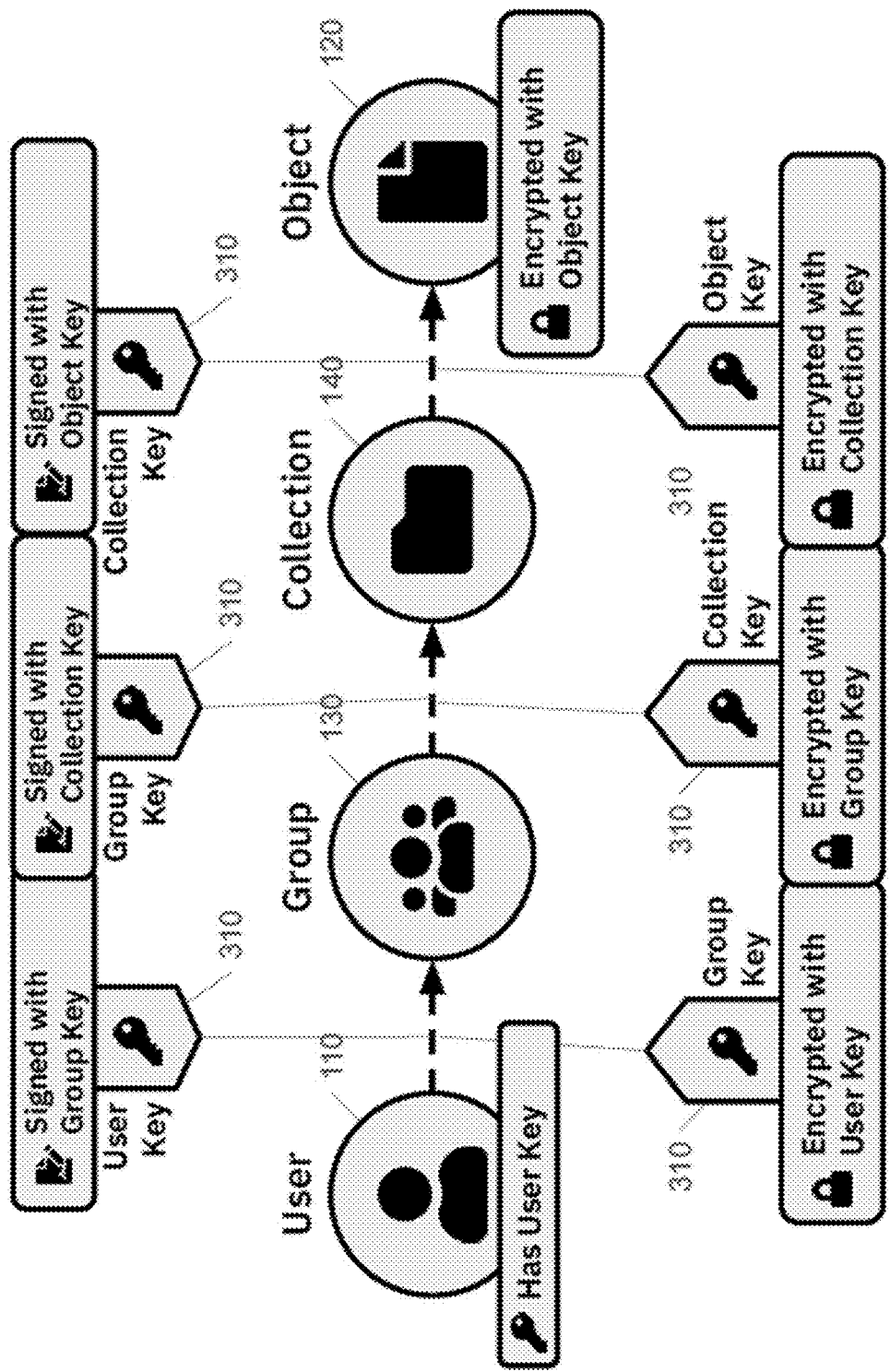
FIG. 53 shows a process of generating a signature chain for non-repudiation according to one embodiment of the present disclosure.

In one embodiment, the graph database 210 maintains an audit log of data access requests it receives, as shown in FIG. 52. The client 220 may also sign each request it sends to the graph database 210, and these signatures may be included in the audit log, providing nonrepudiation. Modifications to permissions, such as adding or removing users 110 from groups 130, may also be included in this log. In one embodiment, a user 110 includes in each request a proof of the path used to access a data object 120 using a chain of digital signatures, as shown in FIG. 53. This proof may also be stored in the audit log, to allow the exact path through which data was accessed to be later audited if required. In another embodiment, zero-knowledge proofs may be used to prove that a user 110 was authorized to access a file without revealing the exact path used to access the file as when using signatures.

Figure 54:
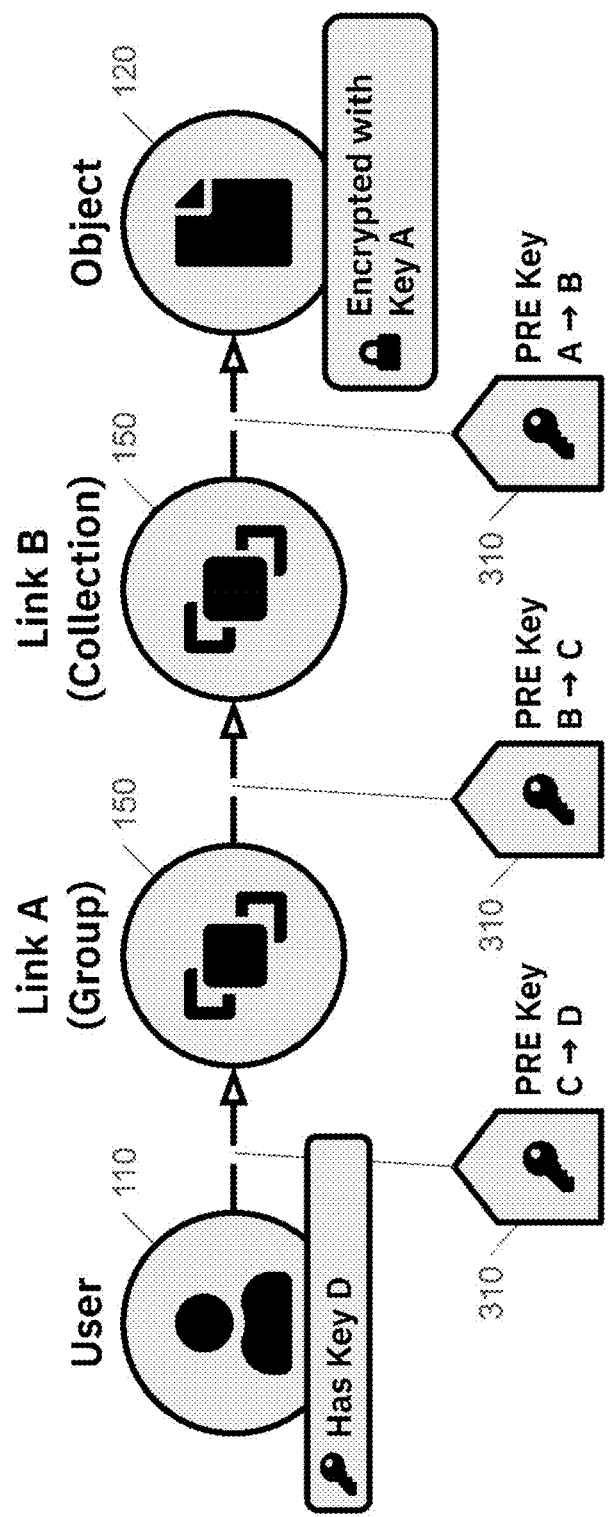
FIG. 54 shows the use of proxy re-encryption according to one embodiment of the present disclosure.
Figure 55:
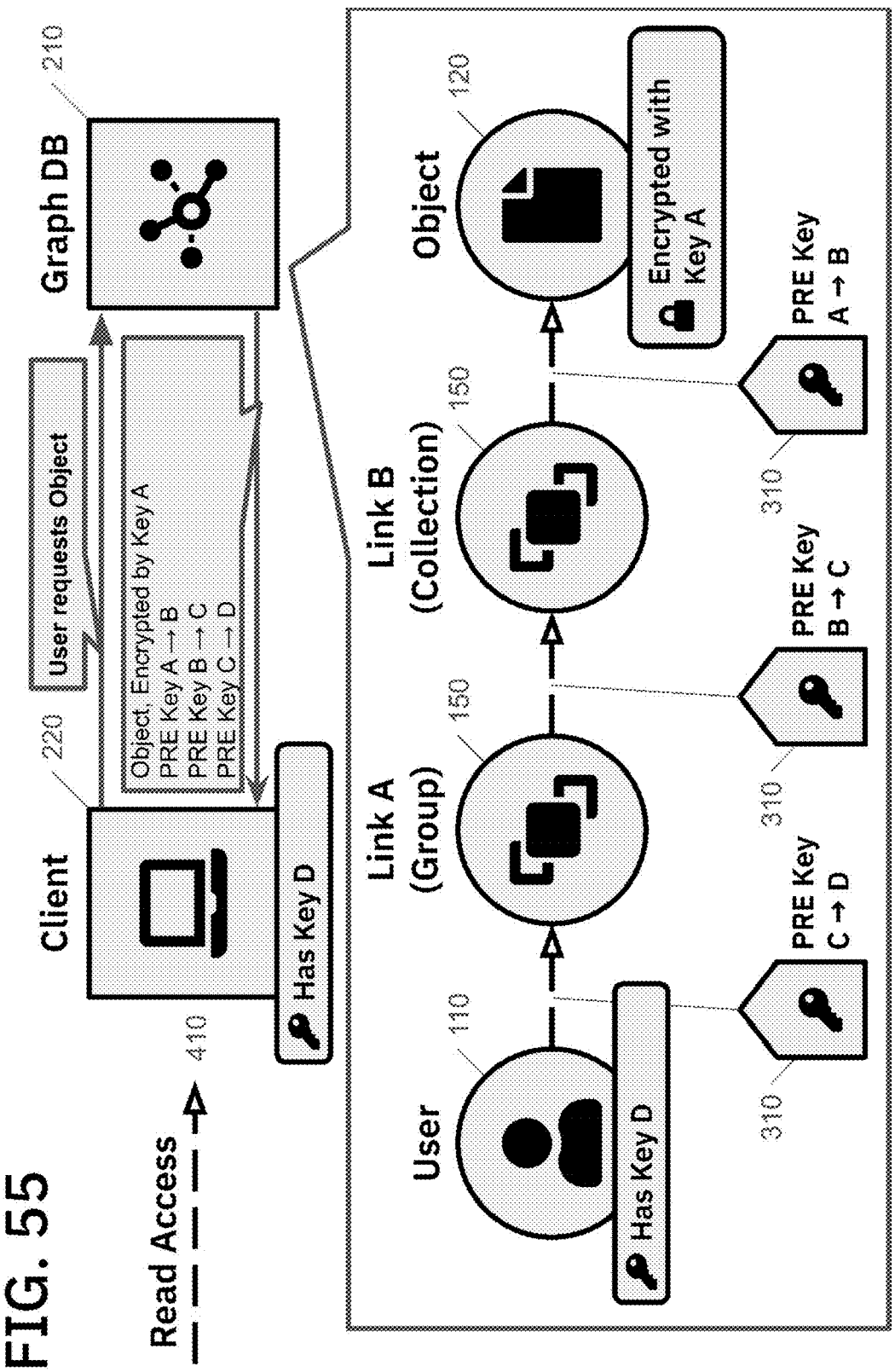
FIG. 55 shows a graph database providing proxy re-encryption keys to a user according to one embodiment of the present disclosure.
Figure 56:
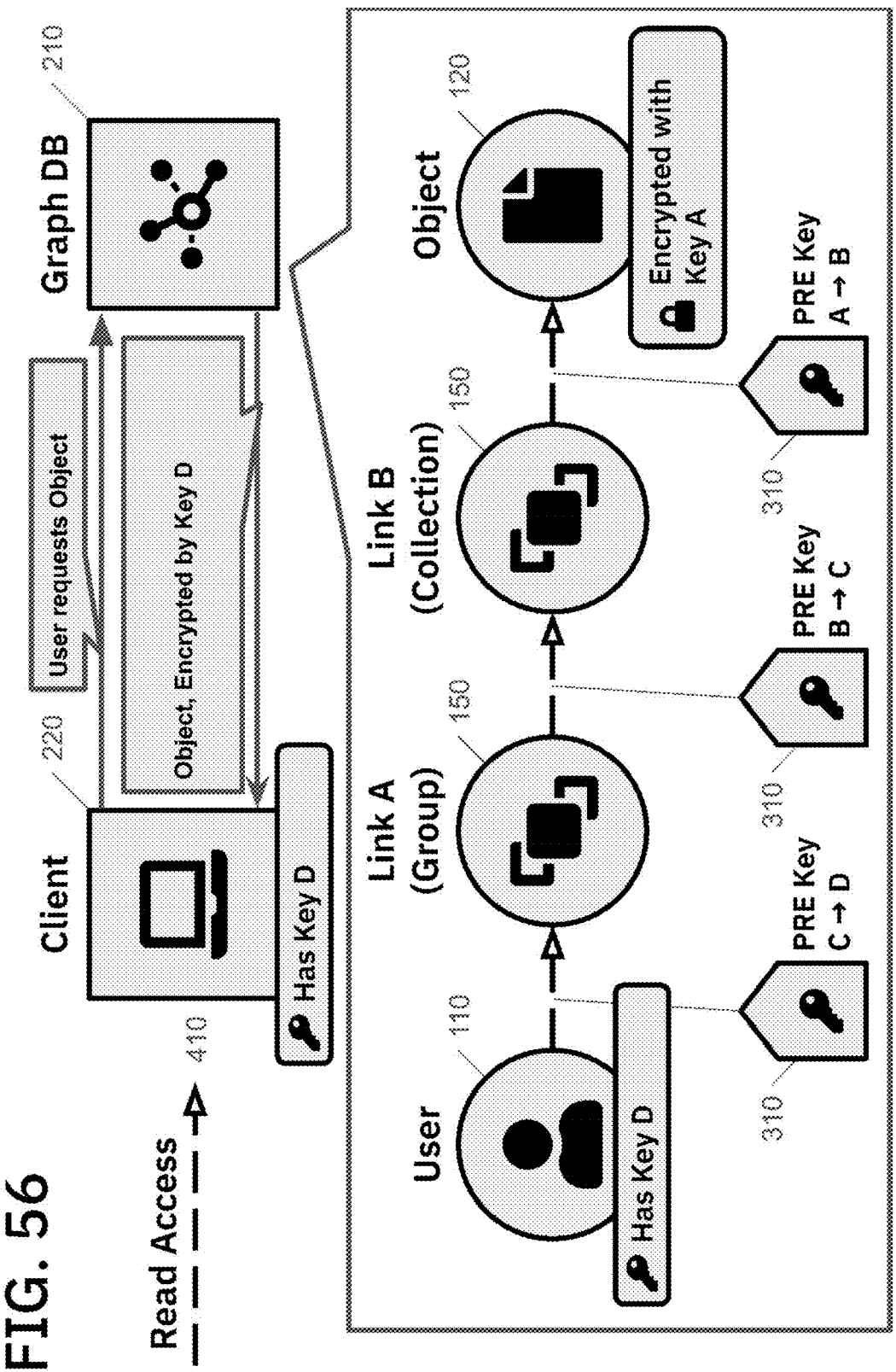
FIG. 56 shows a graph database applying proxy re-encryption keys according to one embodiment of the present disclosure.

In one embodiment, proxy re-encryption (PRE) may be used to re-encrypt a ciphertext directly to a user's key, as shown in FIG. 54. Per the example of FIG. 54, a user 110 holds Key D, and an object 120 is encrypted with Key A, while the edges from the user 110 to the object 120 have re-encryption keys from A to B, B to C, and C to D. These re-encryption keys can be applied in sequence to construct a version of the object 120 encrypted with Key D, which the user 110 may subsequently decrypt. In one embodiment, shown in FIG. 55, when a user 110 requests an object 120, the encrypted object 120 is returned to the user 110 along with each of the PRE keys required to re-encrypt the object 120 such that it can be decrypted with the user's key. In another embodiment, shown in FIG. 56, the re-encryption operations are applied directly by the graph database 210 or intermediate server 240, and the user 110 receives a modified version of the object 120 which can be directly decrypted by them.

Figure 57:
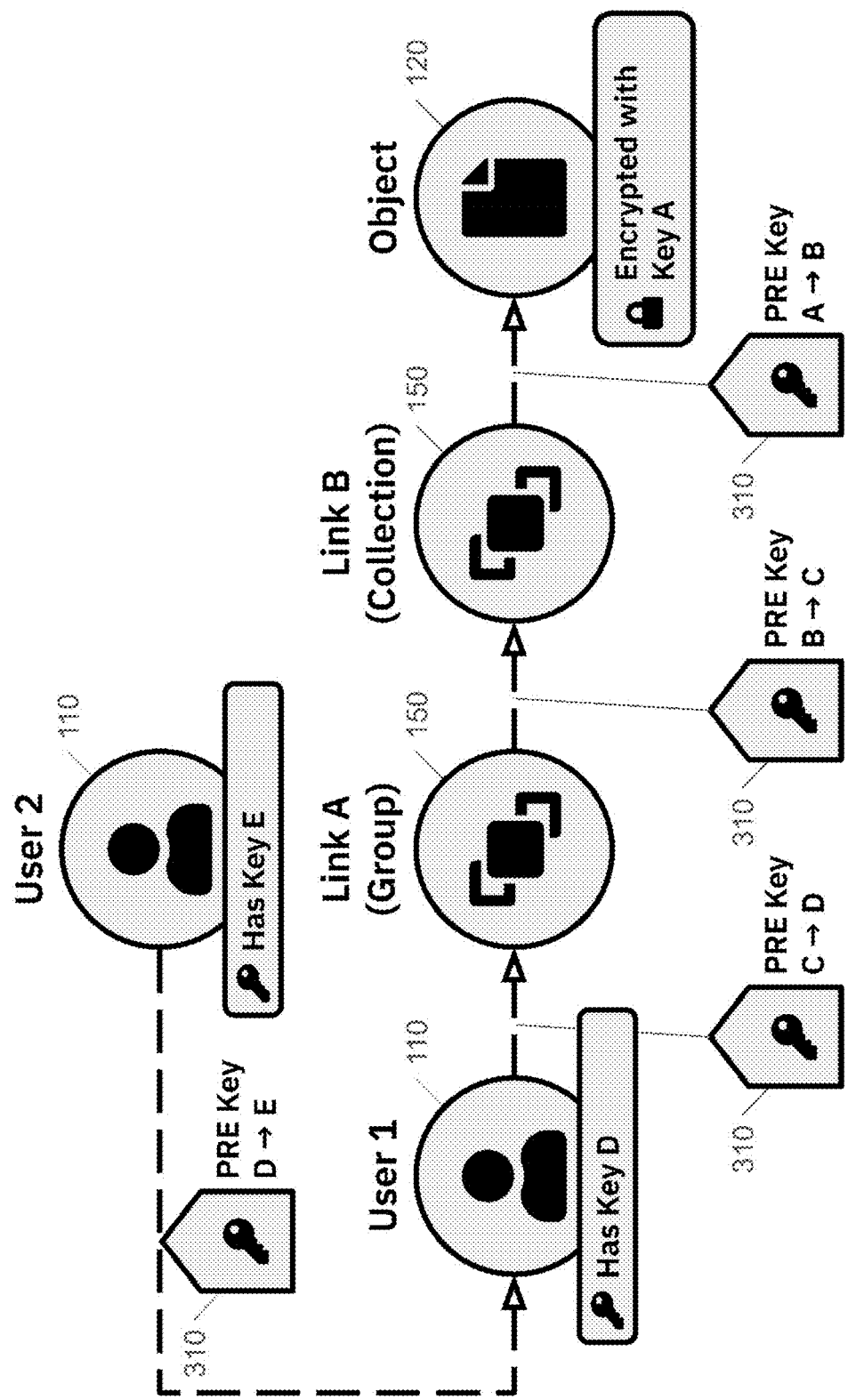
FIG. 57 shows a user delegating access according to one embodiment of the present disclosure.

In one embodiment, shown in FIG. 57, a user 110 is able to delegate their access to another user 110 by producing a PRE key from their key to the key of another user 110. Per the example of FIG. 57, User 1 delegates their access to User 2 using a PRE key from D to E, and thus User 2 inherits all of the permissions of User 1 by first accessing files as User 1 would, and then using the PRE key to access files using their own key.

Figure 58:
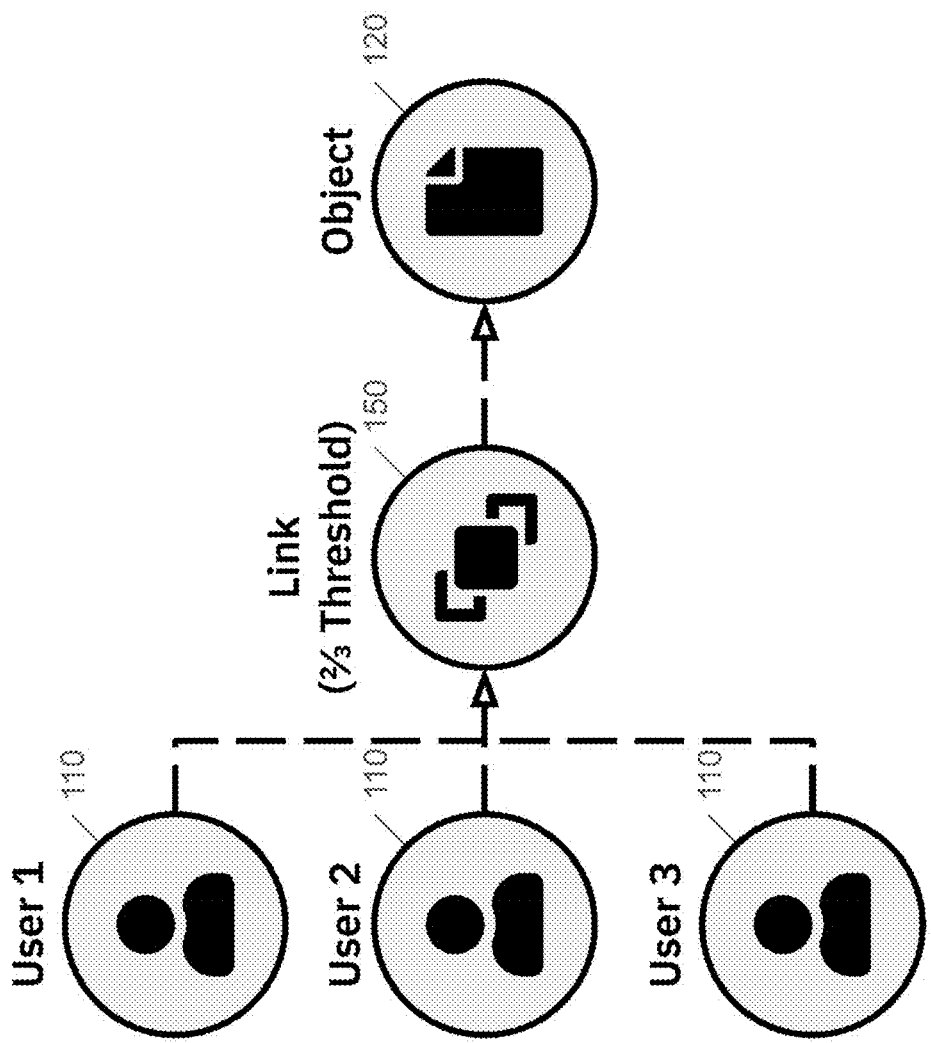
FIG. 58 shows the use of threshold cryptography according to one embodiment of the present disclosure.

Referring now to FIG. 58, in one embodiment, threshold cryptography is used to enable threshold-based access to a file. For example, threshold encryption or secret sharing may be used to enable threshold-based read access 410, and a threshold signature scheme can be used to enable threshold-based write access 420. In a threshold-based setup, a link 150 may be constructed that requires more than one of the delegated entities (users 110 or other links 150) to agree upon a given operation. Per the example of FIG. 58, at least 2 of the 3 users 110 with read access 410 to an object 120 must participate in the access and decryption of said object 120.

Figure 59:
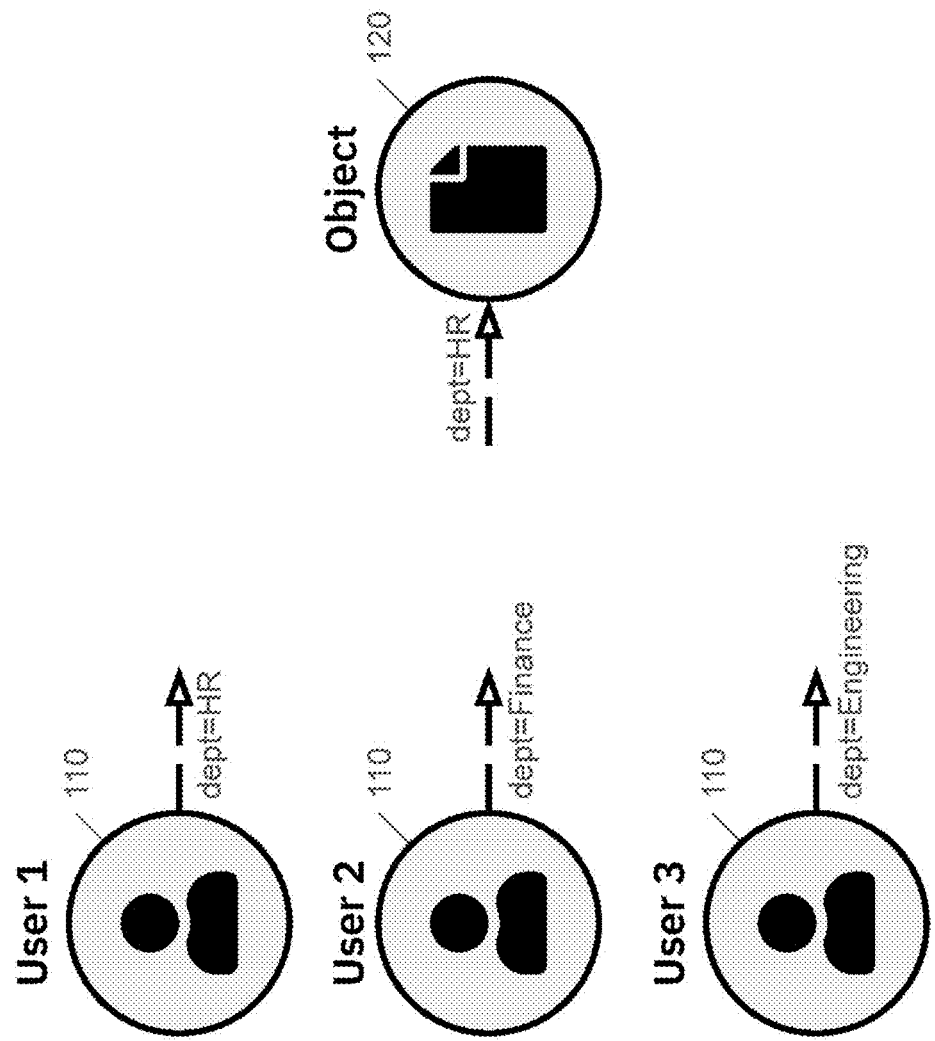
FIG. 59 shows the use of attribute-based cryptography according to one embodiment of the present disclosure.

Referring now to FIG. 59, in one embodiment, an attribute-based encryption scheme may be used to grant object 120 or group 130 access to all users 110 with a particular set of attributes without requiring the corresponding access links 150 to be explicitly constructed. Per the example of FIG. 59, an edge is constructed to automatically give object 120 access to all users 110 with the department attribute of HR. Therefore, in this case, User 1 will be able to decrypt and read the object 120, despite lacking an explicit connection to the object 120, while User 2 and User 3 will not be able to read the object 120 due to not having the required attributes.

Figure 60:
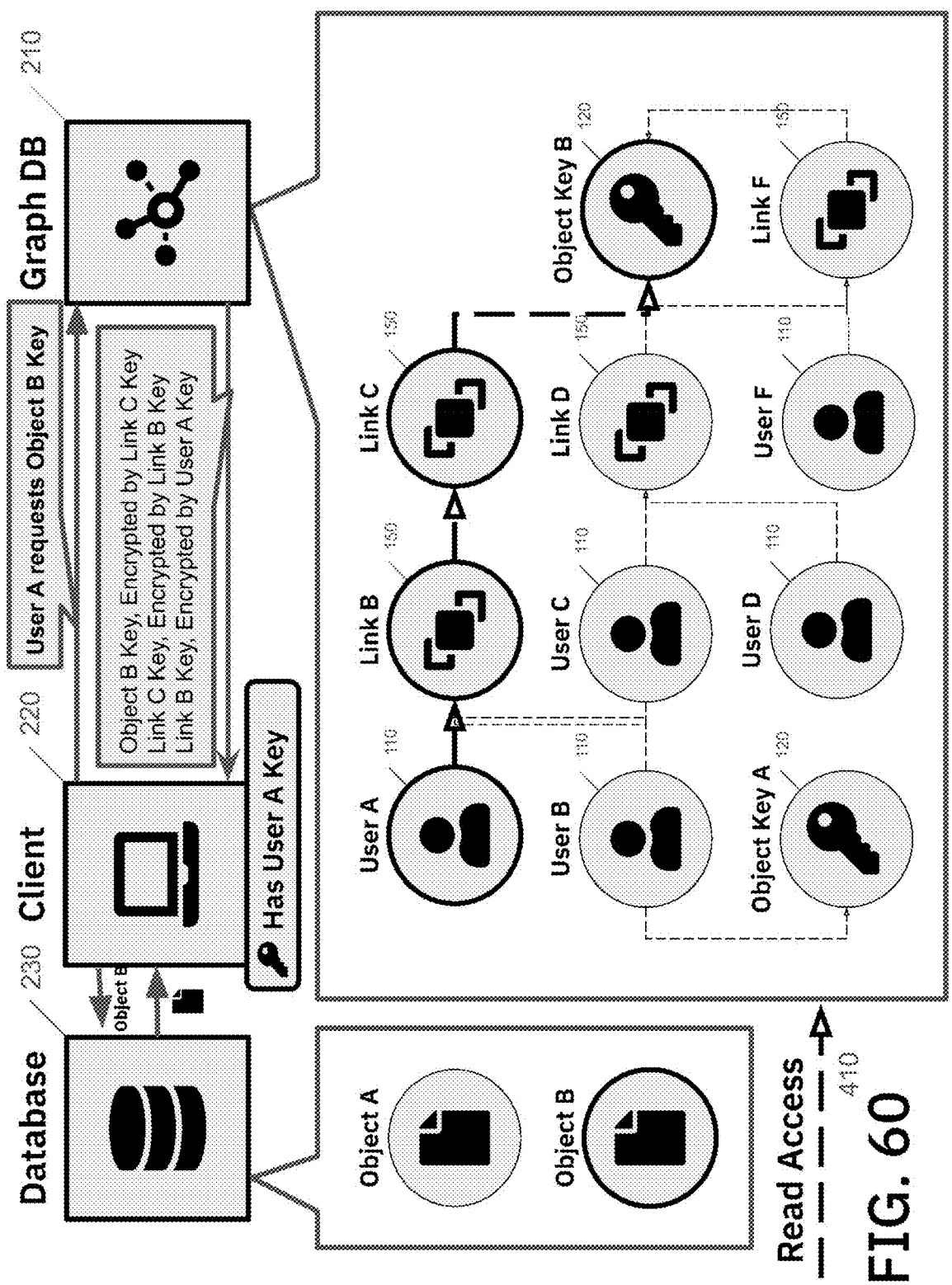
FIG. 60 shows a system and method for data access management whereby objects are themselves cryptographic keys according to one embodiment of the present disclosure.

In one embodiment, shown in FIG. 60, the data objects 120 stored in the system are themselves cryptographic keys, which may be used to decrypt data objects 120 stored elsewhere. For example, the object 120 may be a fast symmetric key, such as an AES key, which can be used to quickly decrypt a large external object 120, while the cryptosystem used within the graph database 210 may be a slower asymmetric cryptosystem. This allows the advantageous properties of public-key cryptography to be used within the system without incurring the performance penalty of encrypting entire data objects 120 with public keys.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A system for efficient cryptographically-assured data access management for advanced data access policies comprising:
   a graph database including one or more encrypted objects;
   whereby a user makes requests to the graph database using a client device;
   whereby each user holds at least one key from a set of user keys, and each of the one or more encrypted objects is encrypted with at least one key from a set of object keys;
   whereby cryptographic material is stored as properties of edges in the graph database;
   whereby the process of accessing the one or more encrypted objects involves combining the encrypted object and the cryptographic material; and
   whereby the graph database cryptographically enforces a data access policy.

2. The system for efficient cryptographically-assured data access management of claim 1, whereby proxy re-encryption is further used for objects stored by the graph database.

3. The system for efficient cryptographically-assured data access management of claim 2, whereby the graph database applies proxy re-encryption to transform data objects requested by the client.

4. The system for efficient cryptographically-assured data access management of claim 2, whereby users can delegate their access by creating an edge in the graph database.

5. The system for efficient cryptographically-assured data access management of claim 1, whereby at least one of attribute-based encryption, homomorphic encryption, property-preserving encryption, and threshold encryption is further used for objects stored by the graph database.

6. The system for efficient cryptographically-assured data access management of claim 1, whereby the graph database is further capable of automatically optimizing a provided data access policy using one or more available cryptosystems.

7. The system for efficient cryptographically-assured data access management of claim 1, whereby edges are used to provide hierarchical organization.

8. The system for efficient cryptographically-assured data access management of claim 1, whereby a shortest path algorithm is used to determine the most efficient way to access an object.

9. The system for efficient cryptographically-assured data access management of claim 1, whereby a graph algorithm is used to generate a list of objects or collections accessible to a user or group.

10. The system for efficient cryptographically-assured data access management of claim 1, whereby a graph algorithm is used to generate a list of users or groups with access to an object or collection.

11. The system for efficient cryptographically-assured data access management of claim 1, whereby separate read and write permissions are used.

12. The system for efficient cryptographically-assured data access management of claim 1, whereby at least one server is granted access to an object or collection.

13. The system for efficient cryptographically-assured data access management of claim 1, whereby separate administrative permissions are used.

14. The system for efficient cryptographically-assured data access management of claim 1, further comprising an audit log which stores data access requests.

15. The system for efficient cryptographically-assured data access management of claim 1, whereby users can generate a proof of access permission using at least one of a signature chain and zero-knowledge proofs.

16. The system for efficient cryptographically-assured data access management of claim 1, whereby at least one of the graph database and a function associated with the graph database is serverless.

17. The system for efficient cryptographically-assured data access management of claim 1, further comprising a trusted computing chip associated with at least one of the graph database and a server communicating with the graph database.

18. The system for efficient cryptographically-assured data access management of claim 1, further comprising a database for storing data objects, whereby the graph database stores cryptographic keys used to encrypt objects in the database.

19. The system for efficient cryptographically-assured data access management of claim 1, whereby access control models are enforced by the graph database.

20. The system for efficient cryptographically-assured data access management of claim 1, whereby a cryptographic key of the user is at least one of a derived key and a hardware-based key.

* * * * *